United States Patent
Engels et al.

(10) Patent No.: US 12,540,317 B2
(45) Date of Patent: *Feb. 3, 2026

(54) SELF-IMMOLATIVE PLASMID BACKBONE

(71) Applicant: ProteoNic Biotechnology IP B.V., Leiden (NL)

(72) Inventors: Bart Marinus Engels, Woerden (NL); Raymond Michael Dimphena Verhaert, Breda (NL); Maurice Wilhelmus Van der Heijden, Waddinxveen (NL)

(73) Assignee: ProteoNic Biotechnology IP B.V., Leiden (NL)

( * ) Notice: Subject to any disclaimer, the term of this patent is extended or adjusted under 35 U.S.C. 154(b) by 8 days.

This patent is subject to a terminal disclaimer.

(21) Appl. No.: 18/602,065

(22) Filed: Mar. 12, 2024

(65) Prior Publication Data

US 2024/0344053 A1 Oct. 17, 2024

Related U.S. Application Data

(62) Division of application No. 17/433,609, filed as application No. PCT/EP2020/055249 on Feb. 28, 2020, now Pat. No. 11,959,069.

(30) Foreign Application Priority Data

Feb. 28, 2019 (EP) .................................... 19160099

(51) Int. Cl.
*C12N 15/10* (2006.01)
(52) U.S. Cl.
CPC ................................ *C12N 15/101* (2013.01)

(58) Field of Classification Search
CPC ..................................................... C12N 15/101
USPC ......................................................... 536/25.4
See application file for complete search history.

(56) References Cited

U.S. PATENT DOCUMENTS 11,959,069 B2 * 4/2024 Engels ................. C12N 15/101

OTHER PUBLICATIONS

Judith W.Zyskind, Sanford I.Bernstein: "Lab V. TN5 Mutagenesis of PBR329" In: J. W Zyskind and S. I Bernstein: "Recombinant DNA Laboratory Manual", Dec. 31, 1989 (Dec. 31, 1989), Academic press, XP002790549, ISBN: 0127844007, pp. 51-65, p. 57-p. 63.
Jiang et al: "Advanced Design of Minimalistic Dumbbell-shaped Gene Expression Vectors", Aug. 5, 2017 (Aug. 5, 2017), XP002790550, Retrieved from the Internet: URL:https://bio-protocol.org/e2425 [retrieved on Apr. 11, 2019] the whole document.
Database EMBL [Online]; Nov. 10, 2015 (Nov. 10, 2015), "JP 2015517301-A/39: Viral Vectors for the Treatment of Retinal Dystrophy.", XP002790551, retrieved from EBI accession No. EM_PAT:HZ179526 Database accession No. HZ179526.
Database Geneseq [Online]; Jan. 5, 2012 (Jan. 5, 2012), "*Escherichia coli* ApR-Ori DNA sequence, SEQ ID 5.", XP002790552, retrieved from EBI accession No. GSN:AZP86474. Database accession No. AZP86474.

* cited by examiner

*Primary Examiner* — Yin-Horng Shiao
(74) *Attorney, Agent, or Firm* — Ipsilon USA—NLO

(57) ABSTRACT

The invention relates to a method for separating a polynucleotide insert from a polynucleotide vector backbone. The backbone has a plurality of cleavage sites distributed such that the backbone is converted into fragments when the sites are cleaved. This allows straightforward separation of the insert from the backbone. The invention also relates to backbones for use in such a method, and to plasmids and kits comprising such backbones.

17 Claims, 3 Drawing Sheets

Specification includes a Sequence Listing.

7.0 kb —

0.1-0.4 kb —{

2.0 kb —
1.0 kb —
0.5 kb —
0.1 kb —

SELF-IMMOLATIVE PLASMID BACKBONE

REFERENCE TO AN ELECTRONIC SEQUENCE LISTING

The contents of the electronic sequence listing (sequence Listing—st26.xml; Size: 449 Kb; and Date of Creation: May 28, 2024) is herein incorporated by reference in its entirety

FIELD OF THE INVENTION

The invention is in the field of polynucleotides and their production. The invention relates to a method for separating a polynucleotide insert from a polynucleotide vector backbone. The backbone has a plurality of cleavage sites distributed such that the backbone is converted into fragments when the sites are cleaved. This allows straightforward separation of the insert from the backbone. The invention also relates to backbones for use in such a method, and to plasmids and kits comprising such backbones.

BACKGROUND ART

Some uses of polynucleotides such as DNA require that a DNA fragment of interest is preserved and purified while other fragments are not needed and therefore are to be discarded. This can be the case when high purity polynucleotides are required, or when high efficiency of polynucleotide handling is required where contaminations would reduce handling efficiency. Separation of polynucleotides with a desired sequence from undesired polynucleotides is an essential, common process that is routinely carried out in molecular biology. Typically a fragment of interest (FOI) is present in a vector which is propagated in a bacterium. When this FOI is needed for later use, it needs to be separated from the remainder of the vector, which is generally a bacterial sequence. This time consuming effort requires molecular cloning activities, and is required to optimize the results of any follow-up experiment carried out with the purified polynucleotide.

In conventional purification of an insert from a vector, typically, restriction enzymes are used that allow the polynucleotide to be digested resulting in two fragments: a desired fragment and an unwanted fragment. After the actual digestion reaction has been carried out, the reaction mixture is loaded on an agarose gel to separate the fragments based on their size-determined difference in migration, and the desired fragment is subsequently collected from the agarose gel by cutting out the proper gel piece. The insert is then purified from the agarose gel material by centrifugation and precipitation, often using specific gel-dissolving solutions. While it is a routine process, this protocol is cumbersome and time consuming, which can lead to lower yields of desired fragments than theoretically possible. Additionally, preparation of desired polynucleotide often is further complicated when the size difference between the desired fragment and the undesired fragment is small, for in that case a more specific digestion protocol needs to be developed and carried out. Thus there is a need for a system that limits the amount of steps.

Besides common cloning activities, large scale polynucleotide isolations also often require removal of undesired polynucleotide fragments. For instance, for gene therapy applications significant amounts of DNA are desired from which part of the plasmid is removed out of safety concerns (antibiotic resistance markers [New Generation of Plasmid Backbones Devoid of Antibiotic Resistance Marker for Gene Therapy Trials. G Vandermeulen et al., Mol Therapy 2011 19, 1942-1949.], induced inflammatory responses [An araC-controlled bacterial cre expression system to produce DNA minicircle vectors for nuclear and mitochondrial gene therapy. BW Bigger et al., J Biol Chem. (2001) 276, 23018-23027.]), or because it negatively affects gene performance. Thus extensive research has been devoted to develop DNA material in which parts of a plasmid are removed. For example the resistance marker can be removed (see above Vandermeulen et al,) or both the resistance marker(s) as well as the genetic material that is essential to produce the plasmid in a microorganism can be removed. DNA fragments devoid of bacterial selection markers and/or all bacterial backbone sequences also are known to improve the expression of the eukaryotic gene that is to be expressed in a cultured mammalian host cell.

Currently, specific bacterial cell hosts are used to generate miniplasmid DNA. Following the production of a plasmid it is opened inside the cell with a specific enzyme. After removal of undesired sequences it is recicularised to form a miniplasmid. The DNA that is obtained after opening the bacterial cells needs to be purified from original full size plasmids and DNA debris. Combining efficient in vitro isolation of a desired DNA fragment with degradation and elimination of the backbone offers a simplification and an improvement of the process.

An improved method for separating polynucleotide fragments of interest from unwanted sections of polynucleotide is highly desired, for instance to facilitate isolation of an insert from a vector backbone. Polynucleotides for use in such improved methods are also desired.

SUMMARY OF THE INVENTION

The invention relates to a backbone for use in a vector, primed to allow the backbone to be degraded into small fragments by using cleavage means (e.g. restriction enzymes), while leaving the insert of the vector intact. The cleavage sites in the backbone are separated in such a way that the backbone is divided into small fragments. Such cleavage sites are not present in the insert. As a result, treatment of the vector backbone with for example the appropriate restriction enzymes will leave the insert as the sole polynucleotide fragment of considerable length. This enables easy separation between the desired fragment and the undesired backbone debris.

Accordingly, in a first aspect the invention provides a method for separating a polynucleotide insert from a polynucleotide vector backbone, the method comprising the steps of
  i) providing a recombinant polynucleotide vector comprising the insert and the vector backbone, wherein the vector backbone comprises a first plurality of cleavage sites that divide the vector backbone into fragments having a length of at most 1000 bp;
  ii) contacting the recombinant vector with cleavage means capable of specifically cleaving the first plurality of cleavage sites to produce backbone fragments; and optionally,
  iii) separating the insert from the backbone fragments of step ii).

In preferred embodiments the separation of step iii uses a technique selected from a spin column, a size exclusion column, and solid phase reversible immobilization (SPRI). In preferred embodiments the cleavage means are selected from the group consisting of a restriction enzyme, an RNA-guided DNA endonuclease enzyme, a sequence-specific nuclease, sequence-specific ultrasonication, a sequence-specific oxidative small molecule such as bleomycin, and a sequence-specific hydrolyzing small molecule such as a lanthanide complex. In more preferred embodiments the cleavage sites are restriction endonuclease recognition sites. Preferably, the cleavage means comprise 3, 2, or 1 species of restriction enzymes, preferably wherein the restriction enzyme recognizes a restriction site of 6 or 7 nucleotides, more preferably selected from the group consisting of BstZ17I and MluI. Preferably, the insert does not comprise a cleavage site of the first plurality of cleavage sites. Preferably, the vector backbone further comprises a polynucleotide encoding a functional selection marker, wherein the polynucleotide encoding a functional selection marker is preferably selected from SEQ ID NOs: 14-18, 79, and 110-116, or from a polynucleotide encoding a selection marker selected from SEQ ID NOs: 69, 70, and 81-88. Preferably, the fragments have a length of at most 900, 800, 700, 650, 600, 550, 500, 450, 400, 350, 300, 250, 200, 150, or 100 bp or less, preferably of at most 550 bp, such as about 500 bp. In preferred embodiments is provided the method wherein the vector backbone comprises a multiple cloning site that does not comprise a cleavage site of the first plurality of cleavage sites.

In a second aspect is provided a polynucleotide vector backbone as defined in the first aspect. Preferably, the vector backbone has at least 70% sequence identity with any one of SEQ ID NOs: 68 and 80. In preferred embodiments is provided a recombinant polynucleotide vector comprising a polynucleotide insert and a polynucleotide vector backbone as defined above.

In a third aspect is provided a method for amplifying a polynucleotide of interest, the method comprising the steps of: i) providing a recombinant polynucleotide vector comprising the polynucleotide of interest as an insert, and a vector backbone according to the second aspect; ii) amplifying the recombinant polynucleotide vector of step i) by transforming a suitable microorganism with it, and culturing said transformed microorganism in a culture medium under conditions suitable for vector amplification to obtain amplified recombinant polynucleotide vector; iii) isolating the amplified recombinant polynucleotide vector from the culture medium of step ii) to obtain isolated amplified recombinant polynucleotide vector; iv) contacting the isolated amplified recombinant polynucleotide vector with cleavage means capable of cleaving the first plurality of cleavage sites to produce backbone fragments; and optionally, v) separating the nucleotide sequence of interest from the backbone fragments of step iv).

In a fourth aspect the invention provides a kit of parts comprising: i) a polynucleotide vector backbone according to the second aspect, and at least one of iia) materials for use in a separation technique as defined in the first aspect, such as spin filters; or iib) cleavage means as defined in the first aspect.

In a fifth aspect the invention provides the use of a polynucleotide vector backbone according to the second aspect for the purification of a polynucleotide insert. In preferred embodiments this use is in a method for enhancing transcription of a nucleotide sequence of interest in a eukaryotic cell, the method comprising the steps of: i) providing a recombinant polynucleotide vector comprising the polynucleotide of interest as an insert, and a vector backbone according to the second aspect; ii) amplifying the recombinant polynucleotide vector of step i) by transfecting it to a suitable microorganism and culturing said microorganism in a culture medium under conditions suitable for vector amplification to obtain amplified recombinant polynucleotide vector; iii) isolating the amplified recombinant polynucleotide vector from the culture medium of step ii) to obtain isolated amplified recombinant polynucleotide vector; iv) contacting the isolated amplified recombinant polynucleotide vector with cleavage means capable of cleaving the first plurality of cleavage sites to produce backbone fragments; v) separating the nucleotide sequence of interest from the backbone fragments of step iv) to obtain an isolated nucleotide sequence of interest; vi) integrating the isolated nucleotide sequence of interest in the genome of a eukaryotic cell, preferably a mammalian cell or an insect cell, to obtain a transgenic cell; vii) culturing the transgenic cell under conditions conducive to expression of the nucleotide sequence of interest.

DESCRIPTION OF EMBODIMENTS

Self-Immolative Polynucleotide Vector Backbone

The invention relates to a backbone that can be used in a vector, which is primed to allow the backbone to be shredded by the use of cleavage means such as restriction enzymes, while leaving the insert (which generally comprises a region of interest) intact. The backbone is divided into small fragments by cleavage sites, which are not present in the insert, and thus the vector backbone is primed for degradation. After cleavage the insert remains as the sole polynucleotide fragment of considerable length, enabling easy separation between the desired fragment and the undesired debris that remains of the vector backbone. The invention is easily implemented without the requirement of additional hardware, and can be practiced in any lab equipped for molecular cloning. The self-immolative backbone can be used in methods for the production of polynucleotide fragments. Such methods can also be used for efficient preparation of specific homology-directed repair (HDR) template DNA in CRISPR/Cas mediated DNA-editing, or for preparation of RNA for use in synthetic biology. Such methods can also be used to prepare (circular) RNA for use in e.g. synthetic biology. The method is easier and faster than existing methods and leads to improved insert yields.

In a first aspect the invention provides a polynucleotide vector backbone, wherein the vector backbone comprises a first plurality of cleavage sites that divide the vector backbone into fragments having a length of at most 1000 bp. Such a polynucleotide vector backbone is referred to herein as a backbone according to the invention. An insert that is intended to be used with the backbone is similarly referred to as an insert for use in the invention; a vector comprising a backbone according to the invention is referred to as a vector according to the invention. Because the backbone can disassemble into fragments, it is reminiscent of synthetic self-immolative polymers that disassemble into monomers when a trigger is provided. While the backbone does not disassemble into monomers, it does disassemble into fragments that are sufficiently small to be easily disposed of. For ease of reference, sequences of polynucleotide that together constitute a single fragment (that is: a discrete molecule) after degradation are also referred to as a fragment when the intact backbone is discussed (that is: when the fragments are still joined in the backbone). It will be apparent from context whether a fragment refers to a discrete polynucleotide molecule that is a degradation product of a backbone according to the invention, or whether it refers to a polynucleotide sequence in between two cleavage sites in the intact backbone. FIG. 1 illustrates this aspect.

A vector, sometimes referred to as a plasmid, is herein understood to mean a man-made, or recombinant, nucleic acid molecule resulting from the use of recombinant polynucleotide technology, and which for example can be used to deliver exogenous DNA into a host cell. As used herein, "vector" and "recombinant vector" are used interchangeably as non-recombinant vectors are not part of the invention. Vectors are preferably circular, and usually comprise further genetic elements to facilitate their use in molecular cloning, such as for example selectable markers, multiple cloning sites, et cetera. A vector is said to be recombinant when it comprises sequences that originally derive from different sources, such as from different organisms. The vector is a polynucleotide, which means that it can be DNA or RNA. Because it is more convenient to use in practice, in preferred embodiments the polynucleotide is DNA.

A vector is generally used to either amplify a specific sequence of interest, or to isolate, identify, and express a sequence of interest, or to express one. The vector is then designed around this sequence of interest, with said sequence being referred to as an insert, and with the remainder of the vector being referred to as the backbone of the vector. Often the insert in a plasmid represents exogenous DNA while the backbone of the plasmid facilitates its use and multiplication. This is known to a skilled person. In general, a vector consists of a backbone (which is responsible for functionality in that it harbours features such as a selection marker or a multiple cloning site or an origin of replication) and an insert, which is the polynucleotide that comprises the sequence of interest. It can for example encode a gene of interest. However, some vectors do not comprise an insert. For example, for production of the backbone it is convenient to amplify a plasmid consisting only of the backbone. This is often referred to as an empty vector. Through standard cloning techniques an insert can be incorporated, for example in the multiple cloning site. Because of this close interrelation, any reference to a vector can also be read as a reference to the backbone of that vector, and conversely any reference to a backbone can be read as a reference to a vector, particularly to an empty vector, such as shown in FIG. 2.

Many vectors and their accompanying backbones are known in the art, and are commercially available. A vector may for example be part of a recombinant viral vector for expression of a protein in a plant or plant cell (e.g. a vector derived from cauliflower mosaic virus, CaMV, or tobacco mosaic virus, TMV) or in a mammalian organism or mammalian cell system (e.g. a vector derived from Moloney murine leukemia virus (MMLV), a Retrovirus, a Lentivirus, an Adeno-associated virus (AAV) or an adenovirus (AdV)). Accordingly a preferred backbone is a viral backbone, such as a CaMV, TMV, MMLV, retroviral, lentiviral, AAV, or AdV backbone. In preferred embodiments of this aspect, the backbone according to the invention is comprised in a recombinant polynucleotide vector; accordingly, in preferred embodiments the invention provides a recombinant polynucleotide vector comprising a polynucleotide insert and a backbone according to the invention. More preferred embodiments consist of such a backbone and such an insert. It is to be understood that when a vector is said to consist of a given set of elements, this does not imply that some short linker sequences or individual base pairs, for example vestiges from a cloning process, cannot be present at all; rather it is to be understood that a vector consisting of specific elements does not comprise any substantial further elements.

Examples of suitable backbones according to the invention are shown in the examples and provided in SEQ ID NOs: 68 and 80. Examples of suitable backbones that can be modified by introduction of cleavage sites, thus forming backbones according to the invention, are provided in SEQ ID NOs: 1-6. A skilled person knows that silent mutations can be made in such backbones, leading to identical or substantially identical functionality; and that rearrangement of functional units within the backbone can be made, or that individual units can be inverted, or that one functional unit such as a marker can be replaced by a different functional unit of the same type such as a different marker, or combinations of any of these changes. Therefore, in preferred embodiments is provided a polynucleotide vector backbone according to the invention, wherein the vector backbone has at least 70%, 75%, 80%, 85%, 90%, 91%, 92%, 93%, 94%, 95%, 96%, 97%, 98%, 99%, or 100% sequence identity with any one of SEQ ID NOs: 1-6, 68, and 80, preferably 68 and 80; preferably having at least 90%, 91%, 92%, 93%, 94%, 95%, 96%, 97%, 98%, 99%, or 100% sequence identity with any one of SEQ ID NOs: 1-6, 68, and 80, preferably 68 and 80; more preferably having at least 95%, 96%, 97%, 98%, 99%, or 100% sequence identity with any one of SEQ ID NOs: 1-6, 68, and 80, preferably 68 and 80; most preferably having at least 98%, 99%, or 100% sequence identity with any one of SEQ ID NOs: 1-6, 68, and 80, preferably 68 and 80.

To prevent its degradation, it is preferred that the insert in such a vector not have a cleavage site that is involved in the immolation of the backbone, accordingly, in preferred embodiments is provided a recombinant polynucleotide vector comprising a polynucleotide insert and a backbone according to the invention, wherein the insert does not comprise a cleavage site of the first plurality of cleavage sites; more preferably the insert does not comprise a species of cleavage site of the first plurality of cleavage sites.

Cleavage Sites, Cleavage Means, and Fragments

To enable its use, the backbone according to the invention has a first plurality of cleavage sites. A cleavage site is a well-defined region of the backbone that can be cleaved by controlled means. A very common example of a cleavage site is a restriction site. Many such cleavage sites are known in the art. A cleavage site is often a particular short sequence, and can be cleaved, for example hydrolyzed, by a cleavage means. For example, a restriction site of six nucleotides in length can be recognized for example by its recognition sequence, and then cleaved by a restriction enzyme. As is known in the art, this cleavage can be inside the recognition site, or at one of its extremes, or even one or two or more nucleotides away from the site. As is known, a cleavage site can in some cases be non-contiguous, as for example is the case for restriction enzyme AccB7I, which recognizes CCA directly followed by any five nucleotides, directly followed by TGG; such a cleavage site has a restriction recognition site of six defined nucleotides, yet it is a cleavage site of 11 nucleotides in length. The cleavage means recognizes the cleavage site (most preferably because of a recognition sequence) and for example causes a double-stranded chain break, cutting the polynucleotide at the cleavage site. Of course, a cleavage site can be such that the actual chain break is at an area outside the actual recognition sequence, but it is common to still refer to cleavage induced by such a site as "cleavage of that site". Each cleavage site has its associated cleavage means. A cleavage site preferably has a length of at least 3, 4, 5, or 6 nucleotides, more preferably at least 4, most preferably at least 5 nucleotides. A cleavage site preferably has a recognition sequence that has a length of at least 3, 4, 5, or 6 nucleotides, more preferably at least 4, even more preferably at least 5, most preferably at least 6 nucleotides. A cleavage site or a recognition sequence preferably has a length of at most 20 nucleotides, more preferably at most 15, even more preferably at most 10, still more preferably at most 9, still more preferably at most 8 nucleotides.

Types of cleavage site, such as restriction sites, can have multiple species, such as restriction sites that are recognized by different restriction enzymes. Another example is that the type of cleavage site that is RNA-guided DNA endonuclease recognition sites, has multiple species of cleavage site, such as cleavage sites that are recognized by RNA-guided DNA endonuclease enzymes comprising different guide RNAs.

In preferred embodiments, the cleavage means are selected from the group consisting of restriction enzymes, RNA-guided DNA endonuclease enzymes, sequence-specific nucleases, sequence-specific ultrasonication, sequence-specific oxidative small molecules such as bleomycin, and sequence-specific hydrolyzing small molecules such as lanthanide complexes. More preferred cleavage means are selected from the group consisting of restriction enzymes, RNA-guided DNA endonuclease enzymes, and sequence-specific nucleases. Restriction enzymes are most preferred. Accordingly, in preferred embodiments is provided a backbone according to the invention, wherein the cleavage sites from the first plurality of cleavage sites are restriction endonuclease recognition sites.

Restriction enzymes are broadly known in the art and are widely commercially available (see e.g. Loenen et al., Nucleic Acids Res. 2014 42(1): 3-19 DOI: 10.1093/nar/gkt990). They are also known as restriction endonucleases. A restriction enzyme or restriction endonuclease is an enzyme that cleaves polynucleotides such as DNA into fragments at or near a specific recognition site. A restriction site, or restriction recognition site, or a restriction endonuclease recognition site, is a location on a DNA molecule containing a specific sequence of nucleotides, typically 4-8 base pairs in length and often palindromic, that is recognized by a restriction enzyme. Preferred restriction sites are non-contiguous restriction sites because they allow non-defined nucleotide positions; in preferred embodiments, the first plurality of cleavage sites comprises at least one non-contiguous restriction site. Examples of restriction enzymes are AanI, AarI, AasI, AatI, AatII, AbsI, AccI, AccIII, Acc16I, Acc36I, Acc65I, Acc113I, AccB1I, AccB7I, AccBSI, AciI, AclI, AclWI, AcoI, AcsI, AcuI, AcvI, AcyI, AdeI, AfaI, AfeI, AfiI, AflIII, AgeI, AhdI, AhlI, AjiI, AjnI, AjuI, AleI, AlfI, AloI, AluI, AluBI, AlwI, Alw21I, Alw26I, Alw44I, AlwNI, Ama87I, Aor13HI, Aor51HI, ApaI, ApaLI, ApeKI, ApoI, AscI, AseI, AsiGI, AsiSI, Asp700I, Asp718I, AspA2I, AspEI, AspLEI, AspS9I, AsuII, AsuC2I, AsuHPI, AsuNHI, AvaI, AvaII, AvaIII, AvrII, AxyI, BaeI, BaeGI, BalI, BamHI, BanI, BanII, BanIII, BarI, BauI, BbeI, BbrPI, BbsI, BbuI, BbvI, Bbv12I, BbvCI, BccI, BceAI, BcgI, BciVI, BciT130I, BclI, BcnI, BcoDI, BcuI, BdaI, BfaI, BfiI, BfmI, BfoI, BfuI, BfuAI, BfuCI, BgII, BgIII, BisI, BlnI, BlpI, BlsI, BmcAI, Bme18I, Bme1390I, Bme1580I, BmeRI, BmeT110I, BmgBI, BmgT120I, BmiI, BmrI, BmrFI, BmsI, BmtI, BmuI, BoxI, BpiI, BpliI, BpmI, Bpu10I, Bpu14I, Bpu1102I, BpuAi, BpuEI, BpuMI, BpvUI, BsaI, Bsa29I, BsaAI, BsaBI, BsaHi, BsaJI, BsaMI, BsaWi, BsaXI, Bsc4I, Bse1I, Bse3DI, Bse8I, Bse21I, Bse118I, BseAI, BseBI, BseCi, BseDI, BseGI, BseJi, BseLi, BseMI, BseMII, BseNI, BsePI, BseRI, BseSI, BseXI, BseX3I, BseYI, BsgI, BshVI, Bsh1285I, BshFI, BshNI, BshTI, BsiEI, BsiHKAI, BsiHKCI, BsiSI, BsiWI, BsiYI, BslI, BsIFI, BsmI, BsmAI, BsmBI, BsmFI, BsnI, Bso31I, BsoBI, Bsp13I, Bsp19I, Bsp68I, Bsp119I, Bsp120I, Bsp143I, Bsp1286I, Bsp1407I, Bsp1720I, BspACI, BspCNI, BspDI, BspEI, BspHI, BspLI, BspLU11I, BspMI, BspOI, BspPI, BspQI, BspTI, BspT104I, BspT107I, BspTNI, BspXI, BsrI, BsrBI, BsrDI, BsrFI, BsrGI, BsrSI, BssAI, BssECI, BssHII, BssKI, BssMI, BssNI, BssNAI, BssSaI, BssT1I, Bst2BI, Bst2UI, Bst4CI, Bst6I, Bst1107I, BstACI, BstAPI, BstAUI, BstBI, BstBAI, BstC8I, BstDEI, BstDSI, BstEII, BstENI, BstF5I, BstH2I, BstHHI, BstHPI, BstKTI, BstMAI, BstMBI, BstMCI, BstMWI, BstNI, BstNSI, BstOI, BstPI, BstPAI, BstSCI, BstSFI, BstSLI, BstSNI, BstV1I, BstV2I, BstXI, BstX2I, BstYI, BstZI, BstZ17I, Bsu15I, Bsu36I, BsuRI, BsuTUI, BtgI, BtgZI, BtrI, BtsCI, BtsIMutI, BtsaI, BtuMI, BveI, Cac8I, CaiI, CciI, CciNI, CeIi, CfoI, CfrI, Cfr9I, Cfr10I, Cfr13I, Cfr42I, ClaI, CpoI, CsiI, CspI, Csp6I, Csp45I, CspAI, CspCI, CviJI, CviKI-1, CviQI, DdeI, DinI, DpnI, DpnII, DraI, DraII, DraIII, DrdI, DriI, DseDI, EaeI, EagI, Eam1104I, Eam1105I, EarI, EciI, Ecl1361I, EclXI, Eco24I, Eco31I, Eco32I, Eco47I, Eco47II, Eco52I, Eco53kI, Eco57I, Eco57MI, Eco72I, Eco81I, Eco88I, Eco91I, Eco105I, Eco130I, Eco147I, EcoICRI, EcoNI, EcoO65I, EcoO109I, EcoO15I, EcoRI, EcoRII, EcoRV, EcoT14I, EcoT22I, EcoT38I, EgeI, EheI, Erhi, Esp3I, FalI, FaqI, FauI, FauNDI, FbaI, FbII, Fnu4HI, FokI, FriOI, FseI, Fsp4HI, FspI, FspAI, FspBI, GlaI, GluI, GsaI, GsuI, HaeII, HaeIII, HapII, HhaI, Hin1I, Hin4I, Hin6I, HincII, HindII, HindIII, HinfI, HinP1I, HpaI, HpaII, HphI, Hpy8I, Hpy99I, Hpy166II, Hpy188I, Hpy188III, HpyAV, HpyCH4III, HpyCH4IV, HpyCH4V, HpyF3I, HpyF10VI, Hsp92I, HspAI, I-CeuI, I-PpoI, I-SceI, ItaI, KasI, KflI, KpnI, Kpn2I, KspI, Ksp22I, Ksp632I, KspAI, Kzo9I, LguI, Lsp109I, LweI, MabI, MaeI, MaeII, MaII, MamI, MauBI, MbiI, MboI, MboII, MfeI, MflI, MhII, MlsI, MluI, MluCI, MluNI, MlyI, Mly113I, MmeI, MnII, Mph1103I, MreI, MroI, MroNI, MroXI, MscI, MsII, MspI, Msp20I, MspA1I, MspR9I, MssI, Muni, MvaI, Mva1269I, MwoI, NaeI, NarI, NciI, NcoI, NdeI, NdeII, NgoMIV, NheI, NlaIV, NmeAIII, NotI, NruI, NsbI, NsiI, NspI, NspV, OliI, PacI, PaeI, PaeR7I, PagI, PalAI, PasI, PauI, PceI, PciI, PciSI, PctI, PdiI, PdmI, PfeI, Pfl231I, PfIMI, PfoI, PhoI, PI-PspI, PI-SceI, PinAI, PleI, Ple19I, PluTI, PmaCI, PmeI, PmlI, PpiI, PpsI, Ppu21I, PpuMI, PscI, PshAI, PshBI, PsiI, Psp5II, Psp6I, Psp124BI, Psp1406I, PspCI, PspEI, PspFI, PspGI, PspLI, PspN4I, PspOMI, PspPI, PspPPI, PspXI, PsrI, PstI, PsuI, PsyI, PteI, PvuI, PvuII, RcaI, RgaI, Rigi, RruI, RsaI, RsaNI, RseI, RsrII, Rsr2I, SacI, SacII, SalI, SanDI, Sapi, Sati, Sau3AI, Sau96I, SbfI, ScaI, SchI, ScrFI, SdaI, SduI, SetI, SexAI, SfaAI, SfaNI, SfcI, SfiI, SfoI, Sfr274I, Sfr303I, SfuI, SgfI, SgrAI, SgrBI, SgrDI, SgsI, SinI, SlaI, SmaI, SmiI, SmiMI, SmoI, SmuI, SnaBI, SpeI, SphI, SrfI, Sse9I, Sse8387I, SseBI, SsiI, SspI, SspBI, SspDI, SstI, SstII, StuI, StyI, StyD4I, SwaI, TaaI, TaiI, TaqI, TaqII, TaqaI, TasI, TatI, TauI, TfiI, TliI, TscAI, TseI, TsoI, Tsp509I, TspDTI, TspEI, TspGWI, TspMI, TspRI, TstI, Van91I, VneI, VpaK11BI, VspI, XagI, XapI, XbaI, XceI, XcmI, XhoI, XhoII, XmaI, XmaCI, XmaJI, XmiI, XmnI, XspI, ZraI, ZrmI, Zsp2I, and their isoschizomers or neoschizomers. Preferred restriction enzymes are endonucleases that recognise a DNA sequence, more preferably a DNA sequence of at least 6 nucleotides, even more preferably at least 6 or 7 nucleotides. Preferred restriction enzymes recognize a site of at most 7 nucleotides, more preferably of at most 6 nucleotides. Preferred restriction enzymes are not sensitive to methylation. Preferred restriction enzymes do not show star activity, more preferably do not show star activity under conditions used for the method according to the invention, even more preferably do not show star activity when no organic solvent is present, the ionic strength of the reaction buffer is at least 100 mM, and the pH of the reaction buffer is at most 7.6, most preferably do not show star activity at all. Restriction enzymes that do not see frequent use in routine cloning are very convenient because they would not interfere with common cloning processes involving a backbone according to the invention. Accordingly highly preferred restriction enzymes recognize at least 6 or 7, preferably 6 nucleotides and are not AgeI, BamHI, BssHII, DraI, EagI, EcoRI, EcoRV, HindIII, NcoI, PstI, PvuI, SalI, XbaI, XhoI, or XmaI, more preferably not AgeI, BamHI, BbsI, BfuAI, BglII, BsaI, BsmBI, BssHII, DraI, EagI, EcoRI, EcoRV, HindIII, NcoI, PstI, PvuI, SalI, XbaI, XhoI, or XmaI. Most preferred restriction enzymes for degrading the backbone according to the invention are BstZ17I and MluI.

A cleavage means can also be an RNA-guided DNA endonuclease enzyme, as used in the CRISPR/Cas technology and referred to hereinafter as a Cas endonuclease. A preferred Cas endonuclease is a Cas9 endonuclease. This technology is generally known, see for example Khan et al., Journal of Biomedical Science, 2018, 25:29, DOI: 10.1186/s12929-018-0425-5. A Cas endonuclease is guided by an RNA having any sequence of choice, and will cleave any cleavage site that its guide RNA points it to. This makes Cas endonucleases very versatile for cleaving a backbone according to the invention. Other Cas and Cas-like proteins can be used as well as different protospace adjacent motifs (PAMs).

Any other sequence-specific nuclease can be used to cleave its associated sequence. Zinc finger nucleases and TALEN belong to this group. An advantage of using restriction enzymes is their high fidelity of sequence specificity. Restriction enzymes have known, predictable and reliable specificity and fidelity.

Other suitable cleavage means are sequence-specific ultrasonication (see Grokhovsky et al., Biophys J. 2011; 100(1): 117-125; DOI: 10.1016/j.bpj.2010.10.052), a sequence-specific oxidative small molecule such as bleomycin or a modified porphyrin (see for example Van Dongen et al., Nature Chem. 5, p. 945-951 (2013) DOI: 10.1038/nchem.1752), and a sequence-specific hydrolyzing small molecule such as a lanthanide complex (see for example Hall et al., Nucleic Acids Res. 1996; 24(18): 3522-3526. PMID: 8836177). More preferred cleavage means are selected from the group consisting of a restriction enzyme, an RNA-guided DNA endonuclease enzyme, and a sequence-specific nuclease. A restriction enzyme is most preferred, for example because of its ready availability and convenient usability.

As mentioned above, a cleavage site is cleaved by its associated cleavage means. In the context of this document, cleavage is meant to refer to a break in the polynucleotide, which generally means a double-stranded break, as vectors and backbones are preferably double-stranded. In the context of this invention, cleavage refers to the controlled cleavage of a cleavage site, as effected by the associated cleavage means. The cleavage can be a direct double cleavage, leading to blunt ends, or it can be a set of two nicks in opposing strands, the nicks not being separated by more than about 15, preferably 10 nucleotides, leading to sticky ends. As long as adjoining fragments are no longer substantially associated with one another, the cleavage can be considered suitable for use in this invention. In preferred embodiments, cleavage is promoted by an increase in medium temperature or ionic strength, preferably medium temperature. Optionally, in these embodiments, additional agents may be added to increase dissociation of the cleaved fragments. Such agents are known in the art; examples are DMSO and formamide.

The first plurality of cleavage sites is configured to convert the backbone according to the invention to fragments. It is convenient when the cleavage sites in the first plurality can be cleaved in one single reaction step, possibly involving multiple different types or species cleavage means if the plurality comprises different types or species of cleavage sites. For example when the cleavage sites are restriction sites, the degradation can be performed by a mixture of restriction enzymes that can cleave their respective cleavage sites under the same reaction conditions. A mixture of cleavage means is not limited as to how many different cleavage means are comprised, as the invention relates to the degradation of the backbone and not in the details of how this is achieved precisely.

Nonetheless, for convenience it is preferred when the cleavage sites in the first plurality are not very diverse, and are generally of the same type. In preferred embodiments, the cleavage sites in the first plurality can all be cleaved under the same reaction conditions. For this reason, in preferred embodiments, all cleavage sites in the first plurality are restriction sites. In other preferred embodiments, all cleavage sites in the first plurality are recognition sites for an RNA-guided DNA endonuclease enzyme. In other preferred embodiments, all cleavage sites in the first plurality are recognition sites for a sequence-specific nuclease.

When the cleavage sites in the first plurality are all of the same type, it is preferred that the associated cleavage means is similarly of low diversity, and therefore substantially of the same species. For example, for ease of preparation, a mixture of cleavage means preferably comprises at most 5, 4, 3, 2, or 1 species of cleavage means, such as different restriction enzymes or RNA-guided DNA endonucleases with different guide RNAs. Accordingly, in preferred embodiments is provided the backbone according to the invention, wherein the cleavage sites comprise at most 5, 4, 3, 2, or 1 different cleavage sites, preferably at most 3, 2, or 1 different cleavage sites, more preferably at most 2 or 1 different cleavage sites, most preferably only 1 species of cleavage site.

In preferred embodiments, the first plurality of cleavage sites comprises only restriction sites, and comprises no more than 6, 5, 4, 3, 2, or 1, preferably no more than 3, 2, or 1, more preferably no more than 2 or 1, most preferably comprises only 1, species of restriction site, wherein the restriction sites are preferably selected from the group consisting of restriction sites for restriction enzymes as described above, more preferably selected from the group consisting of restriction sites for BssHI, BstZ17I, and MluI, most preferably selected from restriction sites for BstZ17I and MluI.

In preferred embodiments, the first plurality of cleavage sites comprises only recognition sites for an RNA-guided DNA endonuclease enzyme, and comprises no more than 5, 4, 3, 2, or 1, preferably no more than 3, 2, or 1, more preferably no more than 2 or 1, most preferably comprises only 1, species of recognition site.

Degradation of the Backbone

As explained earlier herein, the invention revolves around a backbone that can be degraded into smaller fragments, to allow easy isolation of an insert. The vector backbone is divided into fragments by the cleavage sites from the first plurality. As demonstrated in the examples, the efficiency of size-based separation of polynucleotide fragments depends on the method that is used for this separation. When the size difference between an insert and the fragments is larger, the separation will be easier and/or more complete. When the size difference is smaller, separation can still be performed, but might lose efficiency, for example leading to incomplete separation.

The fragments can have any length and any distribution of lengths. For practical purposes, it is preferred to divide the backbone into fragments having a length of at most 1000 bp, to allow easier separation from relatively small inserts. In preferred embodiments is provided the backbone according to the invention, wherein the fragments have a length of at most 900, 800, 700, 650, 600, 550, 500, 450, 400, 350, 300, 250, 200, 150, or 100 bp or less, preferably of at most 700, 650, 600, 550, 500, 450, 400, 350, 300, 250, 200, 150, or 100 bp or less, more preferably of at most 550 bp, such as of about 500 bp or less. Variation in length by single nucleotides or by ten or fewer nucleotides is not expected to have a substantial effect on the behavior of a fragment, so fragment size is preferably seen as a target size and not as an absolute barrier. The length of a fragment is preferably defined as the length of the resulting fragment after cleavage has been performed. For practival purposes, it is preferred to divide the backbone into fragments having a length of at least 20, 30, 40, 50, 60, 70, 80, 90, 100, 110, 120, 130, 140, 150, 160, 170, 180, 190, 200, 210, 220, 230, 240, or 250 bp, more preferably at least about 100 bp, even more preferably at least about 150 bp, most preferably at least about 200 bp.

In other preferred embodiments, the fragments have a length of at most 40%, 35%, 30%, 25%, 20%, 15%, 10%, or 5% of the length of the insert. For a backbone without an insert, or for an empty vector according to the invention, this can mean that the fragments have a length relative to an intended insert. Length in this context relates to the number of nucleotides.

For ease of use, it is preferable to have fragments that are substantially of the same size. This allows the use of more specialized separation techniques. Accordingly, in preferred embodiments, the fragments have a length distribution wherein the shortest fragment has at least 20%, 25%, 30%, 35%, 40%, 45%, 50%, 55%, 60%, 65%, 70%, 75%, 80%, 85%, 90%, 95%, or 98% of the length of the longest fragment. Of course the insert is not to be considered a fragment, despite its release during fragmentation. In other preferred embodiments, the length difference between the shortest and the longest fragment is no more than 400, 350, 300, 250, 200, 150, 100, 50, or 20 bp, preferably no more than 250 bp.

The application of cleavage means to cleave the first plurality of cleavage sites, leading to fragments, is referred to herein as degradation, immolation, shredding, or cleavage, as will be apparent from context. A polynucleotide sequence that is divided into fragments is referred to herein as a self-immolative sequence, or a degradation-ready sequence, or a sequence primed for degradation.

Possible Functional Elements of the Backbone or of the Insert

The backbone according to the invention and an insert for use in the invention can comprise different polynucleotide elements that each serve a particular function; these are referred to as functional elements. Examples of functional elements are markers, multiple cloning sites, expression enhancing elements, origins of replication, and promoters. Backbone design and vector design are an established field of art, and a skilled person will know how to design a backbone or insert for a particular application.

Marker

In preferred embodiments a backbone according to the invention or an insert for use in the invention comprises a polynucleotide encoding a functional marker, preferably a selection marker, wherein the polynucleotide encoding a functional marker is preferably selected from SEQ ID NOs: 14-18, 79, and 110-116, or from a polynucleotide encoding a marker selected from SEQ ID NOs: 69, 70, 81-88; the polynucleotide encoding the functional marker is preferably in the backbone. The marker is preferably derived from SEQ ID NOs: 7-13.

Selection markers are known in the art. A selection marker, also known as a selectable marker, is a gene that when introduced into a cell, especially a bacterium or to cells in culture, confers a trait suitable for artificial selection. Examples of selection markers are resistance markers that confer resistance to for example antibiotics, and biosynthesis markers that complement auxotrophy, or are used for screening, such as LacZalpha. Preferred selection markers are resistance markers, more preferably antibiotic resistance markers. Suitable antibiotic resistance markers are resistance genes against kanamycin, spectinomycin, streptomycin, ampicillin, carbenicillin, bleomycin, erythromycin, polymyxin B, tetracycline, chloramphenicol, and zeocin. In preferred embodiments, the selection marker provides resistance against an antibiotic selected from the group consisting of zeocin (zeo), chloramphenicol (cam), tetracyclin (tet), streptomycin (str), kanamycin (kan), and ampicillin (amp). In more preferred embodiments, this antibiotic is selected from kanamycin (kan) and ampicillin (amp).

The polynucleotide encoding a functional marker is preferably any one of SEQ ID NOs: 14-18, 79, and 110-116. Such a sequence preferably has 70, 75, 80, 85, 90, 91, 92, 93, 94, 95, 96, 97, 98, 99, or 100% sequence identity with the selected SEQ ID NO, more preferably it has 90, 91, 92, 93, 94, 95, 96, 97, 98, 99, or 100% sequence identity, even more preferably it has 95, 96, 97, 98, 99, or 100% sequence identity, most preferably it has 98, 99, or 100% sequence identity, such as 99% or 100% sequence identity. In more preferred embodiments, the polynucleotide encoding a functional marker is selected from any one of SEQ ID NOs: 14-15. A preferred marker is a marker that comprises at least one cleavage site from the first plurality of cleavage sites.

Alternately, the nucleotide encoding a functional marker encodes a functional marker that is preferably derived from any one of Kan, Amp, Zeo, LacZalpha, and chloramphenicol, more preferably from Kan or Amp. The functional marker is preferably derived from any one of SEQ ID NOs: 7-13. It preferably encodes a polypeptide that has 70, 75, 80, 85, 90, 91, 92, 93, 94, 95, 96, 97, 98, 99, or 100% sequence identity with the selected SEQ ID NO, more preferably it has 90, 91, 92, 93, 94, 95, 96, 97, 98, 99, or 100% sequence identity, even more preferably it has 95, 96, 97, 98, 99, or 100% sequence identity, most preferably it has 98, 99, or 100% sequence identity, such as 99% or 100% sequence identity. In more preferred embodiments, a functional marker is derived from any one of SEQ ID NOs: 7-10 or 13, even more preferably from any one of SEQ ID NOs: 7-8. In this context, a marker derived from an amino acid sequence is preferably a polynucleotide encoding that amino acid sequence.

In another aspect the invention provides a polynucleotide encoding a functional marker as defined above, preferably comprising at least 1, 2, 3, or 4 cleavage sites; for polynucleotides wherein not all mutations relative to the wild-type are silent mutations, the encoded polypeptide is also encompassed by the invention.

A marker has no direct utility when it is not functional. Mutation to established markers may decrease their functionality. However, decreased functionality does not equate lack of functionality. For example, decreased functionality may result in more stringent selection when for example an antibiotic resistance marker is less efficient in its function, effectively conferring less resistance. Such an effect is not necessarily detrimental to the backbone—in fact, it is known that less efficient resistance markers can lead to increased copy number of the plasmid, as more selection marker activity is required to allow cell survival. On the other hand, when a self-immolative resistance marker has an activity that is closer to that of the wild type, its will be easier to use that resistance marker in existing protocols because its behavior will be more predictable. Accordingly, the level of functionality of a selection marker is dependent on the intended use of the backbone. In preferred embodiments, the activity of a self-immolative resistance marker is at least 30, 40, 50, 60, 70, 80, 90, 95, 99, or 100% of that of wild type resistance marker, more preferably at least 70%, even more preferably at least 90%.

Vectors with a marker, or elements for activity selection of a specific sequence, can be easily selected after transfection of the vector. Vectors without a marker can have increase utility in gene therapy, for example as described in WO9605297.

Multiple Cloning Site

A multiple cloning site (MCS) is a sequence in a backbone harbouring a number of recognition sites for restriction enzymes to facilitate cloning of fragments in that vector. This sequence is commonly small (<100 bp) and the recognition site sequences are generally uniquely present in the multiple cloning site, and not found in the rest of the backbone or the fragment of interest to be cloned (the insert). Multiple coning sites are commonly known in the art. Preferred MCS have a length of at most 300, 250, 200, 190, 180, 170, 160, 150, 140, 130, 120, 110, 100, 90, 80, 70, or fewer bp. Preferred MCS comprise about 4-30, 6-25, 8-20, 10-15 restriction sites.

In preferred embodiments is provided the vector backbone according to the invention, wherein the vector backbone comprises a polynucleotide encoding a multiple cloning site. An MCS can also be in an insert for use in the invention; this can be advantageous when amplification of the polynucleotide encoding the MCS is required. Preferably, a multiple cloning site does not comprise a cleavage site of the first plurality of cleavage sites, and/or comprises at least one restriction site that is not in the first plurality of cleavage sites. This allows use of the MCS without triggering immolation of the backbone. A preferred MCS comprises a BssHII restriction site. BssHII is compatible with MluI which is a preferred cleavage means for triggering immolation. Conversely, a cleavage site present in an MCS can be used to help divide the backbone into smaller fragments, when a restriction enzyme recognizing that cleavage site is used as additional cleavage means for immolation. Preferably, the MCS comprises restriction sites for restriction enzymes that can be used under the same reaction conditions as the cleavage means. This allows exact liberation of the insert simultaneous with immolation, which improves control over the insert that can be obtained after immolation.

In preferred embodiments, the backbone according to the invention comprises a polynucleotide encoding an MCS that shares at least 80%, more preferably at least 90%, most preferably at least 98% or 100% sequence identity with SEQ ID NO: 19. More preferably, the backbone according to the invention comprises a polynucleotide encoding an MCS that comprises the same restriction sites as SEQ ID NO: 19. In preferred embodiments, the backbone according to the invention comprises a polynucleotide encoding an MCS with recognition sites for restriction enzymes as described above, preferably for restriction enzymes that recognise six or seven nucleotides. It is preferred when recognition sites are for enzymes that result in the same overhang as any restriction enzymes in the first plurality of cleavage means. An example is BssHII, MauBI and AscI when MluI is in the first plurality.

A backbone can have an MCS when it is to be used with any type of insert, in which case the MCS allows tailored selection of a restriction enzyme for insertion of an insert into the plasmid. A backbone that is designed for use with only a single insert, or with an insert that is always inserted using the same restriction enzyme, does not need an MCS.

Promoter

In preferred embodiments the backbone according to the invention or the insert for use in the invention comprises a promoter, preferably a promoter that is configured to be operably linked to a sequence of interest in the insert, or to a nucleotide sequence encoding a marker as defined earlier herein. Accordingly, the promoter can be configured to be operably linked to a sequence that is not present in the backbone itself, when no insert is present. Promoter refers to a nucleic acid sequence, located upstream or 5' to a translational start codon of an open reading frame (or protein-coding region) of a gene or to a nucleic acid sequence that functions to control the transcription of DNA, and that is involved in recognition and binding of RNA polymerase II and other proteins (trans-acting transcription factors) to initiate transcription. The term promoter refers to a nucleic acid fragment that functions to control the transcription of one or more nucleic acid sequences, located upstream with respect to the direction of transcription of the transcription initiation site of the sequence, and is structurally identified by the presence of a binding site for DNA-dependent RNA polymerase, transcription initiation sites and any other DNA sequences, including, but not limited to transcription factor binding sites, repressor and activator protein binding sites, and any other sequences of nucleotides known to one skilled in the art to act directly or indirectly to regulate the amount of transcription from the promoter. The promoter does not include the transcription start site (TSS) but rather ends at nucleotide −1 of the transcription site, and does not include nucleotide sequences that become untranslated regions in the transcribed mRNA such as the 5'-UTR. Promoters suitable for use in a backbone according to the invention may be tissue-specific, tissue-preferred, cell-type specific, inducible and constitutive promoters. Tissue-specific promoters are promoters which initiate transcription only in certain tissues or within certain cells of that tissue. Expression in a tissue-specific manner may be only in individual tissues or in combinations of tissues. Tissue-preferred promoters are promoters that preferentially initiate transcription in certain tissues. Cell-type-specific promoters are promoters that primarily drive expression in certain cell types. Inducible promoters are promoters that are capable of activating transcription of one or more DNA sequences in response to an inducer. The DNA sequences will not be transcribed when the inducer is absent or when an inhibitor is present, such as for the Tet-off promoter. Activation of an inducible promoter is established by application of the inducer or by absence of the inhibitor. Constitutive promoters are promoters that are active under many environmental conditions and in many different tissue types. Preferably, capability to initiate transcription is established in an expression system using an expression construct comprising said promoter operably linked to a nucleotide sequence of interest using a suitable assay such a RT-PCR or Northern blotting. A promoter is said to be capable to start transcription if a transcript can be detected or if an increase in a transcript level is found of at least 5%, 10%, 15%, 20%, 30%, 40%, 50%, 60%, 70%, 80%, 90%, 100%, 200%, 300%, 500%, 1000%, 1500%, 2000%, 4000%, 8000%, 16000%, or more as compared to transcription using a construct which only differs in that it is free of said promoter. In a further preferred embodiment, capability to initiate expression is established in an expression system using an expression construct comprising said promoter operably linked to a nucleotide sequence encoding a protein or polypeptide of interest. Preferably, said protein or polypeptide of interest is a secreted protein or polypeptide and expression of said protein or polypeptide of interest is detected by a suitable assay such as an ELISA assay, Western blotting or, dependent on the identity of the protein or polypeptide of interest, any suitable protein identification and/or quantification assay known to the person skilled in the art. Absent expression-suppressing factors, a promoter is said to be capable to initiate expression if the protein or polypeptide of interest can be detected or if an increase in an expression level is found of at least 5%, 10%, 15%, 20%, 30%, 40%, 50%, 60%, 70%, 80%, 90%, 100%, 200%, 300%, 500%, 1000%, 1500%, 2000%, 4000%, 6000%, or 10000% as compared to expression using a construct which only differs in that it is free of said promoter. A promoter is preferably configured to be operably linked to a polynucleotide sequence comprised in the insert.

Examples of promoters suitable for use in a backbone according to the invention are constitutive promoters or inducible promoters, preferably inducible promoters. In preferred embodiments the backbone according to the invention of the insert for use in the invention comprises a polynucleotide sequence encoding Lac promoters, trp, tac, Bla promoter, chloramphenicol resistance promoter (Pcat), phage promoters such as Lambda promoters P1, P5, P22 and Pr, P2, pPrpB, pTetO, and hybrid promoters such as lac-trp, Tac (lactose/IPTG inducible), alcB, T7, LacO, araBAD, pBAD (arabinose inducible, glucose repressible), pTrc, hybrid of trp and lac promoters (Lactose/IPTG inducible), *bacillus subtilus* promoters, Pspac, SacB system promoters, P43, M13K07 genes 1-8 promoters, promoters active in mammalian cells such as CMV, SV40, EF1a, CAG (Eukaryotic promoter database (EPD), available at epd.vital-it.ch/index.php); other promoters such as UAS, PolII (H1/U6), MT, unc-54, Polyhedrin, SP6, TMV, plant promoters used in plants such as CaMV, 35S, Ubiquitin, Actin, Lat52, PR1a, PR2d, synthetic plant promoters (W. Liu and C. N. Steward, Current Opinion in Biotechnology 2016, 37:36-44), promoters active in yeast such as Gal4, AOX, PGK, ADH1, ADE2, TRP1.

Preferred promoters can be used to clone, identify and/or isolate fragments of interest. They include promoters involved in expression of markers as well as promoters involved of expression of gene sequence of the sequence of interest. Promoters include viral, archaeal, prokaryotic and eukaryotic promoters. Preferably bacterial, fungal, plant, insect or animal promoters, more preferably promoters known in the art used for cloning fragments of interest, like Lac promoters, or promoter useful for activity cloning or expression cloning (viral, archaeal, prokaryotic, eukaryotic).

More preferred promoters are Bla, T7, Pcat, pBAD, hybrid promoters, SP6, AOX, ADH, GAL, TRP1, CMV EF1a, and SV40; most preferred promoters are Bla, T7, Pcat, hybrid promoters, SP6, AOX, ADH, GAL, CMV, and SV40. A highly preferred promoter is a promoter that comprises at least one cleavage site from the first plurality of cleavage sites.

Vectors with a promoter that is configured to be operably linked to an insert can readily express a polynucleotide sequence encoded on that insert. Vectors that are intended for use solely in insert amplification have no use for a promoter and are more efficiently amplified when no such excess sequence is present.

Origin of Replication

An origin of replication (also called the replication origin, or Ori) is a particular sequence in a genome, a plasmid, or a vector at which replication is initiated. This can either involve the replication of DNA in living organisms such as prokaryotes and eukaryotes, or that of DNA or RNA in viruses, such as double-stranded RNA viruses. Oris can vary between organisms. They commonly feature a distinctive region containing a higher than average number of adenine and thymine residues (the AT-rich region) where, during the process of replication initiation, the initial destabilization (opening) of the double helix takes place.

In preferred embodiments, the backbone according to the invention comprises a polynucleotide that encodes a functional Ori, preferably wherein the Ori comprises at least one cleavage site from the first plurality of cleavage sites, or wherein preferably the Ori is immediately preceded and followed by a cleavage site from the first plurality of cleavage sites. This allows fragmentation of the Ori, or its immolation into a distinct fragment that is sufficiently small to allow practice of the invention. Accordingly, when the Ori has a length more than the desired size of degraded fragments, such as more than 1000 bp, it should contain a cleavage site from the first plurality; if not, it can be preceded and followed by such a cleavage site to allow efficient fragmentation of the backbone comprising such an Ori.

A functional Ori as used herein is an Ori that allows replication of a vector it is comprised in. Functionality of an Ori is preferably expressed as a percentage, wherein the percentage represents the relative copy number at which a vector is maintained when comprising a mutated Ori as compared to the copy number of a vector comprising that Ori it is derived from, such as the wildtype Ori, or such as the Ori as it is known in the art. Preferably, a functional Ori allows a plasmid to be maintained at a copy number that is at least about 0.01% of the copy number that would be achieved with the Ori it is derived from, preferably under conditions as described in the examples. More preferably, the copy number is at least 0.1%, 1%, 5%, 10%, 25%, 50%, 75%, 80%, 85%, 90%, 95%, or 100%. Even more preferably, the copy number is at least 5%, 10%, 25%, 50%, 75%, 80%, 85%, 90%, 95%, or 100%; still more preferably it is at least 10%, 25%, 50%, 75%, 80%, 85%, 90%, 95%, or 100%.

In preferred embodiments, the copy number in pSC is at least 3, 4, or 5, more preferably at least 5. In preferred embodiments, the copy number in pMB is at least 10, 11, 12, 13, 14, or 15, more preferably at least 15. In preferred embodiments, the copy number in pUC is at least 350, 400, 450, or 500, more preferably at least 500. In preferred embodiments, the copy number in *E. coli* is at least 3, 4, or 5, more preferably at least 5; this is preferable for backbones derived from pSC. In preferred embodiments, the copy number in *E. coli* is at least 10, 11, 12, 13, 14, or 15, more preferably at least 15; this is preferable for backbones derived from pMB. In preferred embodiments, the copy number in *E. coli* is at least 350, 400, 450, or 500, more preferably at least 500; this is preferable for backbones derived from pUC.

The polynucleotide encoding a functional Ori is preferably derived from a yeast, bacterial, or viral Ori, such as from any one of SEQ ID NOs: 20-26. Such a sequence preferably has 70, 75, 80, 85, 90, 91, 92, 93, 94, 95, 96, 97, 98, 99, or 100% sequence identity with the selected SEQ ID NO, more preferably it has 90, 91, 92, 93, 94, 95, 96, 97, 98, 99, or 100% sequence identity, even more preferably it has 95, 96, 97, 98, 99, or 100% sequence identity, most preferably it has 98, 99, or 100% sequence identity, such as 99% or 100% sequence identity. In more preferred embodiments, the polynucleotide encoding a functional Ori has at least 70, 75, 80, 85, 90, 91, 92, 93, 94, 95, 96, 97, 98, 99, or 100% sequence identity with any one of SEQ ID NOs: 27-29, even more preferably from any one of SEQ ID NOs: 27-28. This sequence identity is preferably at least 90%, more preferably at least 95%, still more preferably at least 98%, most preferably 99% or 100%, such as 100%.

A backbone with an Ori is useful for amplification of the backbone or of a vector comprising a backbone and an insert. A backbone without an Ori is useful in gene therapy, or when an Ori is encoded by the (intended) fragment of interest, or in case of preparative PCR.

Expression Enhancing Elements

Specific additional polynucleotide sequences can increase the utility of a backbone according to the invention, or of an insert for use in the invention; particularly, certain polynucleotide sequences can enhance the expression of polypeptides or RNAs encoded by vectors comprising a backbone according to the invention, or of systems into which inserts for use in the invention are inserted after their isolation from a self-immolative backbone. These enhancing polynucleotide sequences are referred to herein as expression enhancing polynucleotides. In preferred embodiments is provided a recombinant polynucleotide vector according to the invention, wherein the backbone according to the invention or preferably the polynucleotide insert (that is: the polynucleotide for use in the invention) comprises an expression enhancing polynucleotide having at least 70% sequence identity with any one of SEQ ID NOs: 30-67. In more preferred embodiments, the expression enhancing polynucleotide has at least 75, 80, 85, 90, 91, 92, 93, 94, 95, 96, 97, 98, 99, or 100% sequence identity with any one of SEQ ID NOs: 30-35, 37, 51-60, 63-65, and 67, even more preferably at least 90%, more preferably still at least 95%, most preferably at least 98%, such as 100%. A preferred expression enhancing element is an expression enhancing element that comprises no cleavage site from the first plurality of cleavage sites.

Examples of expression enhancing polynucleotides are known in the art. For example, EP1432808 discloses SEQ ID NO: 30, which enhances expression of sequences of interest of which it is comprised in the 5'UTR. Another example is WO2012044171, which discloses SEQ ID NO: 31, which enhances expression of sequences of interest of which it is comprised in the 5'UTR. Another example is WO2015102487, which discloses nucleic acid sequences encoding a first promoter, a second promoter, and an optional nucleotide sequence of interest, wherein said first promoter and second promoters are configured to be both operably linked to said optional nucleotide sequence of interest, and wherein said second promoter is an intronic promoter, flanked by a first intronic sequence located upstream of said promoter and a second intronic sequence located downstream of said promoter. Exemplary embodiments of such dual promoter constructs featuring both a conventional promoter and an intronic promoter are represented by SEQ ID NOs: 55-58. Preferred examples of further expression enhancing polynucleotides are SEQ ID NOs: 59-67.

Selection and Design of Functional Elements

Functional elements as described herein often comprise a cleavage site from the first plurality of cleavage sites. This is because the polynucleotides encoding the functional elements can have a size that is larger than the intended size of the fragments. To introduce a cleavage site into a polynucleotide that encodes a polypeptide, it is most convenient to analyze the sequence of the functional element to find sequences that already have high sequence identity with the sequence of an intended cleavage site. For example when it is intended to introduce the cleavage site GAATTC (the restriction recognition site for the restriction endonuclease EcoRI) in a polynucleotide, it is convenient to analyze the polynucleotide for sequences of six nucleotides that already share 3, 4, 5, or all 6 of those nucleotides; preferably that already share 5 or 6 of those nucleotides. When 6 nucleotides are shared, no mutations are required. When 5 nucleotides are shared, only a single mutation is required. For such screening it is convenient to use freely available online tools, such as REBASE (Roberts et al., *Nucleic Acids Research*, 43 D1, 2015, D298-D299, DOI: 10.1093/nar/gku1046), where nucleotide sequences can be compared (blasted) against known restriction enzyme recognition sites.

Conversely, when analysis of a polynucleotide sequence reveals a sequence known to be a possible cleavage site, it can be convenient to consider this cleavage site to be a cleavage site of the first plurality. Use of its associated cleavage means will contribute to fragmentation of the functional element comprising said cleavage site. For example, when a given restriction recognition site is natively present in a marker, introduction of this restriction recognition site in other regions of the backbone according to the invention can facilitate backbone design. Screening of polynucleotide sequences can be done using freely available online tools, such as NEBcutter (Vincze et al., *Nucleic Acids Res.* 31: 3688-3691 (2003)).

It is preferable to introduce a silent mutation that introduces the cleavage site. A silent mutation is a mutation in a polynucleotide that does not alter the encoded polypeptide. Silent mutations are known in the art, and can be made based on the known codon tables.

When no silent mutations can be made, conservative mutations can be made wherein an encoded amino acid residue is mutated to a similar amino acid residue. Conservative mutations are known in the art, and for example preserve residue charge, polarity, or size. Examples of conservative mutations are Arg to Lys, Glu to Asp, Asn to Gln, Gly to Ala, Ser to Thr, Leu to Ile, etc. Non-silent mutations are preferably made in unordered regions of the encoded polypeptide, such as in random coils or close to a terminus such as the N-terminus.

When neither silent nor conservative mutations can be made to introduce a cleavage site, a non-conservative mutation or an insertion of an amino acid residue can be made. Preferred amino acid residues for insertion are small, uncharged amino acid residues such as Ala, Gly, Ser, or Thr, preferably Ala, Ser, or Thr, more preferably Thr. For example, the dipeptide Thr-Arg can be encoded by ACGCGT, which is a recognition site for the MluI restriction endonuclease. Thus, when an encoded polypeptide comprises Arg, insertion of Thr can lead to insertion of a cleavage site, namely the MluI restriction site. Similarly, when an encoded polypeptide comprises Thr, insertion of Arg can lead to insertion of a cleavage site. Insertion of Thr is preferred because it is known in the art that insertion of small, uncharged residues is less likely to disrupt the functionality of a polypeptide. The effect of a mutation, when not a silent mutation, can be assessed using any method known in the art. Examples of mutation planning and assessment are for example given by Morrison and Weiss (2001) "Combinatorial alanine-scanning" *Curr Opin Chem Biol* 5(3): 302-7, DOI: 10.1016/S1367-5931(00)00206-4.

When a cleavage site is to be introduced in a functional element that does not encode a polypeptide, it is preferred to introduce a cleavage site through a mutation that preserves known sequence motifs. For example, a mutation in an AT-rich region preferably introduces either T or A. For example, when a mutation known to be in the stem of a stem-loop region is introduced, it is preferably accompanied by a complementarity-preserving mutation in the base pairing residue at the other arm of the stem.

A skilled person knows how to introduce specific mutations in a polynucleotide, and polynucleotides with custom sequences are commercially available from various contract suppliers. Once a self-immolative functional element or a backbone according to the invention has been designed, it can be tested for functionality using routine techniques. For example, a backbone comprising a selection marker can be subjected to the associated selection pressure. Alternatively, a self-immolative backbone can be equipped with an insert encoding a reporter polypeptide operably linked to a promoter. In such a case, the expression of the reporter polypeptide is correlated to backbone functionality. Examples of reporter polypeptides are fluorescent proteins such as GFP or DsRed, and enzymes that can be easily assayed such as alkaline phosphatase, secreted alkaline phosphatase (SeAP), or luciferase.

In preferred embodiments a backbone according to the invention or an insert for use in the invention comprises a polynucleotide encoding an origin of replication, a polynucleotide encoding a promoter, a polynucleotide encoding a functional marker, an expression enhancing polynucleotide, and a polynucleotide encoding a multiple cloning site; more preferably the origin of replication, the multiple cloning site, and the functional marker are comprised in the backbone according to the invention, and the expression enhancing nucleotide and optionally the promoter are more preferably comprised in the insert for use in the invention.

In preferred embodiments a backbone according to the invention or an insert for use in the invention comprises a polynucleotide encoding an origin of replication, a polynucleotide encoding a functional marker, an expression enhancing polynucleotide, and a polynucleotide encoding a multiple cloning site; more preferably the origin of replication, the multiple cloning site, and the functional marker are comprised in the backbone according to the invention, and the expression enhancing nucleotide is more preferably comprised in the insert for use in the invention.

In preferred embodiments a backbone according to the invention or an insert for use in the invention comprises a polynucleotide encoding an origin of replication, a polynucleotide encoding a functional marker, and a polynucleotide encoding a multiple cloning site; more preferably the origin of replication, the multiple cloning site, and the functional marker are comprised in the backbone according to the invention.

In preferred embodiments a backbone according to the invention or an insert for use in the invention comprises a polynucleotide encoding an origin of replication, and a polynucleotide encoding a functional marker; more preferably the origin of replication and the functional marker are comprised in the backbone according to the invention.

In preferred embodiments a backbone according to the invention or an insert for use in the invention comprises a polynucleotide encoding an origin of replication, a polynucleotide encoding a functional marker, and a polynucleotide encoding a multiple cloning site, wherein the cleavage sites are endonuclease recognition sites; more preferably the origin of replication, the multiple cloning site, and the functional marker are comprised in the backbone according to the invention.

In preferred embodiments a backbone according to the invention or an insert for use in the invention comprises a polynucleotide encoding an origin of replication, and a polynucleotide encoding a functional marker, wherein the cleavage sites are endonuclease recognition sites; more preferably the origin of replication and the functional marker are comprised in the backbone according to the invention.

In preferred embodiments a backbone according to the invention or an insert for use in the invention comprises a polynucleotide encoding an origin of replication, a polynucleotide encoding a functional marker, and a polynucleotide encoding a multiple cloning site, wherein the cleavage sites are endonuclease recognition sites, and wherein the fragments have a length of at most 650 bp, preferably of at most 450 bp, more preferably of at most 350 bp, most preferably of at most 200 bp; more preferably the origin of replication, the multiple cloning site, and the functional marker are comprised in the backbone according to the invention.

In preferred embodiments a backbone according to the invention or an insert for use in the invention comprises a polynucleotide encoding an origin of replication, and a polynucleotide encoding a functional marker, wherein the cleavage sites are endonuclease recognition sites, and wherein the fragments have a length of at most 650 bp, preferably of at most 450 bp, more preferably of at most 350 bp, most preferably of at most 200 bp; more preferably the origin of replication and the functional marker are comprised in the backbone according to the invention.

Within this aspect the invention also provides compositions comprising a backbone according to the invention or a vector according to the invention, and further comprising at least one physiologically acceptable excipient. Examples of physiologically acceptable excipients are water, purified water, and aqueous buffers, for example buffers such as described elsewhere herein.

Method of Using the Backbone

The backbones according to the invention allow efficient isolation of inserts. Methods of using backbones according to the invention therefore focus on this separation. Such methods can be used for efficient preparation of any insert, such as a polynucleotide encoding a polypeptide of interest, or a specific homology-directed repair (HDR) template DNA in CRISPR/Cas mediated DNA-editing, or for preparation of RNA for use in synthetic biology or pharmacy. Such methods can also be used to prepare (circular) RNA for use in e.g. synthetic biology [Programming cells and tissues. New toolkits of biological parts allow powerful cell programming by synthetic biologists DS Glass and U Alon Science (21 Sep. 2018) 361, 1199-1200].

Accordingly, in another aspect, the invention provides a method for separating a polynucleotide insert from a polynucleotide vector backbone, the method comprising the steps of
i) providing a recombinant polynucleotide vector comprising the insert and the vector backbone, wherein the vector backbone comprises a first plurality of cleavage sites that divide the vector backbone into fragments having a length of at most 1000 bp;
ii) contacting the recombinant vector with cleavage means capable of specifically cleaving the first plurality of cleavage sites to produce backbone fragments; and optionally,
iii) separating the insert from the backbone fragments of step ii). Such a method is referred to herein as a method according to the invention. These steps are preferably performed in numerical order.

Step i)—Provision of a Self-Immolative Vector

The vector, backbone, and insert of step i) are a vector according to the invention, a backbone according to the invention, and an insert for use according to the invention as described elsewhere herein. Accordingly, in preferred embodiments is provided the method according to the invention, wherein the cleavage sites are restriction endonuclease recognition sites. In preferred embodiments is provided the method according to the invention, wherein the insert does not comprise a cleavage site of the first plurality of cleavage sites. Effectively this ensures that when the first plurality of cleavage sites is cleaved, the insert is not cleaved because it has no matching cleavage site that is comprised in the first plurality of cleavage sites. In other words, in preferred embodiments the insert does not comprise a cleavage site that is also comprised in the first plurality of cleavage sites, or does not comprise a cleavage site that also exists in the first plurality of cleavage sites. In preferred embodiments is provided the method according to the invention, wherein the vector backbone further comprises a polynucleotide encoding a functional marker, wherein the polynucleotide encoding a functional marker is preferably selected from SEQ ID NOs: 14-18. In preferred embodiments is provided the method according to the invention, wherein the fragments have a length of at most 900, 800, 700, 650, 600, 550, 500, 450, 400, 350, 300, 250, 200, 150, or 100 bp or less, preferably of at most 550 bp, such as about 500 bp. In preferred embodiments is provided the method according to the invention, wherein the vector backbone comprises a multiple cloning site that does not comprise a cleavage site of the first plurality of cleavage sites. Preferred backbones according to the invention as described herein are preferred for use in a method according to the invention.

Provision of the vector can be from any source. Typically, the vector will be a vector that has been isolated from a culture, wherein the culturing was performed for the purpose of amplifying the vector. In preferred embodiments, the vector is in a composition. In preferred embodiments, the vector has been isolated from a microbial culture, more preferably from a bacterial culture. In preferred embodiments, the vector is in purified water or in a physiologically acceptable aqueous buffer, preferably a buffer that is compatible with the cleavage means of step ii).

Step ii)—Degrading the Backbone

In step ii) the self-immolative vector that was provided in step i) is degraded into its fragments, liberating the insert. This is because in step ii) the recombinant vector is contacted with cleavage means capable of specifically cleaving the first plurality of cleavage sites to produce backbone fragments. Suitable cleavage means have been described earlier herein. In preferred embodiments is provided the method according to the invention, wherein the cleavage means are selected from the group consisting of a restriction enzyme, an RNA-guided DNA endonuclease enzyme, a sequence-specific nuclease, sequence-specific ultrasonication, a sequence-specific oxidative small molecule such as bleomycin, and a sequence-specific hydrolyzing small molecule such as a lanthanide complex; more preferably the cleavage means are selected from the group consisting of a restriction enzyme, an RNA-guided DNA endonuclease enzyme, and a sequence-specific nuclease; even more preferably the cleavage means are selected from the group consisting of a restriction enzyme and an RNA-guided DNA endonuclease enzyme, most preferably a restriction enzyme.

The contacting of step ii) amounts to using the cleavage means according to its known use. Commonly, the contacting entails the addition of the vector of step i) to a suitable reaction buffer comprising an effective amount of the cleavage means; conversely an effective amount of the cleavage means can be added to a suitable reaction buffer comprising the vector of step i). Suitable buffers depend on the cleavage means and are well known in the art. For example, when the cleave means comprise restriction enzymes, a suitable buffer can be CutSmart (registered trademark) buffer from New England BioLabs (NEB), which comprises 50 mM potassium acetate, 20 mM tris-acetate, 10 mM magnesium acetate, 100 µg/ml BSA, pH 7.9 at 25° C.; another suitable buffer is restriction enzyme buffer SH from Sigma-Aldrich (PubChem Substance ID 24891729); other suitable buffers are described in Khan et al., cited earlier herein. The use of cleavage means per se to cleave a polynucleotide is broadly known in the art, and a skilled person can select suitable conditions to perform the cleavage.

The cleavage means specifically cleave the cleavage sites of the first plurality. This means that only the cleavage sites of the first plurality are cleaved, which degrades the vector into its constituent fragments, resulting in a mixture comprising said fragments and further comprising the insert. Because the insert is devoid of cleavage sites of the first plurality, it is not cleaved into smaller fragments, allowing easy separation of the insert from the smaller backbone fragments. Because the cleavage means are specific for the cleavage sites of the first plurality, no other polynucleotide products are produced besides the fragments and the insert.

In preferred embodiments is provided the method according to the invention, wherein the cleavage means comprise 3, 2, or 1 species of restriction enzymes, preferably wherein the restriction enzyme recognizes a restriction site of 6 or 7 nucleotides, more preferably selected from the group consisting of BstZ17I and MluI. More preferred embodiments provide the method according to the invention, wherein the first plurality of cleavage sites comprises only restriction sites, and comprises no more than 6, 5, 4, 3, 2, or 1, preferably no more than 3, 2, or 1, more preferably no more than 2 or 1, most preferably comprises only 1, species of restriction site, wherein the restriction sites are preferably selected from the group consisting of restriction sites for restriction enzymes as defined earlier herein, most preferably selected from restriction sites for BstZ17I and MluI.

Step iii)—Isolation of the Insert

Step iii) is an optional step wherein the insert is isolated, that is wherein it is separated from the backbone fragments of step ii). In preferred embodiments of the method according to the invention, step iii) is included. An advantage of the invention is that the insert has a size that is larger, often substantially larger, than that of any other polynucleotide present in the mixture from which the insert is to be isolated. In conventional insert isolation the insert is often smaller than the opened vector backbone, or both molecules can have a similar size. This means that for conventional insert isolation gel extraction is often the most likely choice of separation technique.

In molecular biology, "gel extraction" or gel isolation is a technique used to isolate a desired fragment of intact DNA from an agarose gel following agarose gel electrophoresis. An example of gel extraction is described in the examples, where it is used as a reference technique. Gel extraction is laborious, requires manual dexterity, and is prone to contaminate the isolated insert with for example chemical contaminants, as described in the example. In preferred methods according to the invention, step iii) does not comprise gel extraction, or does not comprise preparative gel electrophoresis. In this context, preparative gel electrophoresis is electrophoresis that is performed with the intent of later isolating a fraction from the gel.

In preferred embodiments is provided the method according to the invention, wherein the separation of step iii) uses a technique selected from a spin column, a size exclusion column, and solid phase reversible immobilization (SPRI). Preferred separation techniques are a spin column, a size exclusion column, and solid phase reversible immobilization (SPRI); a spin column is most preferred, for its convenience.

The size difference between the insert and the fragments allows convenient separation using size exclusion techniques. Size exclusion techniques are known in the art, for example as described by Potschka (Macromolecules, 1991, 24(18), pp 5023-5039, DOI: 10.1021/ma00018a008). Size exclusion techniques generally use a column material. The smaller fragments can be captured in or by the column material, while the larger insert elutes with a low retention time. Inversely, the smaller fragments can elute in void volume while the larger insert is captured in or by the column material owing to its size. This latter technique can also be seen as a solid phase extraction, or solid phase reversible immobilization (SPRI), because it relies on the fact that the larger insert binds to the column material, often silica, owing in part to its size, while the smaller fragments do not bind. Later elution of the insert then allows its isolation. Examples of size exclusion techniques are size exclusion chromatography using a spin column, and size exclusion chromatography using a size exclusion column. A size exclusion column is generally used on a benchtop, and liquids flow through it under gravitational force or under action of a pump. The use of such columns is described in handbooks cited elsewhere herein.

A spin column is generally a disposable miniaturized size exclusion column that can be mounted on a receptacle fit for use in a centrifuge. Once the spin column is filled with sample it can be centrifuged to drive the sample through the size exclusion material. The spin column can then optionally be filled with additional volumes of buffer and centrifuged further times. Spin columns are widely commercially available and are well known, for example as described in Shi et al., PLOS ONE, 2018, DOI: 10.1371/journal.pone.0203011. Spin columns can be columns that retain, such as bind or capture, the fragments, for example in size exclusion material only permeable to small fragments, or due to complementarity to sticky ends of the fragments. Spin columns can also be columns that do not retain the backbone fragments, for example in solid phase reversible immobilization of the insert. Spin columns that retain the fragments and that do not retain the inserts are preferred, particularly spin columns with size exclusion material that captures the fragments.

Alternately the fragments can be removed from the mixture by fragment pulldown based on sticky overhang hybridization. If the cleavage means leads to sticky ends for the fragments it generates, these sticky ends can be used to pull down those fragments. Generally, in such a technique, the fragments associate with a solid-phase carrier complementary to the sticky overhangs. Later removal of the solid-phase carrier thus removes the fragments, leaving the isolated insert in solution.

The separation techniques as described above, and the materials for use in such separation techniques, are known in the art. A skilled person can select an appropriate technique, and can select appropriate materials for use in such a technique. The separation technique of choice preferably provides the insert with a purity of at least 50%, 60%, 70%, 75%, 80%, 85%, 90%, 95%, 96%, 97%, 98%, 99%, 99.5%, 99.6%, 99.7%, 99.8%, 99.9%, or higher, such as 100%. More preferably a purity of at least 95%, 96%, 97%, 98%, 99%, 99.5%, 99.6%, 99.7%, 99.8%, 99.9%, or higher is obtained, even more preferably of at least 99% or higher, most preferably of at least 99.7% or higher.

Method for Amplifying an Insert

The use of a backbone according to the invention also allows the convenient amplification of an insert. In another aspect the invention provides a method for amplifying a polynucleotide of interest, the method comprising the steps of i) providing a recombinant polynucleotide vector comprising the polynucleotide of interest as an insert, and a vector backbone according to the invention;

ii) amplifying the recombinant polynucleotide vector of step i) by transforming a suitable microorganism with it and culturing said transformed microorganism in a culture medium under conditions suitable for vector amplification to obtain amplified recombinant polynucleotide vector;

iii) isolating the amplified recombinant polynucleotide vector from the culture medium of step ii) to obtain isolated amplified recombinant polynucleotide vector;

iv) contacting the isolated amplified recombinant polynucleotide vector with cleavage means capable of cleaving the first plurality of cleavage sites to produce backbone fragments; and optionally, v) separating the nucleotide sequence of interest from the backbone fragments of step iv).

This method is referred to herein as a production method according to the invention. Its steps are preferably performed in numerical order.

In step i) a vector according to the invention is provided, which comprises the polynucleotide of interest as an insert, and which further comprises a backbone according to the invention. Preferably, the vector consists of said insert and said backbone.

In step ii) this vector is transformed into a suitable microorganism. In preferred embodiments the recombinant vector is transected to a suitable microorganism. A skilled person is well aware of which microorganisms can be used for vector amplification, such as *E. coli* or a suitable yeast or fungus—numerous handbooks on the topic exist, such as Sambrook et al., Molecular cloning: a laboratory manual. New York: Cold spring harbor laboratory press, 1989; or Green and Sambrook, 2012, ISBN 978-1-936113-42-2. Similarly, transformation and transfection are known in the art, and can be performed in any way a skilled person sees fit, for example such as described in Sambrook et al. Examples of suitable transfection methods are transfection using transfection lipids such as those described in Damen et al., (MedChemComm 2018, 9(9):1404-1425, DOI: 10.1039/c8md00249e), using transfection polymers such as described in Zhang and Wagner (Top. Curr. Chem. 2017, 375(2):26, DOI: 10.1007/s41061-017-0112-0), electroporation, transformation using competent or supercompetent cells, microinjection, gene bombardment, et cetera. After this transformation the transformed microorganism comprising the vector is cultured to amplify the vector. Again, such steps are broadly known in the art and a skilled person can select the appropriate steps by routine selection, optionally guided by the sources cited above.

In step iii) the amplified vector is isolated. The amplified vector comprises the insert, which has been amplified along with the vector as it is therein comprised. Isolation of a vector from a microorganism is a standard procedure that is commonly known, and can be performed in any way a skilled person sees fit, optionally guided by the sources cited above, or by the examples described later herein. Suitable methods are plasmid preparation such as minipreparation, midipreparation, or maxipreparation, for example as described by Birnboim and Doly (1979) Nucleic Acids Res. 7(6): 1513-23, DOI: 10.1093/nar/7.6.1513.

In step iv) of the production method according to the invention the isolated vector according to the invention is degraded or immolated, similar to step ii) of the method according to the invention. Features and definitions as provided there are also applicable for step iv) of the production method according to the invention.

In step v) of the production method according to the invention, which is an optional step, the insert is isolated, that is it is separated from the backbone fragments of step iv). In preferred production methods according to the invention, step v) is included. This step is substantially similar to step iii) of the method according to the invention. Features and definitions as provided there are also applicable for step iv) of the production method according to the invention.

Use of the Backbone or Vector

The backbone according to the invention and the vector according to the invention can be used in methods according to the invention, or in production methods according to the invention. Accordingly, in a further aspect the invention provides use of a polynucleotide vector backbone according to the invention, or of a recombinant polynucleotide vector according to the invention, for the purification of a polynucleotide insert.

The invention also provides use of a cleavage means for converting a polynucleotide vector comprising an insert and a vector backbone into:
 fragments having a length of at most 1000 bp; and
 the separate insert. Features and definitions have been provided elsewhere herein.
This use is particularly envisioned for cleavage means such as RNA-guided DNA endonuclease enzymes, which can be configured to recognize any particular sequence as a cleavage site.

In preferred embodiments the backbone according to the invention is used in a method for enhancing transcription of a nucleotide sequence of interest in a eukaryotic cell, the method comprising the steps of:
 i) providing a recombinant polynucleotide vector comprising the polynucleotide of interest as an insert, and a vector backbone according to the invention;
 ii) amplifying the recombinant polynucleotide vector of step i) by transfecting it to a suitable microorganism and culturing said microorganism in a culture medium under conditions suitable for vector amplification to obtain amplified recombinant polynucleotide vector;
 iii) isolating the amplified recombinant polynucleotide vector from the culture medium of step ii) to obtain isolated amplified recombinant polynucleotide vector;
 iv) contacting the isolated amplified recombinant polynucleotide vector with cleavage means capable of cleaving the first plurality of cleavage sites to produce backbone fragments;
 v) separating the nucleotide sequence of interest from the backbone fragments of step iv) to obtain an isolated nucleotide sequence of interest;
 vi) integrating the isolated nucleotide sequence of interest in the genome of a eukaryotic cell, preferably a mammalian cell or an insect cell, to obtain a transgenic cell;
 vii) culturing the transgenic cell under conditions conducive to expression of the nucleotide sequence of interest.

For steps i) through v) features and definitions as described above apply. In step vi) the isolated nucleotide sequence of interest is integrated into the genome of a eukaryotic cell to obtain a transgenic cell. This can be done via any means known in the art, such as via lipid transfection or electroporation, more preferably such as described in Example 4.3. In preferred embodiments a pool of transgenic cells is obtained. In step vii) the transgenic cell, or optionally the pool of transgenic cells, is cultured to express the nucleotide sequence of interest. Preferably, this expression is higher than expression of the amplified recombinant polynucleotide vector of step iii) when it has been not been degraded as in step iv), but has instead been linearized, for example using a restriction enzyme for which only a single restriction site was present in the backbone.

Kit of Parts

The backbones and vectors according to the invention can be provided as components in a kit of parts. Therefore, in another aspect the invention provides a kit of parts comprising:
 i) a polynucleotide vector backbone according to the invention, or a recombinant polynucleotide vector according to the invention; and at least one of
 iia) materials for use in a separation technique as defined elsewhere herein, such as spin filters; or
 iib) cleavage means as defined elsewhere herein.
Such a kit is referred to herein as a kit according to the invention.

A kit according to the invention always comprises a polynucleotide vector backbone according to the invention, or a recombinant polynucleotide vector according to the invention. It can have various further parts, described above as iia or iib. In preferred embodiments, both the parts of iia and iib are comprised.

The further parts under iia are materials for use in separating the fragments from the insert. Such materials have been described under step ii) of the method according to the invention.

The further parts under iib are cleavage means, preferably at least all cleavage means required for immolation of the vector or backbone according to the invention. The cleavage means are preferably provided in a suitable separate container. In preferred embodiments the cleavage means are restriction enzymes, and are provided in plastic containers suitable for subzero storage. Suitable containers for each cleavage means are known in the art, and can be selected based on the cleavage means that is to be contained.

Method for Designing a Self-Immolative Backbone

The invention further relates to a method for designing a backbone according to the invention, the method comprising steps selected from:
i) providing a polynucleotide vector backbone;
ii) screening the provided vector backbone for endonuclease restriction sites;
iii) screening the provided vector backbone for sequences that share 4, 5, 6, or 7 nucleotides with an endonuclease restriction site;
iv-a) implementing at least one silent mutation in the provided vector backbone to convert a sequence of step iii) into an endonuclease restriction site; and/or
iv-b) implementing at least one mutation in the provided vector backbone to convert a sequence of step iii) into an endonuclease restriction site.

Reduction to practice of this method is demonstrated in the Examples. Features and definitions are as described elsewhere herein. Preferably, the method comprises steps i), ii), iii), and at least one of iv-a) and iv-b); more preferably the method comprises steps i), ii), iii), and iv-a). Steps are preferably performed in numerical order.

The silent mutation of step iv-a) is a mutation that alters the oligonucleotide sequence, preferably to introduce an endonuclease restriction site, while not altering the amino acid sequence of an encoded polypeptide, or alternately while not substantially altering the functionality of an encoded polypeptide or of the oligonucleotide sequence. Alteration of functional elements and their functionality is described elsewhere herein.

The mutation in step iv-b) can be the insertion, deletion, or mutation of any residue in the polynucleotide. In preferred embodiments it is the insertion of a codon to introduce an amino acid, or the mutation of one or more nucleotides to alter a codon for one amino acid to a codon for another amino acid. Preferably, this alteration of codons leads to a conservative mutation of amino acids, such as from a charged amino acid to another amino acid with a similar charge, or from a small amino acid to another small amino acid. Conservative mutations are known in the art.

General Definitions

The term "derived from" in the context of being derived from a particular naturally occurring gene or sequence is defined herein as being chemically synthesized according to a naturally occurring gene or sequence and/or isolated and/or purified from a naturally occurring gene or sequence. A species derived from another species is preferably mutated, in that at least one residue of an amino acid sequence, or of a polynucleotide, or of a polynucleotide encoding the amino acid sequence, is not the same as in the naturally occurring gene or sequence. Techniques for chemical synthesis, isolation and/or purification of nucleic acid molecules are well known in the art. In general, a derived sequence is a partial sequence of the naturally occurring gene or sequence or a fraction of the naturally occurring gene or sequence. Optionally, the derived sequence comprises nucleic acid substitutions or mutations, preferably resulting in a sequence being at least 50%, 55%, 60%, 65%, 70%, 75%, 80%, 85%, 90%, 91%, 92%, 93%, 94%, 95%, 96%, 97%, 98% or 99% identical over its whole length to the naturally occurring gene partial gene or sequence or partial sequence.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

The word "about" or "approximately" when used in association with a numerical value (e.g. about 10) preferably means that the value may be the given value more or less 1% of the value.

Whenever a parameter of a substance is discussed in the context of this invention, it is assumed that unless otherwise specified, the parameter is determined, measured, or manifested under physiological conditions. Physiological conditions are known to a person skilled in the art, and comprise aqueous solvent systems, atmospheric pressure, pH-values between 6 and 8, a temperature ranging from room temperature to about 37° C. (from about 20° C. to about 40° C.), and a suitable concentration of buffer salts or other components.

In the context of this invention, a decrease or increase of a parameter to be assessed preferably means a change of at least 5% of the value corresponding to that parameter. More preferably, a decrease or increase of the value means a change of at least 10%, even more preferably at least 20%, at least 30%, at least 40%, at least 50%, at least 70%, at least 90%, or 100%. In this latter case, it can be the case that there is no longer a detectable value associated with the parameter.

"Sequence identity" or "identity" in the context of amino acid- or nucleic acid-sequence is herein defined as a relationship between two or more amino acid (peptide, polypeptide, or protein) sequences or two or more nucleic acid (nucleotide, polynucleotide) sequences, as determined by comparing the sequences. In the art, "identity" also means the degree of sequence relatedness between amino acid or nucleotide sequences, as the case may be, as determined by the match between strings of such sequences. In this document, sequence identity with a particular sequence indicated with a particular SEQ ID NO preferably means sequence identity over the entire length of said particular polypeptide or polynucleotide sequence indicated with said particular SEQ ID NO. However, sequence identity with a particular sequence indicated with a particular SEQ ID NO may also mean that sequence identity is assessed over a part of said SEQ ID NO. A part may mean at least 50%, 60%, 70%, 80%, 90% or 95% of the length of said SEQ ID NO. The sequence information as provided herein should not be so narrowly construed as to require inclusion of erroneously identified bases. The skilled person is capable of identifying such erroneously identified bases and knows how to correct for such errors.

"Identity" can be readily calculated by known methods, including but not limited to those described in Computational Molecular Biology, Lesk, A. M., ed., Oxford University Press, New York, 1988. Preferred methods to determine identity are designed to give the largest match between the sequences tested. Methods to determine identity and similarity are codified in publicly available computer programs. Preferred computer program methods to determine identity and similarity between two sequences include e.g. the GCG program package (Devereux, J., et al., Nucleic Acids Research 12 (1): 387 (1984)), BestFit, BLASTP, BLASTN, and FASTA (Altschul, S. F. et al., J. Mol. Biol. 215:403-410 (1990). The BLAST X program is publicly available from NCBI and other sources (BLAST Manual, Altschul, S., et al., NCBI NLM NIH Bethesda, MD 20894; Altschul, S., et al., J. Mol. Biol. 215:403-410 (1990). The well-known Smith Waterman algorithm may also be used to determine identity. Preferred parameters for nucleic acid comparison include the following: Algorithm: Needleman and Wunsch, J. Mol. Biol. 48:443-453 (1970); Comparison matrix: matches=+10, mismatch=0; Gap Penalty: 50; Gap Length Penalty: 3. Available as the Gap program from Genetics Computer Group, located in Madison, Wis. Given above are the default parameters for nucleic acid comparisons. Preferred program and parameter for assessing identity for nucleic acid comparison is calculated using EMBOSS Needle Nucleotide Alignment algorithm with the following parameters: DNAfull matrix with the following gap penalties: open=10; extend=0.5.

The present invention has been described above with reference to a number of exemplary embodiments. Modifications and alternative implementations of some parts or elements are possible, and are included in the scope of protection as defined in the appended claims. All citations of literature and patent documents are hereby incorporated by reference.

DESCRIPTION OF DRAWINGS

FIG. 4—Separation of insert from backbone fragments by a ChromaSpin-1000 method. Input is MluI/BstZ17I digested vector (see Example 2). Lane 1: 2 Log marker; Lane 3: 100 µl 1.5 µg/µl Input; Lane 4: Flow-through.

EXAMPLES

Figure 1:
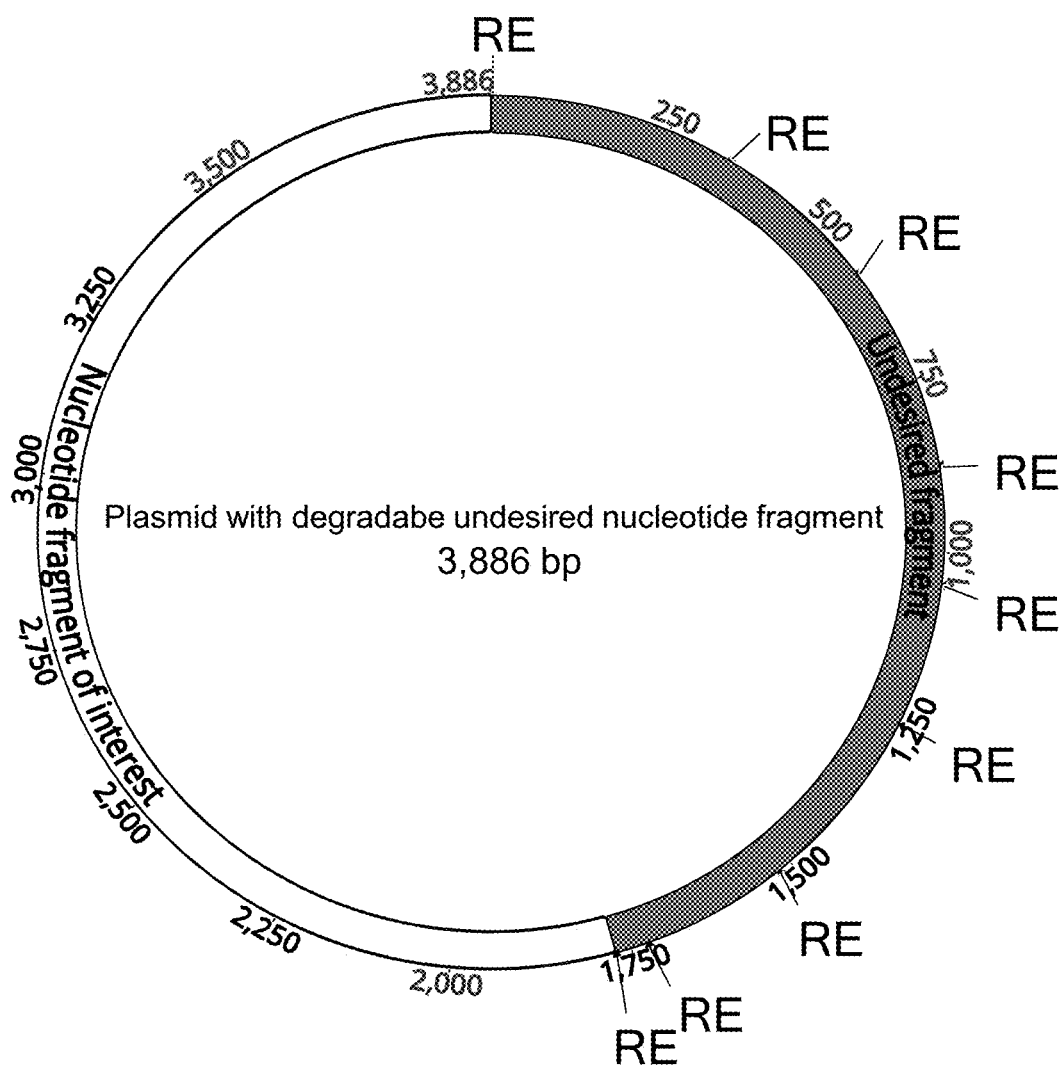
FIG. 1—Schematic representation of a backbone degradation primed plasmid. The undesired nucleotide sequence, e.g. bacterial backbone, is presented in grey; the fragment of interest is colourless. The backbone harbours regularly distributed cleavage sites such as recognition sites for restriction enzymes (indicated as RE). These sites are not present in the fragment of interest. Cleavage of the cleavage sites triggers degradation of the backbone, allowing one-step quantitative separation of the fragment of interest from the degraded undesired nucleotide sequence.
Figure 2:
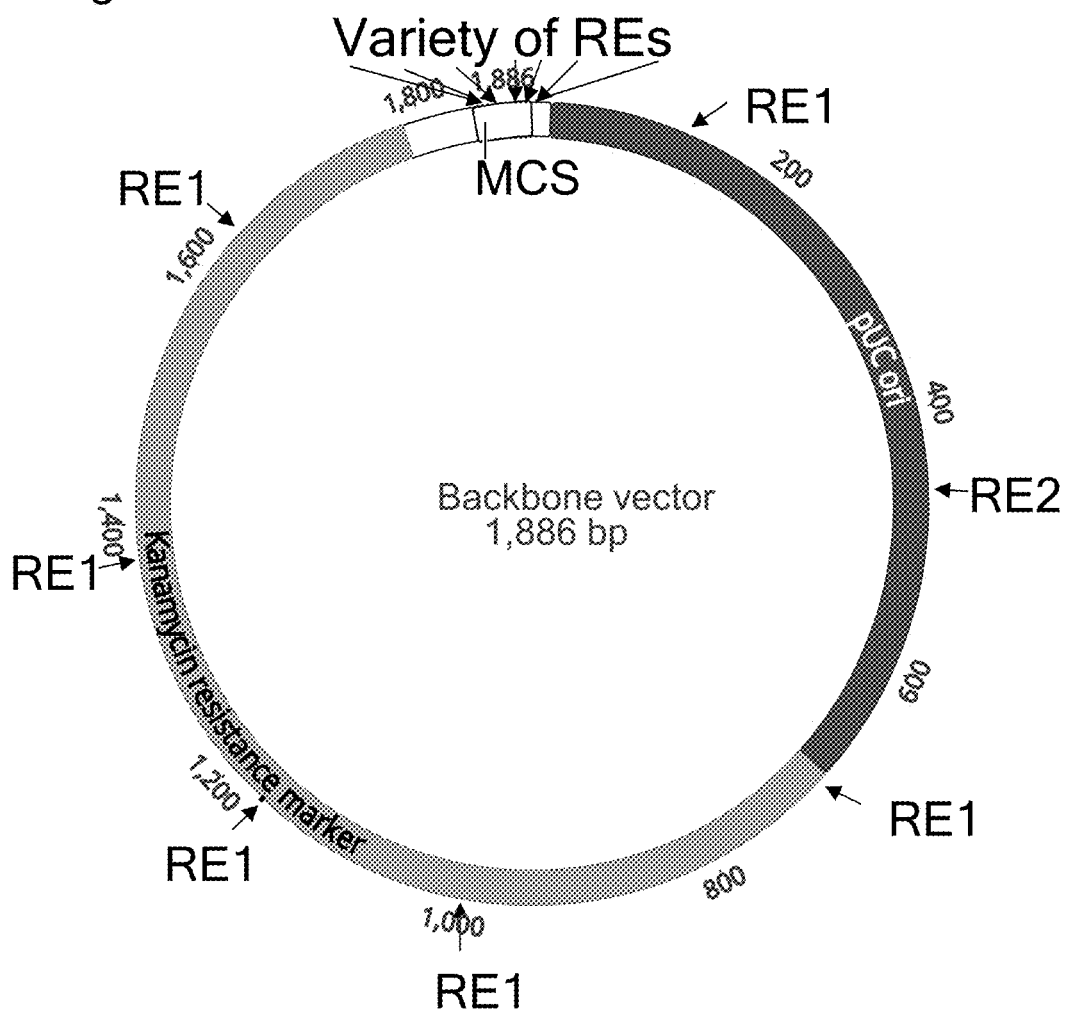
FIG. 2—Schematic representation of backbone degradation vector without fragment of interest. Functional units kanamycin marker (grey), origin of replication (black) and multiple cloning site (MCS, white) are indicated. The vector from example 1 has a kanamycin resistance gene as marker, and harbours restriction sites for MluI (indicated as RE1) and BstZ17I (indicated as RE2). After degradation of its sequence by restriction digestion the size of the backbone vector fragments ranges from 121 to 342 bp. The sequence of backbone vector of Example 1 is SEQ ID NO: 68.

Example 1—Design and Preparation of a Vector with a Self-Immolative Backbone 1.1 Design of a Vector: Introduction of Restriction Enzyme Sites in the Backbone A design for a vector comprising an insert was made by introducing cleavage sites, in this case restriction sites, for a minimal number of restriction enzymes resulting in fragments smaller than 350 bps. This fragment size allows one-step purification of fragments of interest with a size starting at 1500 bp and higher (see Example 2). The number of enzymes to be used as cleavage means was kept as low as possible to simplify the digestion process and to minimize the number of restriction sites that were to be avoided during synthesis and/or cloning of fragments-of-interest. In this example, two restriction enzymes were selected: MluI and BstZ17I.

While not essential features of all plasmids, typical functional elements of a cloning plasmid are the origin of replication (Ori), a marker, and a multiple cloning site (MCS). Outside of these functional elements, the introduction of restriction sites is relatively easy as no functionality is present. To obtain fragments of maximum 350 bp, introduction of restriction sites is required within the marker and the origin of replication.

1.2. Modification of Markers

Polynucleotides encoding for markers can be modified to allow cleavage sites to divide the coding sequence into fragments. In this example the kanamycin and ampicillin selection markers were divided into fragments of at most about 350 bp.

1.2.1 Self-Immolative Kanamycin

In Silico Gene Analysis and Options for Modification

The sequence of the selection marker gene was taken from GenBank JF826242.2. The kanamycin selection marker gene coding for aminoglycoside-3'-phosphotransferase (APH(3')) and its 816 nt coding sequence are annotated as nt 841-1656 (complement). At the 5' site of the coding sequence a 130 nt promoter sequence is present. The 145 nt sequence at the 3' of the coding DNA sequence (CDS) was also considered to be important for gene expression.

Four silent mutations were selected that introduce MluI sites, cutting the CDS into fragments smaller than 200 bp. No silent mutations could be made at the 5' end of the gene, resulting in a fragment of approximately 430 bp. To allow further digestion within this fragment, inclusion of a cleavage site such as MluI just inside the coding sequence was necessary. The N-terminal 10 amino acid sequence was selected as a target for mutations that would still yield APH(3') expression and activity. These first 10 amino acids (MSHIQRETSC—SEQ ID NO: 102) were highly promising, because they are unordered (D. Nurizzo et al., The crystal structure of aminoglycoside-3'-phosphotransferase-IIa, an enzyme responsible for antibiotic resistance. J Mol Biol (2003) 327, 491-506) and they apparently do not play a role in the structural function of the enzyme. Moreover, the amino acid sequence at the N-terminal end is not conserved, with different lengths and sequences occurring throughout known variants. Based on this the following two variants were designed: 1) MSHIQTRETSC (SEQ ID NO: 103, first 11 amino acids of SEQ ID NO: 69) with a Thr inserted; the dipeptide TR can be encoded by a MluI recognition site (ACGCGT) and 2) MSHIQRETRSC (SEQ ID NO: 104, first 11 amino acids of SEQ ID NO: 70) with an Arg inserted.

These two variants, together with wild-type sequence, were tested for capacity to allow selection on kanamycin.

Experimental Gene Modifications, Functional and Sequence Analysis

Backbone plasmid was created using five geneblocks (Integrated DNA technologies (IDT), Leuven, Belgium, SEQ ID NOs: 71-75). The geneblocks were dissolved to 0.1 µM in water. Combinations forming a complete backbone (i.e. one variant or wildtype for each of the five fragments were made in 16 µl final reaction volume, containing 0.4 µl of each geneblock at 0.1 µM, 8 µl HiFi assembly mix (NEB E2621), and 6 µl of water (Sigma W4502). Mixtures were incubated 1 hr at 50° C., and stored at −20° C. till further use. Top10 chemically competent cells (Life Technologies C404010) were transformed according the manufacturer's instructions with 2 µl of the assembly reactions. Functionality of the kanamycin resistance gene, i.e. expression and activity of APH(3'), was tested by the ability of the plasmid to confer kanamycin resistance, which is observed by plating the transformants onto LB-Kan plates. Combinations were first made with 1 out of the 5 wildtype fragments replaced with a variant fragment.

In one fragment the four silent mutations in the kanamycin gene were introduced (SEQ ID: 76). Wildtype fragments were used to generate the reference plasmid. Introducing the four silent mutations did not adversely affect kanamycin resistance. Next, either the threonine (SEQ ID NO: 77, encoding the polypeptide of SEQ ID NO: 69) or the arginine insertion (SEQ ID NO: 78, encoding the polypeptide of SEQ ID NO: 70) was introduced to the plasmid with the four silent mutations. The insertion of threonine also resulted in proper transformants, while transformants with an arginine introduced in the N-terminal sequence of APH(3') were less viable. In subsequent experiments plasmids were used in which the four silent mutations and the threonine-inserted APH(3') are present.

1.2.2 Self-Immolative Ampicillin

The DNA sequence conferring ampicillin resistance to bacteria was redesigned to allow degradation into small fragments. Two silent mutations were introduced into the β-lactamase coding sequence to introduce MluI restriction sites. This lead to a division into fragments of 310, 352, and 524 bp. The resulting selection marker (SEQ ID NO: 79) can be used in backbones according to the invention, for example instead of the kanamycin marker described in Example 1.2.1. To obtain fragments smaller than 400 bp, single amino acid changes by introducing additional MluI and BstZ17I recognition sites were designed, so that the resulting fragments have sizes of at most 352 bp; the resulting selection marker has SEQ ID NO: 15. An example of a vector comprising this selection marker is SEQ ID NO: 80. This redesigned ampicillin resistance gene can be applied for use in a plasmid with a self-immolative backbone. Other suitable self-immolative functional ampicillin variants with one or more altered amino acid were designed and functional: SEQ ID NOs: 81-88. These variants can also be used to generate a self-immolative backbone. One self-immolative ampicillin (SEQ ID NO: 89) was found to not be functional.

1.3 Self-Immolative Ori

In Silico Analysis and Experimental Approach

In the 674 bp region of the origin of replication several mutations were taken into account. The changes selected for were based on the different domains or structures present in the Ori (A. Waugh et al., RNAML: A standard syntax for exchanging RNA information. RNA (2002) 8, 707-717). The initial design consisted of a variety of changes in the 300 bp at the 3' of the Ori.

Multiple mutations in a conventional Ori derived from pUC (SEQ ID NO: 20) were designed harbouring single nucleotide changes (SEQ ID NO: 90) as well as single nucleotide insertions (SEQ ID NO: 91) at the 3' of Ori, as well as insertions and nucleotide changes in the center of the Ori (SEQ ID NO: 92) and the stem-loop (SEQ ID NO: 93) which is located between nucleotides 220-310 of the original plasmid backbone sequence (SEQ ID NO: 1). Transformants harboring the mutated Ori were generated as described above. In vivo, the performance of the Ori-modified plasmids was dependent on the exact sequence. For instance, specific mutations at the 3' of the Ori (see SEQ ID NO: 90) resulted in an Ori whose plasmids yielded transformants with reduced viability, as did the mutations in SEQ ID NOs: 117 and 118.

Successful designs (consisting of changes SEQ ID NO: 94 and SEQ ID NO: 95) and an insert upstream of the Ori (SEQ ID NO: 96) were found using the process described above. They were combined to obtain an Ori with MluI restriction sites that were separated by a maximum of 580 nt. This Ori, in turn, was combined with three new mutations in the Ori bearing the restriction sites for BstZ17I (SEQ ID NO: 97, SEQ ID NO: 98, and SEQ ID NO: 99). SEQ ID NO: 99 was selected for further use and the plasmid harbouring it was fully functional, displaying a copy number and plasmid yield similar to SEQ ID NO: 1. SEQ ID NO: 98 and SEQ ID NO: 97 were also functional.

1.4 Self-Immolative Multiple Cloning Site (MCS)

A 52 bp multiple cloning site (MCS) was introduced, including unique recognition sites for SbfI, PstI, NotI, BssHII, SalI and AflII (SEQ ID NO: 19). Owing to its short size, this MCS does not require a cleavage site that is one of the self-immolative cleavage sites.

BssHII is compatible with MluI, so the use of the combination of these three enzymes is beneficial for easy introduction or removal of a fragment of interest via BssHII, and later plasmid degradation via MluI and BstZ17I.

1.5 Assembly into a Vector

A self-immolative vector comprising a resistance marker (SEQ ID NO: 14), an Ori (SEQ ID NO: 27), and a MCS (SEQ ID NO: 19) was assembled (SEQ ID NO: 68) and sequence verified. The plasmid could be selected, had good copy number, and features an MCS allowing insertion of a region of interest. After degradation of its sequence by restriction digestion the size of the backbone vector fragments ranges from 121 to 342 bp (342-241-301-173-211-269-210-121 bp).

Example 2—Isolating an Insert from Degraded Backbone 2.1 Immolation of a Plasmid with an Insert Into a plasmid consisting of a self-immolative backbone (SEQ ID NO: 68) an insert was introduced consisting of a secreted alkaline phosphatase (SeAP) coding sequence (SEQ ID NO: 100), preceded by Expression Enhancing Element 1 (SEQ ID NO: 59) and the CMV promoter (SEQ ID NO: 61) and the GS selection marker (SEQ ID NO: 101). This plasmid was treated with MluI and BStZ17I under conditions prescribed by the enzymes' supplier. After digestion, the insert was purified as described below.

2.2.1 Size Exclusion Chromatography, Milliliter Scale

Sephacryl S-500 gel filtration column chromatography was carried out to purify the insert from degraded undesired DNA. A HiPrep 16/60 Sephacryl S-500 HR ID16 mm column (GE Healthcare Life Science) mounted on an Akta Pure was rinsed with degassed milliQ water and equilibrated with running buffer (RB=100 mM NaCl, 10 mM Tris/HCl pH=8.5) with a flow of 0.5 ml/min at 37° C. 0.95 ml DNA solution was applied. The column was run with running buffer at a flow of 0.5 ml/min. 2 ml fractions were collected.

Figure 3:
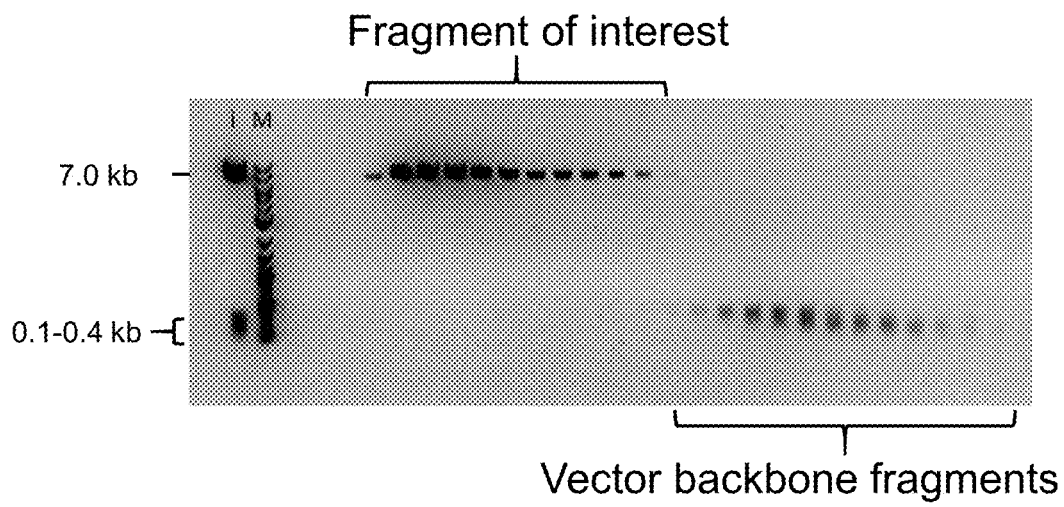
FIG. 3—Baseline separation of Fragment of interest from backbone fragments by Sephacryl S500HR filtration. Analysis of samples: Lane 1 (I) Input sample; Lane 2 (M) 2 Log DNA ladder; Lane 3 to 28: Fractions. The lanes comprising insert are indicated as "Fragment of interest" and the lanes comprising backbone fragments are indicated as "Vector backbone fragments."

Samples were analyzed by gel-electrophoresis (FIG. 3). The insert containing the region of interest (band >7000) and the backbone fragments (121-342 bp) are present in distinct fractions. The method clearly allows a purity level of >99.9%, as fragment of interest is fully separated from backbone fragments.

2.2.2 Size Exclusion Chromatography, Microliter Scale (ChromaSpin-1000)

The ChromaSpin-1000 column (Takara/Clontech) was developed for size-dependent separation of DNA. Suppliers' specifications indicate removal of DNA smaller than 420 bp with an efficiency of at least 90% and a removal efficiency of at least 99% efficiency for DNA smaller than 300 bps. The capacity, for 100 µl sample volume and over 90% recovery, is 1 mg/ml.

A ChromaSpin-1000 column was prepared for use by resuspending the matrix by inverting the column ten times, removing bottom and top cap, and placing the column in a collection tube. The column, with the collection tube, was placed in a 14 ml falcon tube and spun (5 min @ 700×g) at room temperature. Columns were placed in fresh collection tubes, 100 µl sample (MluI/BstZ17I digested plasmid (see 2.1) was applied onto the centre of the column matrix and the column with the collection tube, was placed in a 14 ml falcon tube and spun again (5 min @ 700×g) at room temperature. The eluate in the collection tube is the purified insert.

Figure 4:
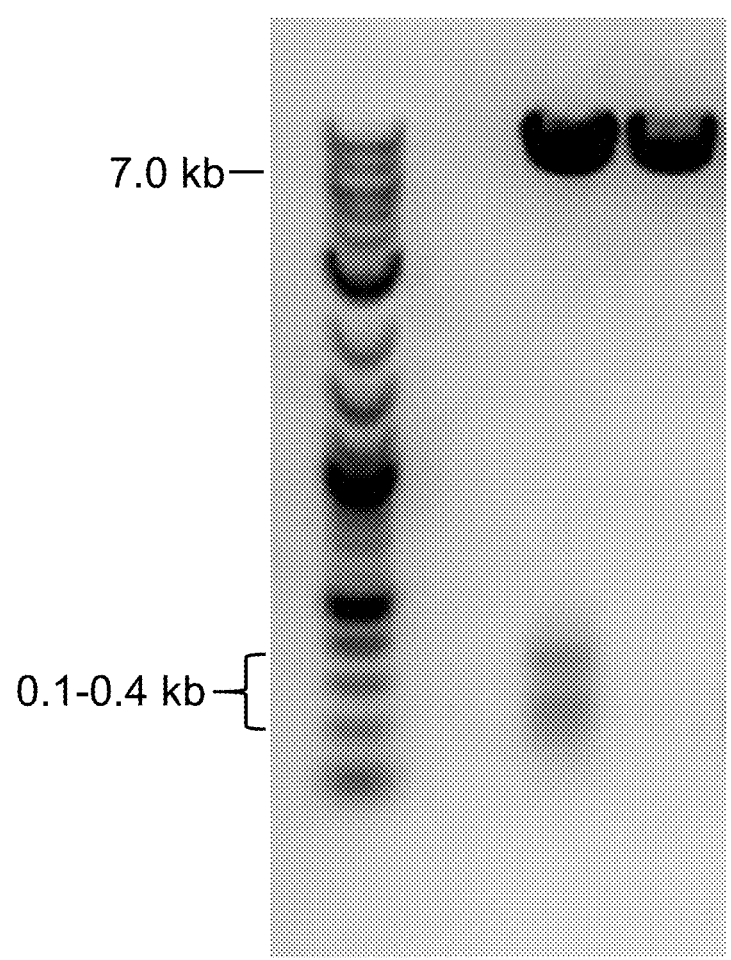

The eluate was analyzed by agarose gel electrophoresis, which indicates that degraded backbone is removed (FIG. 4). Typically, 2-4 mg of plasmid is isolated from 500-600 ml bacterial culture, using Plasmid Maxi Kit (Qiagen). Upon digestion of 100 µl, 1 µg/µl DNA and carrying out clean-up of the insert using the spin column results in 100 µl, 0.4 µg/µl DNA in the filtrate. Thus backbone fragments could be removed after a single non-diluting purification step.

Example 3—Fragment Size and Insert Size can be Matched to Isolation Techniques

Dependent on the applications, insert sizes range from approximately 1500 (an average size of a protein gene) to 7000-10000 bp (for multimeric protein-specific cassettes and selection marker sequences). A bacterial backbone (including a resistance marker) is approximately 2000 bp. In this example it was studied whether the properties of commercially available spin column material can separate the fragments. Such spin columns are highly convenient for isolating an insert.

Figure 5:
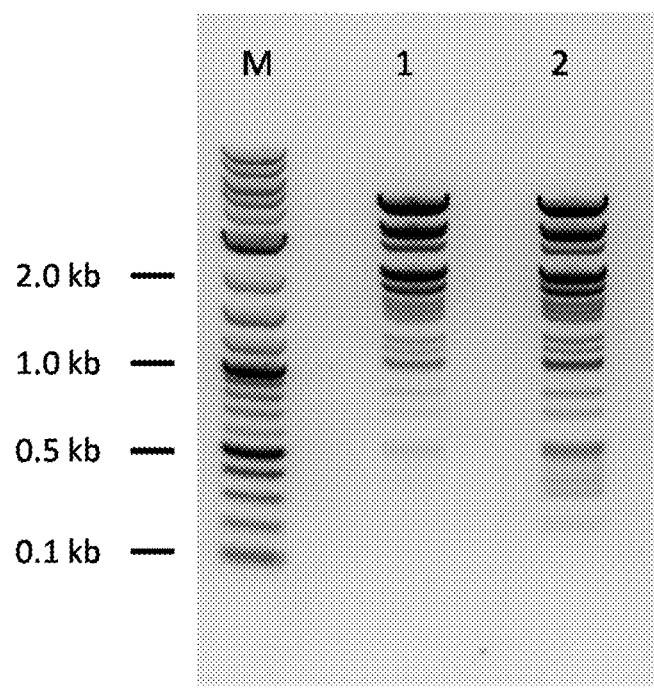
FIG. 5—Separation pattern of spin column material to determine viable ranges of size difference between degraded backbone fragments and insert for a particular spin column. (M): 2 log ladder NEB; (1): Chromaspin1000 eluate of HincII digested λ DNA; (2): HincII digested λ DNA (unpurified).

DNA from Phage Lambda (NEB) was digested with HincII (NEB). Digested DNA was applied on a spin column (see Example 2) and the eluate was analysed by agarose gel electrophoresis (See FIG. 5). Comparison of fragment pattern before and after spin column separation indicates that fragments smaller than 400-500 kb are removed from the eluate whereas fragments larger than 2000 bp are retained in the eluate. Fragments with a size between 500 and 2000 bp are partially captured by the column material. The values are in accordance with the suppliers' specifications which states that over 90% of >2000 bp fragment will in the eluate. With respect to removing fragment DNA it states that over 90% of fragments smaller than 420 bp and over 99% of fragments smaller than 300 bp will be removed from the sample. This confirms that these particular spin columns are best used to remove undesired fragments with a size of 400 bp or smaller from inserts with a size of 2000 bp or larger.

By using different spin column materials (e.g. Sephacryl S-500 HR (GE Healthcare) in columns (Pierce) or Chromaspin 400) differently sized fragments are separated. For the latter, 90% fragments of smaller than 170 bp are captured by the column, while over 90% of the fragments larger than 950 bp freely pass the column (Chroma Spin Columns User Manual, Clontech, February 2011).

Thus, depending on the preferred size of the insert, a degradable vector backbone may be selected with cleavage sites in the backbone that result in fragments which are removed by choosing the best-fitting separation material, using for example spin columns, sephacryl, or other materials.

Example 4—Quality Verification of Insert Isolated from Degraded Backbone 4.1 DNA Purity Analysis of Agarose-Gel Isolated and Shredded-Spin Column Purified DNA The invention allows omitting the use of a purification step (agarose purification) which is prone to chemical and biological contamination of isolated DNA. A key chemical impurity in DNA after isolation from agarose gel is guanidinium, which is used to dissolve agarose gel. Its presence can be detected during DNA concentration determination and analysis with nanodrop measurement equipment (OD 230/OD 260/OD280).

DNA was purified using either Chroma Spin columns or agarose gel isolation. Agarose gel isolation consists of the following steps: 1. Running a quantitative amount of DNA on agarose gel; 2. Isolation of the DNA by cutting out the piece of gel harbouring the DNA of interest; 3. Dissolving the agarose by adding 2 volumes of guanidinium containing buffer per volume of agarose gel; 4. Applying the DNA to column material, rinsing the column material twice and eluting the DNA from the column (in two steps).

The use of spin columns is described in the previous examples. Besides not requiring manual dexterity for cutting out a relevant piece of gel, the spin columns only required about 15 minutes of time, where the gel extraction required about 3 hours in total.

In a gel-extraction experiment one time the protocol was followed meticulously, while in a parallel experiment the centrifugation step was different. DNA quality is measured by absorbance ratio's (260:280 nm and 260:230 nm). Isolation from agarose gel provided the following values for isolated inserts:

Experiment 1: A260/A280=1.79-1.80, A260/A230=0.5-0.75;

Experiment 2: A260/A280=1.86-1.86, A260/A230=1.96-2.11.

Only the values of the second experiment meet common specifications (PCR clean-up Gel extraction User manual NucleoSpin® Gel and PCR Clean-up, Machery-Nagel February 2017/Rev. 04). The cause for the deviating values of the first experiment was attributed to the presence of guanidium due to incomplete removal of the agarose solubilizing buffer. The second experiment was carried out meticulously according to protocol.

The data from three representative insert isolation experiments using the backbone-degradation spin column removal method resulted in the following quality levels:

Experiment 1: A260/A280=1.87, A260/A230=2.01;
Experiment 2: A260/A280=1.85, A260/A230=2.05;
Experiment 3: A260/A280=1.88, A260/A230=1.99.

All three experiments resulted in values that meet specifications. Thus it follows that adequate purification from agarose gel depends on properly carrying out protocol, while purification by (spin)column results in DNA which is of at least the same quality as agarose-gel purified DNA, but which is much more robust in variations in protocol.

4.2 Endotoxin Contamination Measurements

A relevant biological DNA contaminant is endotoxin. The quality of isolated materials is also determined by the risk of the DNA isolation method to introduce endotoxin. Therefore, in a parallel experiment, a comparison was made between the endotoxin level in DNA samples purified using either agarose gel isolation (see example 4.1) or spin columns (see example 2). The detection was carried out using an assay kit. This method utilizes a modified Limulus Amebocyte Lysate (LAL) in the presence of a chromogenic substrate. In the presence of endotoxin the LAL reacts with the substrate resulting in a quantitative change in absorbance. The endotoxin level of samples was determined relative to the amount of endotoxin in a standard range using the manual of the supplier (ToxinSensor™ Chromogenic LAL Endotoxin Assay Kit, GenScript). The absorbance was measured at 540 nm (EnSpire, Perkin Elmer).

Endotoxin levels of 9 spin column purified DNA samples ranged from $3E^{-6}$ to $9E^{-3}$ EU/µg DNA and an average of $2.1E^{-3}$ EU/µg DNA. Conversely, the levels, measured for three gel-purified DNA samples, ranged from $2.6E^{-1}$ to $3.5E^{-1}$ EU/µg DNA, with an average of $3.2E^{-1}$ EU/µg DNA. It follows that the self-immolative vector allows use of convenient techniques that also contribute to avoiding contaminants.

4.3 Functionality of Isolated Inserts

The functionality of backbone degraded-spin column purified fragment of interest was compared with fragment of interest generated by classical digestion-agarose purification. As example the expression of SeAP in stable mammalian cell pools was measured.

4.3.1 Transfection of Agarose Insert and Self-Immolation Insert

Two DNA solutions were made to compare the effect of the DNA purification method on the expression of seAP in CHO-GS-/- cells. The expression cassettes (see Example 2) were identical and harboured an intronic promoter and an additional expression regulating element (see also WO2015/102487). In one case the seAP expression cassette was isolated from the vector backbone using agarose gel isolation (see earlier Example); in the second case MluI/Bst17I digestion of the plasmid, resulting in fragmentation of the backbone, was followed by spin-column purification of the expression cassette (see method in earlier Example).

CHO-GS-/- cells (Horizon Discovery) were maintained per manufacturer's instructions. Quadruplicate transfections were performed using $3E^6$ cells in 3 ml CD CHO medium (Gibco), 5 µg of agarose-gel purified or backbone degraded/spin column purified DNA and 5 µl FreeStyle MAX Reagent (Life Technologies). Post-transfection pools were selected static in 6 well plates in 4 ml CD CHO medium (Gibco) at 37° C., 6% $CO_2$. At the start of recovery cells were transferred to T75 Flasks and cultured into 8-12 ml till a VCD of >$1E^6$ cells/ml and >60% viable.

Cells were transferred to a 125 ml shake flask and cultured until cells reached a viable cell density above 90%. Stable pools were seeded in 30 ml CD forti CHO medium (Gibco) at a density of $4E^5$ cells/ml in shake flasks. The cells were cultured for 9-11 days till viable cell density dropped below 40%. The SeAP exhaust titers were determined with a SEAP Reporter Gene Assay Kit (ab13307, Abcam) using the Enspire (Perkin Elmer).

Exhaust titers of stable cell pools with backbone degraded/spin column purified DNA were 2.0 U/ml, whereas the titer of cells with the agarose fragment isolated DNA was 1.7 U/ml. So the yield of SeAP is similar irrespective whether backbone degraded/spin column purified or agarose-gel purified fragment of interest is used.

In the same experiment the effect of removing the bacterial backbone per se was also determined. Stable cell pools generated with spin column purified, linearized plasmid, i.e. without digesting the plasmid backbone, resulted in an exhaust seAP titer of 1.1 U/ml. This indicates that removal of the backbone by application of the shredder-removal method improves the performance of the expression cassette described in WO 2015/102487.

---

The invention claimed is:

1. A method for separating a polynucleotide insert from a polynucleotide vector backbone, the method comprising the steps of
   i) providing a recombinant polynucleotide vector comprising the insert and the vector backbone, wherein the vector backbone comprises a first plurality of restriction sites that divide the vector backbone into fragments, wherein all fragments have a length of at most 600 bp and at least 40 bp;
   ii) contacting the recombinant vector with cleavage means capable of specifically cleaving the first plurality of restriction sites to produce backbone fragments and the insert; and optionally,
   iii) separating the insert from the backbone fragments of step ii).

2. The method according to claim 1, wherein the separation of step iii uses a technique selected from the group consisting of a spin column, a size exclusion column, and solid phase reversible immobilization (SPRI).

3. The method according to claim 1, wherein the cleavage means are restriction enzymes.

4. The method according to claim 3, wherein the restriction enzyme recognizes a restriction site of 6 or 7 nucleotides.

5. The method according to claim 1, wherein the cleavage means comprise 3, 2, or 1 species of restriction enzymes.

6. The method according to claim 1, wherein the insert inside does not comprise a restriction site of the first plurality of restriction sites.

7. The method according to claim 1, wherein the vector backbone further comprises a polynucleotide encoding a functional selection marker.

8. The method according to claim 7, wherein the polynucleotide encoding a functional selection marker is selected from the group consisting of SEQ ID NOs: 14-18, 79, and 110-116, or is selected from the group consisting of SEQ ID NOs: 69, 70, and 81-88.

9. The method according to claim 1, wherein the fragments have a length of at most 550 bp.

10. The method according to claim 1, wherein the fragments have a length of at most 500, 450, 400, 350, 300, 250, 200, 150, or 100 bp or less.

11. The method according to claim 1, wherein the fragments have a length of at most 550 bp and at least 60 bp.

12. The method according to claim 1, wherein the fragments have a length of at most 450 bp and at least 80 bp.

13. The method according to claim 1, wherein the fragments have a length of at most 400 bp and at least 100 bp.

14. The method according to claim 1, wherein the vector backbone further comprises a multiple cloning site that does not comprise a restriction site of the first plurality of restriction sites.

15. A polynucleotide vector backbone as defined in claim 1.

16. The polynucleotide vector backbone according to claim 15, wherein the vector backbone has at least 70% sequence identity with any one of SEQ ID NOs: 68 and 80.

17. A recombinant polynucleotide vector comprising a polynucleotide insert and the polynucleotide vector backbone as defined in claim 15.

* * * * *

SEQUENCE LISTING

```
Sequence total quantity: 118
SEQ ID NO: 1            moltype = DNA  length = 1835
FEATURE                 Location/Qualifiers
misc_feature            1..1835
                        note = Reference vector backbone
source                  1..1835
                        mol_type = other DNA
                        organism = synthetic construct
SEQUENCE: 1
cacgcgtctt aagaccatgt gagcaaaagg ccagcaaaag gccaggaacc gtaaaaaggc   60
cgcgttgctg gcgtttttcc ataggctccg ccccctgac gagcatcaca aaatcgacg    120
ctcaagtcag aggtggcgaa acccgacagg actataaaga taccaggcgt ttccccctgg   180
aagctccctc gtgcgctctc ctgttccgac cctgccgctt accggatacc tgtccgcctt   240
tctcccttcg ggaagcgtgg cgctttctca tagctcacgc tgtaggtatc tcagttcggt   300
gtaggtcgtt cgctccaagc tgggctgtgt gcacgaaccc cccgttcagc ccgaccgctg   360
cgccttatcc ggtaactatc gtcttgagtc aacccggta agacacgact tatcgccact   420
ggcagcagcc actggtaaca ggattagcag agcgaggtat gtaggcggtg ctacagagtt   480
cttgaagtgg tggcctaact acggctacac tagaagaaca gtatttggta tctgcgctct   540
gctgaagcca gttaccttcg gaaaaagagt tggtagctct tgatccggca acaaaccac    600
cgctggtagc ggtggttttt tgtttgcaa gcagcagatt acgcgcagaa aaaaggatc    660
tcaagaagat cctttgatct ttctacggg gtctgacgct cagtggaacg aaaactcacg   720
ttaagggatt ttggtcatga gattatcaaa aaggatcttc acctagatcc ttttaaatta   780
```

```
aaaatgaagt tttaaatcaa tctaaagtat atatgagtaa acttggtctg acagttagaa   840
aaactcatcg agcatcaaat gaaactgcaa tttattcata tcaggattat caataccata   900
tttttgaaaa agccgtttct gtaatgaagg agaaaactca ccgaggcagt tccataggat   960
ggcaagatcc tggtatcggt ctgcgattcc gactcgtcca acatcaatac aacctattaa  1020
tttccctcg tcaaaataa ggttatcaag tgagaaatca ccatgagtga cgactgaatc   1080
cggtgagaat ggcaaaagtt tatgcatttc tttccagact tgttcaacag gccagccatt  1140
acgctcgtca tcaaaatcac tcgcatcaac caaaccgtta ttcattcgtg attgcgcctg  1200
agcgagacga aatacgcgat cgctgttaaa aggacaatta caaacaggaa tcgaatgcaa  1260
ccggcgcagg aacactgcca gcgcatcaac aatattttca cctgaatcag gatattcttc  1320
taatacctgg aatgctgttt tcccagggat cgcagtggtg agtaaccatg catcatcagg  1380
agtacggata aatgcttga tggtcggaag aggcataaat tccgtcagcc agtttagtct  1440
gaccatctca tctgtaacat cattggcaac gctacctttg ccatgtttca gaaacaactc  1500
tggcgcatcg ggcttcccat acaatcgata gattgtcgca cctgattgcc cgacattatc  1560
gcgagcccat ttatacccat ataaatcagc atccatgttg gaatttaatc gcggcctaga  1620
gcaagacgtt tcccgttgaa tatggctcat actcttcctt tttcaatatt attgaagcat  1680
ttatcagggt tattgtctca tgagcggata catatttgaa tgtatttaga aaaataaaca  1740
aataggggtt ccgcgcacat ttccccgaaa agtgccacct gacgtctaag aaaccattat  1800
tatcatgaca ttaacctata aaaataggcg tatca                              1835

SEQ ID NO: 2           moltype = DNA   length = 4470
FEATURE                Location/Qualifiers
misc_feature           1..4470
                       note = Vector backbone
source                 1..4470
                       mol_type = other DNA
                       organism = synthetic construct
SEQUENCE: 2
ctttcctgcg ttatccctg attctgtgga taaccgtatt accgctagcc aggaagagtt    60
tgtagaaacg caaaaaggcc atccgtcagg atggccttct gcttagtttg atgcctggca   120
gtttatggcg ggcgtcctgc ccgccaccct ccgggccgtc gcttcacaac gttcaaatcc   180
gctcccggcg gatttgtcct actcaggaga gcgttcaccg acaaacaaca gataaaacga   240
aaggcccagt cttccgactg agcctttcgt tttatttgat gcctggcagt tccctactct   300
cgcgttaacg ctagcatgga tctcgggccc caaataatga ttttattttg actgatagtg   360
acctgttcgt tgcaacaaat tgatgagcaa tgcttttta taatgccaag tttgtacaaa   420
aaagcagaac gagaaacgta aaatgatata aatatcaata tattaaatta gattttgcat   480
aaaaaacaga ctacataata ctgtaaaaca aacacatatcc agtcactatg aatcaactac   540
ttagatggta ttagtgacct gtagtcgacc gacagccttc caaatgttct tcgggtgatg   600
ctgccaactt agtcgaccga cagccttcca aatgttcttc tcaaacggaa tcgtcgtatc   660
cagcctactc gctattgtcc tcaatgccgt attaaatcat aaaaagaaat aagaaaaaga   720
ggtgcgagcc tcttttttgt gtgacaaaat aaaaacatct acctattcat atacgctagt   780
gtcatagtcc tgaaaatcat ctgcatcaag aacaatttca caactcttat acttttctct   840
tacaagtcgt tcggcttcat ctggattttc agcctctata cttactaaac gtgataaagt   900
ttctgtaatt tctactgtat cgacctgcag actggctgtg tataagggag cctgacattt   960
atattcccca gaacatcagg ttaatggcgt ttttgatgtc attttcgcgg tggctgagat  1020
cagccacttc ttccccgata acggagaccg gcacactggc catatcggtg gtcatcatgc  1080
gccagctttc atccccgata tgcaccaccg ggtaaagttc acgggagact ttatctgaca  1140
gcagacgtgc actggccagg gggatcacca tccgtcgccc gggcgtgtca ataatatcac  1200
tctgtacatc cacaaacaga cgataacggc tctctctttt ataggtgtaa accttaaact  1260
gcatttcacc agtcccgttt ctcgtcagca aaagagccgt tcatttcaat aaaacggggcg  1320
acctcagcca tcccttcctg attttccgct ttccagcgtt cggcacgcag acgacgggct  1380
tcattctgca tggttgtgct taccagaccg gagatattga catcatatat gccttgacga  1440
actgatagct gtcgctgtca actgtcactg taatacgctg cttcatagca cacctctttt  1500
tgacatactt cgggtataca tatcagtata tattcttata ccgcaaaaat cagcgcgcaa  1560
atacgcatac tgttatctgg cttttagtaa gccggatcca cgcgattacg ccccgccctg  1620
ccactcatcg cagtactgtt gtaattcatt aagcattctg ccgacatgga agccatcaca  1680
gacggcatga tgaacctgaa tcgccagcgg catcagcacc ttgtcgcctt gcgtataata  1740
tttgcccatg tgaaaacgg gggcgaagaa gttgtccata ttggcacgt ttaaatcaaa   1800
actggtgaaa ctcacccagg gattggctga acgaaaaac atattctcaa taaaccctt   1860
agggaaatag gccaggtttt caccgtaaca cgccacatct tgcgaatata tgtgtagaaa  1920
ctgccggaaa tcgtcgtggt attcactcca gagcgatgaa aacgtttcag tttgctcatg  1980
gaaaacggtg taacaagggt gaacactatc ccatatcacc agctcaccgt ctttcattgc  2040
catacggaat tccggatgag cattcatcag cgggcaaga atgtgaataa aggccggata  2100
aaacttgtgc ttattttttct ttacggtctt taaaaaggcc gtaatatcca gctgaacggt  2160
ctggttatag gtacattgag caactgactg aaatgcctca aaatgttctt tacgatgcca  2220
ttgggatata tcaacggtgg tatatccagt gatttttttc tccatttag cttccttagc   2280
tcctgaaaat ctcgataact caaaaatac gcccggtagt gatcttattt cattatggtg  2340
aaagttggaa cctcttacgt gccgatcaac gtctcatttt cgccaaaagt tggcccaggg  2400
cttcccggta tcaacaggga caccaggatt tatttattct gcgaagtgat cttccgtcac  2460
aggtatttat tcggcgcaaa gtgcgtcggg tgatgctgcc aacttagtcg actacaggtc  2520
actaatacca tctaagtagt tgattcatag tgactggata tgttgtgttt tacagtatta  2580
tgtagtctgt tttttatgca aaatctaatt taatatattg atatttatat cattttacgt  2640
ttctcgttca gctttcttgt acaaagtggg cattataaga aagcattgct tatcaatttg  2700
ttgcaacgaa caggtcacta tcagtcaaaa taaaatcatt atttgccatc cagctgcagc  2760
tctggcccgt gtctcaaaat ctctgatgtt acattgcaca agataaaaat atatcatcat  2820
gaacaataaa actgtctgct tacataaaca gtaatacaag gggtgttatg agccatattc  2880
aacgggaaac gtcgaggccg cgattaaatt ccaacatgga tgctgattta tatgggtata  2940
aatgggctcg cgataatgtc gggcaatcag gtgcgacaat ctatcgcttg tatgggaagc  3000
ccgatgcgcc agagttgttt ctgaaacatg gcaaggtag cgttgccaat gatgttacag  3060
atgagatggt cagactaaac tggctgacgg aatttatgcc tcttccgacc atcaagcatt  3120
```

```
ttatccgtac tcctgatgat gcatggttac tcaccactgc gatccccgga aaaacagcat  3180
tccaggtatt agaagaatat cctgattcag gtgaaaatat tgttgatgcg ctggcagtgt  3240
tcctgcgccg gttgcattcg attcctgttt gtaattgtcc ttttaacagc gatcgctat   3300
ttcgtctcgc tcaggcgcaa tcacgaatga ataacggttt ggttgatgcg agtgattttg  3360
atgacgagcg taatggctgg cctgttgaac aagtctggaa agaaatgcat aaacttttgc  3420
cattctcacc ggattcagtc gtcactcatg gtgatttctc acttgataac cttattttta  3480
acgaggggaa attaataggt tgtattgatg ttggacgagt cggaatcgca gaccgatacc  3540
aggatcttgc catcctatgg aactgcctcg gtgagttttc tccttcatta cagaaacggc  3600
tttttcaaaa atatggtatt gataatcctg atatgaataa attgcagttt catttgatgc  3660
tcgatgagtt tttctaatca gaattggtta attggttgta acactggcag agcattacgc  3720
tgacttgacg ggacgcgcag agctcatgac caaaatccct taacgtgagt tttcgttcca  3780
ctgagcgtca gaccccgtag aaaagatcaa aggatcttct tgagatcctt ttttctgcg   3840
cgtaatctgc tgcttgcaaa caaaaaaacc accgctacca gcggtggttt gtttgccgga  3900
tcaagagcta ccaactcttt ttccgaaggt aactggcttc agcagagcgc agataccaaa  3960
tactgtcctt ctagtgtagc cgtagttagg ccaccacttc aagaactctg tagcaccgcc  4020
tacatacctc gctctgctaa tcctgttacc agtggctgct gccagtggcg ataagtcgtg  4080
tcttaccggg ttggactcaa gacgatagtt accggataag gcgcagcggt cgggctgaac  4140
ggggggttcg tgcacacagc ccagcttgga gcgaacgacc tacaccgaac tgagatacct  4200
acagcgtgag ctatgagaaa gcgccacgct tcccgaaggg agaaaggcgg acaggtatcc  4260
ggtaagcggc agggtcggaa caggagagcg cacgagggga cttccagggg gaaacgcctg  4320
gtatctttat agtcctgtcg ggtttcgcca cctctgactt gagcgtcgat ttttgtgatg  4380
ctcgtcaggg gggcggagcc tatggaaaaa cgccagcaac gcggcctttt tacggttcct  4440
ggccttttgc tggccttttg ctcacatgtt                                    4470

SEQ ID NO: 3           moltype = DNA  length = 3000
FEATURE                Location/Qualifiers
misc_feature           1..3000
                       note = Vector backbone
source                 1..3000
                       mol_type = other DNA
                       organism = synthetic construct
SEQUENCE: 3
gggcgaattg ggcccgacgt cgcatgctcc cggccgccat ggccgcggga tatcactagt   60
gcggccgcct gcaggtcgac catatgggag agctcccaac gcgttggatg catagcttga   120
gtattctata gtgtcaccta aatagcttgg cgtaatcatg gtcatagctg tttcctgtgt   180
gaaattgtta tccgctcaca attccacaca acatacgagc cggaagcata agtgtaaag   240
cctggggtgc ctaatgagtg agctaactca cattaattgc gttgcgctca ctgcccgctt   300
tccagtcggg aaacctgtcg tgccagctgc attaatgaat cggccaacgc gcggggagag   360
gcggtttgcg tattgggcgc tcttccgctt cctcgctcac tgactcgctg cgctcggtcg   420
ttcggctgcg gcgagcggta tcagctcact caaaggcgg aatacggtta ccacagaat    480
caggggataa cgcaggaaag aacatgtgag caaaaggcca gcaaaaggcc aggaaccgta   540
aaaaggccgc gttgctggcg ttttccata ggctccgccc cctgacgag catcacaaaa    600
atcgacgctc aagtcagagg tggcgaaacc cgacaggact ataaagatac caggcgtttc   660
ccccctggaag ctccctcgtg cgctctcctg ttccgaccct gccgcttacc ggatacctgt   720
ccgcctttct cccttcggga agcgtggcgc tttctcatag ctcacgctgt aggtatctca   780
gttcggtgta ggtcgttcgc tccaagctgg gctgtgtgca cgaaccccc gttcagccg    840
accgctgcgc cttatccggt aactatcgtc ttgagtccaa cccggtaaga cacgacttat   900
cgccactggc agcagccact ggtaacagga ttagcagagc gaggtatgta ggcggtgcta   960
cagagttctt gaagtggtgg cctaactacg gctacactag aagaacagta tttggtatct  1020
gcgctctgct gaagccagtt accttcggaa aaagagttgg tagctcttga tccggcaaac  1080
aaaccaccgc tggtagcggt ggtttttttg tttgcaagca gcagattacg cgcagaaaaa  1140
aaggatctca agaagatcct ttgatctttt ctacggggtc tgacgctcag tggaacgaaa  1200
actcacgtta agggatttg gtcatgagat tatcaaaaag gatcttcacc tagatccttt   1260
taaattaaaa atgaagtttt aaatcaatct aaagtatata tgagtaaact tggtctgaca  1320
gttaccaatg cttaatcagt gaggcaccta tctcagcgat ctgtctattt cgttcatcca  1380
tagttgcctg actccccgtc gtgtagataa ctacgatacg ggagggctta ccatctggcc  1440
ccagtgctgc aatgataccg cgagacccac gctcaccggc tccagattta tcagcaataa  1500
accagccagc cggaagggcc gagcgcagaa gtggtcctgc aactttatcc gcctccatcc  1560
agtctattaa ttgttgccgg gaagctagag taagtagttc gccagttaat agtttgcgca  1620
acgttgttgc cattgctaca ggcatcgtgg tgtcacgctc gtcgtttggt atggcttcat  1680
tcagctccgg ttcccaacga tcaaggcgag ttacatgatc cccatgttg tgcaaaaaag  1740
cggttagctc cttcggtcct ccgatcgttg tcagaagtaa gttggccgca gtgttatcac  1800
tcatggttat ggcagcactg cataattctc ttactgtcat gccatccgta agatgctttt  1860
ctgtgactgg tgagtactca accaagtcat tctgagaata gtgtatgcgg cgaccgagtt  1920
gctcttgccc ggcgtcaata cgggataata ccgcgccaca tagcagaact ttaaaagtgc  1980
tcatcattgg aaaacgttct tcggggcgaa aactctcaag gatcttaccg ctgttgagat  2040
ccagttcgat gtaacccact cgtgcaccca actgatcttc agcatctttt actttcacca  2100
gcgtttctgg gtgagcaaaa acaggaaggc aaaatgccgc aaaaaaggga ataagggcga  2160
cacggaaatg ttgaatactc atactcttcc tttttcaata ttattgaagc atttatcagg  2220
gttattgtct catgagcgga tacatatttg aatgtattta gaaaaataaa caaataggg   2280
ttccgcgcac atttccccga aaagtgccac ctgatgcgt gtgaaatacc gcacagatgc   2340
gtaaggagaa ataccgcat caggaaattg taagcgttaa tattttgtta aaattcgcgt   2400
taaattttt ttaaatcagc tcattttta accaataggc cgaaatcggc aaaatccctt    2460
ataaatcaaa agaatagacc gagatagggt tgagtgttgt tccagtttgg aacaagagtc  2520
cactattaaa gaacgtggac tccaacgtca aagggcgaaa aaccgtctat cagggcgatg  2580
gcccactacg tgaaccatca ccctaatcaa gttttttggg gtcgaggtgc cgtaaagcac  2640
taaatcggaa cccaaagggg agcccccgat ttagagcttg acggggaaag ccggcgaacg  2700
tggcgagaaa ggaagggaag aaagcgaaag gagcgggcgc tagggcgctg gcaagtgtag  2760
cggtcacgct gcgcgtaacc accacacccg ccgcgcttaa tgcgccgcta cagggcgcgt  2820
```

-continued

```
ccattcgcca ttcaggctgc gcaactgttg ggaagggcga tcggtgcggg cctcttcgct  2880
attacgccag ctggcgaaag ggggatgtgc tgcaaggcga ttaagttggg taacgccagg  2940
gttttcccag tcacgacgtt gtaaaacgac ggccagtgaa ttgtaatacg actcactata  3000
```

| SEQ ID NO: 4 | moltype = DNA length = 5428 |
|---|---|
| FEATURE | Location/Qualifiers |
| misc_feature | 1..5428 |
| | note = Vector backbone |
| source | 1..5428 |
| | mol_type = other DNA |
| | organism = synthetic construct |

SEQUENCE: 4

```
gacggatcgg gagatctccc gatcccctat ggtgcactct cagtacaatc tgctctgatg   60
ccgcatagtt aagccagtat ctgctccctg cttgtgtgtt ggaggtcgct gagtagtgcg  120
cgagcaaaat ttaagctaca acaaggcaag gcttgaccga caattgcatg aagaatctgc  180
ttagggttag gcgttttgcg ctgcttcgcg atgtacgggc cagatatacg cgttgacatt  240
gattattgac tagttattaa tagtaatcaa ttacggggtc attagttcat agcccatata  300
tggagttccg cgttacataa cttacggtaa atggcccgcc tggctgaccg cccaacgacc  360
cccgcccatt gacgtcaata atgacgtatg ttcccatagt aacgccaata gggactttcc  420
attgacgtca atgggtggag tatttacggt aaactgccca cttggcagta catcaagtgt  480
atcatatgcc aagtacgccc cctattgacg tcaatgacgg taaatggccc gcctggcatt  540
atgcccagta catgacctta tgggactttc ctacttggca gtacatctac gtattagtca  600
tcgctattac catggtgatg cggttttggc agtacatcaa tgggcgtgga tagcggtttg  660
actcacgggg atttccaagt ctccacccca ttgacgtcaa tgggagtttg ttttggcacc  720
aaaatcaacg ggactttcca aaatgtcgta acaactccgc cccattgacg caaatgggcg  780
gtaggcgtgt acggtgggag gtctatataa gcagagctct ctggctaact agagaaccca  840
ctgcttactg gcttatcgaa attaatacga ctcactatag ggagacccaa gctggctagc  900
gtttaaactt aagcttggta ccgagctcgg atccactagt ccagtgtggt ggaattctgc  960
agatatccag cacagtggcg gccgctcgag tctagagggc ccgtttaaac ccgctgatca 1020
gcctcgactg tgccttctag ttgccagcca tctgttgttt gcccctcccc cgtgccttcc 1080
ttgaccctgg aaggtgccac tcccactgtc ctttcctaat aaaatgagga aattgcatcg 1140
cattgtctga gtaggtgtca ttctattctg ggggGtgggg tggGcagga cagcaagggg 1200
gaggattggg aagacaatag caggcatgct ggggatgcgg tgggctctat ggcttctgag 1260
gcggaaagaa ccagctgggg ctctaggggg tatccccacg cgccctgtag cggcgcatta 1320
agcgcggcgg gtgtggtggt tacgcgcagc gtgaccgcta cacttgccag cgccctagcg 1380
cccgctcctt tcgctttctt cccttccttt ctcgccacgt tcgccggctt tccccgtcaa 1440
gctctaaatc gggggctccc tttagggttc cgatttagtg ctttacggca cctcgacccc 1500
aaaaaacttg attagggtga tggttcacgt agtgggccat cgccctgata cggttttttt 1560
cgccctttga cgttggagtc cacgttcttt aatagtggac tcttgttcca aactggaaca 1620
acactcaacc ctatctcggt ctattctttt gatttataag gattttgcc gatttcggcc 1680
tattggttaa aaaatgagct gatttaacaa aaatttaacg cgaattaatt ctgtggaatg 1740
tgtgtcagtt agggtgtgga agtccccag gctcccagc aggcagaagt atgcaaagca 1800
tgcatctcaa ttagtcagca accaggtgtg gaaagtcccc aggctcccca gcaggcagaa 1860
gtatgcaaag catgcatctc aattagtcag caaccatagt cccgcccta actccgccca 1920
tcccgcccct aactccgccc agttccgccc attctccgcc ccatggctga ctaattttttt 1980
ttatttatgc agaggccgag gccgcctctg cctctgagct attccagaag tagtgaggag 2040
gcttttttgg aggcctaggc ttttgcaaaa agctcccggg agcttgtata tccatttttcg 2100
gatctgatca agagacagga tgaggatcgt ttcgcatgat tgaacaagat ggattgcacg 2160
caggttctcc ggccgcttgg gtggagaggc tattcggcta tgactgggca acagacaa 2220
tcggctgctc tgatgccgcc gtgttccggc tgtcagcgca gggGcgcccg gttcttttttg 2280
tcaagaccga cctgtccggt gccctgaatg aactgcagga cgaggcagcg cggctatcgt 2340
ggctggccac gacgggcgtt ccttgcgcag ctgtgctcga cgttgtcact gaagcggaa 2400
gggactggct gctattgggc gaagtgccgg ggcaggatct cctgtcatct caccttgctc 2460
ctgccgagaa agtatccatc atggctgatg caatgcggcg gctgcatacg cttgatccgg 2520
ctacctgccc attcgaccac caagcgaaac atcgcatcga gcgagcacgt actcggatgg 2580
aagccggtct tgtcgatcag gatgatctgg acgaagagca tcaggggctc gcgccagccg 2640
aactgttcgc caggctcaag gcgcgcatgc ccgacggcga ggatctcgtc gtgacccatg 2700
gcgatgcctg cttgccgaat atcatggtgg aaaatggccg cttttctgga ttcatcgact 2760
gtggccggct gggtgtggcg gaccgctatc aggacatagc gttggctacc cgtgatattg 2820
ctgaagagct tggcggcgaa tgggctgacc gcttcctcgt gctttacggt atcgccgctc 2880
ccgattcgca gcgcatcgcc ttctatcgcc ttcttgacga gttcttctga gcgggactct 2940
ggggttcgaa atgaccgacc aagcgacgcc caacctgcca tcacgagatt cgattccac 3000
cgccgccttc tatgaaaggt tgggcttcgg aatcgttttc cgggacgccg gctggatgat 3060
cctccagcgc gggGatctca tgctggagtt cttcgcccac cccaacttgt ttattgcagc 3120
ttataatggt tacaaataaa gcaatagcat cacaaatttc acaaataaag catttttttc 3180
actgcattct agttgtggtt tgtccaaact catcaatgta tcttatcatg tctgtatacc 3240
gtcgacctca gctagagct tggcgtaatc atggtcatag ctgtttcctg tgtgaaattg 3300
ttatccgctc acaattccac acaacatacg agccggaagc ataaagtgta aagcctgggg 3360
tgcctaatga gtgagctaac tcacattaat tgcgttgcgc tcactgcccg ctttccagtc 3420
gggaaacctg tcgtgccagc tgcattaat aatcggccaa cgcgcgggga gaggcggttt 3480
gcgtattggg cgctcttccg cttcctcgct cactgactcg ctgcgctcgg tcgttcggct 3540
gcggcgagcg gtatcagctc actcaaaggc ggtaatacgg ttatccacag aatcagggga 3600
taacgcagga aagaacatgt gagcaaaagg ccagcaaaag gccaggaacc gtaaaaaggc 3660
cgcgttgctg gcgtttttcc ataggctccg cccccctgac gagcatcaca aaaatcgacg 3720
ctcaagtcag aggtggcgaa acccgacagg actataaaga taccaggcgt tccccctgg 3780
aagctccctc gtgcgctctc ctgttccgac cctgccgctt accggatacc tgtccgcctt 3840
tctcccttcg ggaagcgtgg cgcttttctca tagctcacgc tgtaggtatc tcagttcggt 3900
gtaggtcgtt cgctccaagc tgggctgtgt gcacgaaccc cccgttcagc ccgaccgctg 3960
cgccttatcc ggtaactatc gtcttgagtc aacccggta agacacgact tatcgccact 4020
```

```
ggcagcagcc actggtaaca ggattagcag agcgaggtat gtaggcgtg  ctacagagtt  4080
cttgaagtgg tggcctaact acggctacac tagaagaaca gtatttggta tctgcgctct  4140
gctgaagcca gttaccttcg gaaaaagagt tggtagctct tgatccggca aacaaaccac  4200
cgctggtagc ggttttttg  tttgcaagca gcagattacg cgcagaaaaa aaggatctca  4260
agaagatcct ttgatctttt ctacggggtc tgacgctcag tggaacgaaa actcacgtta  4320
agggattttg gtcatgagat tatcaaaaag gatcttcacc tagatccttt taaattaaaa  4380
atgaagtttt aaatcaatct aaagtatata tgagtaaact tggtctgaca gttaccaatg  4440
cttaatcagt gaggcaccta tctcagcgat ctgtctattt cgttcatcca tagttgcctg  4500
actccccgtc gtgtagataa ctacgatacg ggagggctta ccatctggcc ccagtgctgc  4560
aatgataccg cgagacccac gctcaccggc tccagattta tcagcaataa accagccagc  4620
cggaagggcc gagcgcagaa gtggtcctgc aactttatcc gcctccatcc agtctattaa  4680
ttgttgccgg gaagctagag taagtagttc gccagttaat agtttgcgca acgttgttgc  4740
cattgctaca ggcatcgtgg tgtcacgctc gtcgtttggt atggcttcat tcagctccgg  4800
ttcccaacga tcaaggcgag ttacatgatc cccatgttgt gcaaaaaag  cggttagctc  4860
cttcggtcct ccgatcgttg tcagaagtaa gttggccgca gtgttatcac tcatggttat  4920
ggcagcactg cataattctc ttactgtcat gccatccgta agatgctttt ctgtgactgg  4980
tgagtactca accaagtcat tctgagaata gtgtatgcgg cgaccgagtt gctcttgccc  5040
ggcgtcaata cgggataata ccgcgccaca tagcagaact ttaaaagtgc tcatcattgg  5100
aaaacgttct cggggcgaa  aactctcaag gatcttaccg ctgttgagat ccagttcgat  5160
gtaacccact cgtgcaccca actgatcttc agcatctttt actttcacca gcgtttctgg  5220
gtgagcaaaa acaggaaggc aaaatgccgc aaaaagggaa taagggcga  cacggaaatg  5280
ttgaatactc atactcttcc ttttcaata  ttattgaagc atttatcagg gttattgtct  5340
catgagcgga tacatatttg aatgtattta gaaaaataaa caaatagggg ttccgcgcac  5400
atttccccga aaagtgccac ctgacgtc                                     5428

SEQ ID NO: 5        moltype = DNA  length = 2710
FEATURE             Location/Qualifiers
misc_feature        1..2710
                    note = Vector backbone
source              1..2710
                    mol_type = other DNA
                    organism = synthetic construct
SEQUENCE: 5
tcgcgcgttt cggtgatgac ggtgaaaacc tctgacacat gcagctcccg gagacggtca  60
cagcttgtct gtaagcggat gccgggagca gacaagcccg tcagggcgcg tcagcgggtg  120
ttggcgggtg tcgggctgg  cttaactatg cggcatcaga gcagattgta ctgagagtgc  180
accatatgcg gtgtgaaata ccgcacagat gcgtaaggag aaaataccgc atcaggcgcc  240
attcgccatt caggctgcgc aactgttggg aagggcgatc ggtgcgggcc tcttcgctat  300
tacgccagct ggcgaaaggg ggatgtgctg caaggcgatt aagttgggta acgccagggt  360
tttcccagtc acgacgttgt aaaacgacgg ccagtgaatt cgagctcggt acctcgcgaa  420
tgcatctaga tatcggatcc cgggcccgtc gactgcagag gcctgcatgc aagcttggcg  480
taatcatggt catagctgtt tcctgtgtga aattgttatc cgctcacaat tccacacaac  540
atacgagccg gaagcataaa gtgtaaagcc tggggtgcct aatgagtgag ctaactcaca  600
ttaattgcgt tgcgctcact gcccgctttc cagtcgggaa acctgtcgtg ccagctgcat  660
taatgaatcg gccaacgcgc ggggagaggc ggtttgcgta ttgggcgctc ttccgcttcc  720
tcgctcactg actcgctgcg ctcggtcgtt cggctgcggc gagcggtatc agctcactca  780
aaggcggtaa tacggttatc cacagaatca ggggataacg caggaaagaa catgtgagca  840
aaaggccagc aaaaggccag gaaccgtaaa aaggccgcgt tgctggcgtt tttccatagg  900
ctccgccccc ctgacgagca tcacaaaaat cgacgctcaa gtcagaggtg gcgaaacccg  960
acaggactat aaagatacca ggcgtttccc cctggaagct ccctcgtgcg ctctcctgtt  1020
ccgaccctgc cgcttaccgg atacctgtcc gcctttctcc cttcgggaag cgtggcgctt  1080
tctcatagct cacgctgtag gtatctcagt tcggtgtagg tcgttcgctc caagctgggc  1140
tgtgtgcacg aaccccccgt tcagcccgac cgctgcgcct tatccggtaa ctatcgtctt  1200
gagtccaacc cggtaagaca cgacttatcg ccactggcag cagccactgg taacaggatt  1260
agcagagcga ggtatgtagg cggtgctaca gagttcttga agtggtggcc taactacgcg  1320
tacactagaa gaacagtatt tggtatctgc gctctgctga agccagttac cttcggaaaa  1380
agagttggta gctcttgatc cggcaaacaa accaccgctg gtagcggtgg ttttttgtt   1440
tgcaagcagc agattacgcg cagaaaaaaa ggatctcaag aagatccttt gatcttttct  1500
acggggtctg acgctcagtg gaacgaaaac tcacgttaag ggattttggt catgagatta  1560
tcaaaaagga tcttcaccta gatccttta aattaaaaat gaagttttaa atcaatctaa  1620
agtatatatg agtaaacttg gtctgacagt taccaatgct taatcagtga ggcacctatc  1680
tcagcgatct gtctatttcg ttcatccata gttgcctgac tccccgtcgt gtagataact  1740
acgatacggg agggcttacc atctggcccc agtgctgcaa tgataccgcg agacccacgc  1800
tcaccggctc cagatttatc agcaataaac cagccagccg gaagggccga gcgcagaagt  1860
ggtcctgcaa ctttatccgc ctccatccag tctattaatt gttgccggga agctagagta  1920
agtagttcgc cagttaatag tttgcgcaac gttgttgcca ttgctacagg catcgtggtg  1980
tcacgctcgt cgtttggtat ggcttcattc agctccggtt cccaacgatc aaggcgagtt  2040
acatgatccc ccatgttgtg caaaaaagcg gttagctcct tcggtcctcc gatcgttgtc  2100
agaagtaagt tggccgcagt gttatcactc atggttatgg cagcactgca taattctctt  2160
actgtcatgc catccgtaag atgcttttct gtgactggtg agtactcaac caagtcattc  2220
tgagaatagt gtatgcggcg accgagttgc tcttgcccgg cgtcaatacg ggataatacc  2280
gcgccacata gcagaacttt aaaagtgctc atcattggaa aacgttcttc ggggcgaaaa  2340
ctctcaagga tcttaccgct gttgagatcc agttcgatgt aacccactcg tgcacccaac  2400
tgatcttcag catcttttac tttcaccagc gtttctggga gcaaaaac  aggaaggcaa  2460
aatgccgcaa aaagggaat  aagggcgaca cggaaatgtt gaatactcat actcttcctt  2520
tttcaatatt attgaagcat ttatcagggt tattgtctca tgagcggata catatttgaa  2580
tgtatttaga aaaataaaca ataggggtt  ccgcgcacat ttccccgaaa agtgccacct  2640
gacgtctaag aaaccattat tatcatgaca ttaacctata aaaataggcg tatcacgagg  2700
cccttttcgtc                                                        2710
```

```
SEQ ID NO: 6              moltype = DNA  length = 5900
FEATURE                   Location/Qualifiers
misc_feature              1..5900
                          note = Vector backbone
source                    1..5900
                          mol_type = other DNA
                          organism = synthetic construct
SEQUENCE: 6
atccggatat agttcctcct ttcagcaaaa aaccccctcaa gacccgttta gaggccccaa    60
ggggttatgc tagttattgc tcagcggtgg cagcagccaa ctcagcttcc tttcgggctt   120
tgttagcagc cggatctcag tggtggtggt ggtggtgctc gagtgcggcc gcaagcttgt   180
cgacggagct cgaattcgga tccgatatca gccatggcct tgtcgtcgtc gtcggtaccc   240
agatctgggc tgtccatgtg ctggcgttcg aatttagcag cagcggtttc tttcatacca   300
gaaccgcgtg gcaccagacc agaagaatga tgatgatgat ggtgcatatg gccagaacca   360
gaaccggcca ggttagcgtc gaggaactct ttcaactgac ctttagacag tgcacccact   420
ttggttgccg ccacttcacc gttttttgaac agcagcagag tcgggatacc acggatgcca   480
tatttcggcg cagtgccagg gttttgatcg atgttcagtt ttgcaacggt cagtttgccc   540
tgatattcgt cagcgatttc atccagaatc ggggcgatca ttttgcacgg accgcaccac   600
tctgcccaga aatcgacgag gatcgccccg tccgctttga gtacatccgt gtcaaaactg   660
tcgtcagtca ggtgaataat tttatcgctc atatgtatat ctccttctta aagttaaaca   720
aaattatttc tagaggggaa ttgttatccg ctcacaattc ccctatagtg agtcgtatta   780
atttcgcggg atcgagatcg atctcgatcc tctacgccgg acgcatcgtg gccggcatca   840
ccggcgccac aggtgcggtt gctggcgcct atatcgccga catcaccgat ggggaagatc   900
gggctcgcca cttcgggctc atgagcgctt gtttcggcgt gggtatggtg gcaggccccg   960
tggccggggg actgttgggc gccatctcct gcatgcacc attccttgcg gcggcggtgc  1020
tcaacggcct caacctacta ctgggctgct tcctaatgca ggagtcgcat aagggagagc  1080
gtcgagatcc cggacaccat cgaatggcgc aaaacctttc gcggtatggc atgatagcgc  1140
ccggaagaga gtcaattcag gtggtgaat gtgaaaccag taacgttata cgatgtcgca  1200
gagtatgccg gtgtccttta tcagaccgtt tcccgcgtgg tgaaccaggc cagccacgtt  1260
tctgcgaaaa cgcgggaaaa agtggaagcg gcgatggcgg agctgaatta cattcccaac  1320
cgcgtggcac aacaactggc gggcaaacag tcgttgctga ttggcgttgc cacctccagt  1380
ctggccctgc acgcgccgtc gcaaattgtc gcggcgatta atctcgcgc cgatcaactg  1440
ggtgccagcg tggtggtgtc gatggtagaa cgaagcggcg tcgaagcctg taaagcggcg  1500
gtgcacaatc ttctcgcgca acgcgtcagt gggctgatca ttaactatcc gctggatgac  1560
caggatgcca ttgctgtgga agctgcctgc actaatgttc cggcgttatt tcttgatgtc  1620
tctgaccaga cacccatcaa cagtattatt ttctcccatg aagacggtac gcgactgggc  1680
gtggagcatc tggtcgcatt gggtcaccag caaatcgcgc tgttagcggg cccattaagt  1740
tctgtctcgg cgcgtctgcg tctgcctggc tggcataaat atctcactcg caatcaaatt  1800
cagccgatag cggaacggga aggcgactgg agtgccatgt ccggttttca acaaaccatg  1860
caaatgctga atgagggcat cgttcccact gcgatgctgg ttgccaacga tcagatggcg  1920
ctgggcgcaa tgcgcgccat taccgagtcc gggctgcgcg ttggtgcgga catctcggta  1980
gtgggatacg acgataccga agacagctca tgttatatcc cgccgttaac caccatcaaa  2040
caggattttc gcctgctggg gcaaaccagc gtggaccgct tgctgcaact ctctcagggc  2100
caggcggtga agggcaatca gctgttgccc gtctcactgg tgaaaagaa aaccaccctg  2160
gcgcccaata cgcaaaccgc ctctccccgc gcgttggccg attcattaat gcagctggca  2220
cgacaggttt cccgactgga aagcgggcag tgagcgcaac gcaattaatg taagttagct  2280
cactcattag gcaccgggat ctcgaccgat gcccttgaga gccttcaacc cagtcagctc  2340
cttccggtgg gcgcggggca tgactatcgt cgccgcactt atgactgtct ctttatcat  2400
gcaactcgta ggacaggtgc cggcagcgct ctgggtcatt tcggcgagga ccgctttcg  2460
ctgagcgcg acgatgatcg gcctgtcgct tgcggtattc ggaatcttgc acgccctcg  2520
tcaagcctc gtcactggtc ccgccaccaa acgtttcggc gagaagcagg ccattatccg  2580
cggcatggcg gcccacgggt gcgcatgat cgtgctcctg tcgttgagga cccggctagg  2640
ctggcggggt gccttactg gttagcagaa tgaatcaccg atacgcgagc gaacgtgaag  2700
cgactgctgc tgcaaaacgt ctgcgacctg agcaacaaca tgaatggtct tcggtttccg  2760
tgtttcgtaa agtctggaaa cgcggaagtc agcgccctgc accattatgt tccggatctg  2820
catcgcagga tgctgctggc tacccctgtgg aacacctaca tctgtattaa cgaagcgctg  2880
gcattgaccc tgagtgattt ttctctggtc ccgccgcatc cataccgcca gttgtttacc  2940
ctcacaacgt tccagtaacc gggcatgttc atcatcagta acccgtatcg tgagcatcct  3000
ctctcgtttc atcggtatca ttacccccat gaacagaaat cccccttaca cggaggcatc  3060
agtgaccaaa caggaaaaaa ccgcccttaa catggcccgc tttatcagaa gccagacatt  3120
aacgcttctg gagaaactca acgagctgga cgcggatgaa caggcagaca tctgtgaatc  3180
gcttcacgac cacgctgatg agctttaccg cagctgcctc gcgcgtttcg gtgatgacgg  3240
tgaaaacctc tgacacatgc agctcccgga cgggtcaca gcttgtctgt aagcggatgc  3300
cgggagcaga caagcccgtc agggcgcgtc agcgggtgtt ggcgggtgtc ggggcgcagc  3360
catgacccag tcacgtagcg atagcggagt gtatactggc ttaactatgc ggcatcagag  3420
cagattgtac tgagagtgca ccatatatgc ggtgtgaaat accgcacaga tgcgtaagga  3480
gaaaataccg catcaggcgc tcttccgctt cctcgctcac tgactcgctg cgctcggtcg  3540
ttcggctgcg gcgagcggta tcagctcact caaaggcggt aatacggtta tccacagaat  3600
caggggataa cgcaggaaag aacatgtgag caaaaggcca gcaaaaggcc aggaaccgta  3660
aaaaggccgc gttgctggcg ttttttccata ggctccgccc cctgacgag catcacaaaa  3720
atcgacgctc aagtcagagg tggcgaaacc cgacaggact ataaagatac caggcgtttc  3780
cccctggaag ctccctcgtg cgctctcctg ttccgaccct gccgcttacc ggatacctgt  3840
ccgcctttct cccttcggga agcgtggcgc tttctcatag ctcacgctgt aggtatctca  3900
gttcggtgta ggtcgttcgc tccaagctgg gctgtgtgca cgaacccccc gttcagccc  3960
accgctgcgc cttatccggt aactatcgtc ttgagtccaa cccggtaaga cgacttat  4020
cgccactggc agcagccact ggtaacagga ttagcagagc gaggtatgta ggcggtgcta  4080
cagagttctt gaagtggtgg cctaactacg gctacactag aaggacagta tttggtatct  4140
gcgctctgct gaagccagtt accttcggaa aaagagttgg tagctcttga tccggcaaac  4200
```

```
aaaccaccgc tggtagcggt ggttttttg tttgcaagca gcagattacg cgcagaaaaa    4260
aaggatctca agaagatcct ttgatctttt ctacggggtc tgacgctcag tggaacgaaa    4320
actcacgtta agggattttg gtcatgagat tatcaaaaag gatcttcacc tagatccttt    4380
taaattaaaa atgaagtttt aaatcaatct aaagtatata tgagtaaact tggtctgaca    4440
gttaccaatg cttaatcagt gaggcaccta tctcagcgat ctgtctattt cgttcatcca    4500
tagttgcctg actccccgtc gtgtagataa ctacgatacg ggagggctta ccatctggcc    4560
ccagtgctgc aatgataccg cgagacccac gctcaccggc tccagattta tcagcaataa    4620
accagccagc cggaagggcc gagcgcagaa gtggtcctgc aactttatcc gcctccatcc    4680
agtctattaa ttgttgccgg gaagctagag taagtagttc gccagttaat agtttgcgca    4740
acgttgttgc cattgctgca ggcatcgtgg tgtcacgctc gtcgtttggt atggcttcat    4800
tcagctccgg ttcccaacga tcaaggcgag ttacatgatc cccatgttg tgcaaaaaag    4860
cggttagctc cttcggtcct ccgatcgttg tcagaagtaa gttggccgca gtgttatcac    4920
tcatggttat ggcagcactg cataattctc ttactgtcat gccatccgta agatgctttt    4980
ctgtgactgg tgagtactca accaagtcat tctgagaata gtgtatgcgg cgaccgagtt    5040
gctcttgccc ggcgtcaata cgggataata ccgcgccaca tagcagaact ttaaaagtgc    5100
tcatcattgg aaaacgttct cggggcgaaa actctcaag gatcttaccg ctgttgagat    5160
ccagttcgat gtaacccact cgtgcaccca actgatcttc agcatctttt actttcacca    5220
gcgtttctgg gtgagcaaaa acaggaaggc aaaatgccgc aaaaaaggga ataagggcga    5280
cacgaaaatg ttgaatactc atactcttcc ttttcaata ttattgaagc atttatcagg    5340
gttattgtct catgagcgga tacatatttg aatgtattta gaaaaataaa caaataggg    5400
ttccgcgcac atttccccga aaagtgccac ctgaaattgt aaacgttaat attttgttaa    5460
aattcgcgtt aaatttttgt taaatcagct catttttttaa ccaataggcc gaaatcgaa    5520
aaatccctta taatcaaaa gaatagaccg agatagggtt gagtgttgtt ccagtttgga    5580
acaagagtcc actattaaag aacgtggact ccaacgtcaa agggcgaaaa accgtctatc    5640
agggcgatgg cccactacgt gaaccatcac cctaatcaag ttttttgggg tcgaggtgcc    5700
gtaaagcact aaatcggaac ctaaaggga gccccgatt tagacgttga cggggaaagc    5760
cggcgaacgt ggcgagaaag gaagggaaga agcgcaaagg agcgggcgct agggcgctgg    5820
caagtgtagc ggtcacgctg cgcgtaacca ccacccgc cgcgcttaat gcgccgctac    5880
agggcgcgtc ccattcgcca                                                5900

SEQ ID NO: 7            moltype = AA   length = 271
FEATURE                 Location/Qualifiers
REGION                  1..271
                        note = Kanamycin resistance marker
source                  1..271
                        mol_type = protein
                        organism = synthetic construct
SEQUENCE: 7
MSHIQRETSC SRPRLNSNMD ADLYGYKWAR DNVGQSGATI YRLYGKPDAP ELFLKHGKGS     60
VANDVTDEMV RLNWLTEFMP LPTIKHFIRT PDDAWLLTTA IPGKTAFQVL EEYPDSGENI   120
VDALAVFLRR LHSIPVCNCP FNSDRVFRLA QAQSRMNNGL VDASDFDDER NGWPVEQVWK   180
EMHKLLPFSP DSVVTHGDFS LDNLIFDEGK LIGCIDVGRV GIADRYQDLA ILWNCLGEFS   240
PSLQKRLFQK YGIDNPDMNK LQFHLMLDEF F                                  271

SEQ ID NO: 8            moltype = AA   length = 286
FEATURE                 Location/Qualifiers
REGION                  1..286
                        note = Ampicillin resistance marker
source                  1..286
                        mol_type = protein
                        organism = synthetic construct
SEQUENCE: 8
MSIQHFRVAL IPFFAAFCLP VFAHPETLVK VKDAEDQLGA RVGYIELDLN SGKILESFRP     60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGS   240
RGIIAALGPD GKPSRIVVIY TTGSQATMDE RNRQIAEIGA SLIKHW                  286

SEQ ID NO: 9            moltype = AA   length = 123
FEATURE                 Location/Qualifiers
REGION                  1..123
                        note = Zeocin resistance marker
source                  1..123
                        mol_type = protein
                        organism = synthetic construct
SEQUENCE: 9
MAKLTSAVPV LTARDVAGAV EFWTDRLGFS RDFVEDDFAG VVRDDVTLFI SAVQDQVVPD     60
NTLAWVWVRG LDELYAEWSE VVSTNFRDAS GPAMTEIGEQ PWGREFALRD PAGNCVHFVA   120
EEQ                                                                 123

SEQ ID NO: 10           moltype = AA   length = 219
FEATURE                 Location/Qualifiers
REGION                  1..219
                        note = Chloramphenicol resistance marker
source                  1..219
                        mol_type = protein
                        organism = synthetic construct
SEQUENCE: 10
MEKKITGYTT VDISQWHRKE HFEAFQSVAQ CTYNQTVQLD ITAFLKTVKK NKHKFYPAFI     60
```

```
HILARLMNAH PEFRMAMKDG ELVIWDSVHP CYTVFHEQTE TFSSLWSEYH DDFRQFLHIY     120
SQDVACYGEN LAYFPKGFIE NMFFVSANPW VSFTSFDLNV ANMDNFFAPV FTMGKYYTQG     180
DKVLMPLAIQ VHHAVCDGFH VGRMLNELQQ YCDEWQGGA                            219

SEQ ID NO: 11           moltype = AA  length = 396
FEATURE                 Location/Qualifiers
REGION                  1..396
                        note = Tetracyclin resistance marker
source                  1..396
                        mol_type = protein
                        organism = synthetic construct
SEQUENCE: 11
MKSNNALIVI LGTVTLDAVG IGLVMPVLPG LLRDIVHSDS IASHYGVLLA LYALMQFLCA      60
PVLGALSDRF GRRPVLLASL LGATIDYAIM ATTPVLWILY AGRIVAGITG ATGAVAGAYI     120
ADITDGEDRA RHFGLMSACF GVGMVAGPVA GGLLGAISLH APPLAAAVLN GLNLLLGCFL     180
MQESHKGERR PMPLRAFNPV SSFRWARGMT IVAALMTVFF IMQLVGQVPA ALWVIFGEDR     240
FRWSATMIGL SLAVFGILHA LAQAFVTGPA TKRFGEKQAI IAGMAADALG YVLLAFATRG     300
WMAFPIMILL ASGGIGMPAL QAMLSRQVDD DHQGQLQGSL AALTSLTSIT GPLIVTAIYA     360
ASASTWNGLA WIVGAALYLV CLPALRRGAW SRATST                               396

SEQ ID NO: 12           moltype = AA  length = 263
FEATURE                 Location/Qualifiers
REGION                  1..263
                        note = Streptomycin resistance marker
source                  1..263
                        mol_type = protein
                        organism = synthetic construct
SEQUENCE: 12
MREAVIAEVS TQLSEVVGVI ERHLEPTLLA VHLYGSAVDG GLKPHSDIDL LVTVTVRLDE      60
TTRRALINDL LETSASPGES EILRAVEVTI VVHDDIIPWR YPAKRELQFG EWQRNDILAG     120
IFEPATIDID LAILLTKARE HSVALVGPAA EELFDPVPEQ DLFEALNETL TLWNSPPDWA     180
GDERNVVLTL SRIWYSAVTG KIAPKDVAAD WAMERLPAQY QPVILEARQA YLGQEEDRLA     240
SRADQLEEFV HYVKGEITKV VGK                                             263

SEQ ID NO: 13           moltype = AA  length = 116
FEATURE                 Location/Qualifiers
REGION                  1..116
                        note = LacZ alpha marker
source                  1..116
                        mol_type = protein
                        organism = synthetic construct
SEQUENCE: 13
MTMITPSLHA CRFKQSTLDL IKDPARPRVP SSNSLAVVLQ RRDWENPGVT QLNRLAAHPP      60
FASWRNSEEA RTDRPSQQLR SLNGEWRLMR YFLLTHLCGI SHRIWCTLST ICSDAA         116

SEQ ID NO: 14           moltype = DNA  length = 819
FEATURE                 Location/Qualifiers
misc_feature            1..819
                        note = Kanamycin resistance marker
source                  1..819
                        mol_type = other DNA
                        organism = synthetic construct
SEQUENCE: 14
atgagccata ttcaaacgcg tgaaacgtct tgctctaggc cgcgattaaa ttccaacatg      60
gatgctgatt tatatgggta taaatgggct cgcgataatg tcgggcaatc aggtgcgaca     120
atctatcgat tgtatgggaa gcccgatgcg ccagagttgt ttctgaaaca tggcaaaggt     180
agcgttgcca atgatgttac agatgagatg gtcagactaa actggctgac ggaatttatg     240
cctcttccga ccatcaagca ttttatccgt actcctgatg acgcgtggtt actcaccact     300
gcgatccctg ggaaaacagc attccaggta ttagaagaat atcctgattc aggtgaaaat     360
attgttgatg cgctggcagt gttcctgcgc cggttgcatt cgattcctgt ttgtaattgt     420
ccttttaaca gcgatcgcgt atttcgtctc gctcaggcgc aatcacgaat gaataacggt     480
ttggttgacg cgtcagattt tgatgacgag cgtaatggct ggcctgttga caagtctgg      540
aaagaaatgc ataaactttt gccattctca ccggattcag tcgtcactca tggtgatttc     600
tcacttgata accttatttt tgacgagggg aaattaatag gttgtattga tgttggacga     660
gtcggaatcg cagaccgata ccaggatctt gccatcctat ggaactgcct cggtgagttt     720
tctccttcat tacagaaacg gcttttttcaa aaatatggta ttgataatcc tgatatgaat     780
aaattgcagt ttcatttgat gctcgatgag ttttttctaa                           819

SEQ ID NO: 15           moltype = DNA  length = 861
FEATURE                 Location/Qualifiers
misc_feature            1..861
                        note = Ampicillin resistance marker
source                  1..861
                        mol_type = other DNA
                        organism = synthetic construct
SEQUENCE: 15
atgagcatcc agcatttccg tgtcgccctt attcccttt ttgcggcatt ttgccttcct       60
gttttttgctc acccagaaac gctggtgaaa gtaaaagatg ctgaagatca gttgggagca    120
cgcgtgggtt acatcgaact ggatctcaac agcggtaaga tccttgagag ttttcgcccc    180
```

```
gaagaacgtt ttccaatgat gagcactttt aaagttctgc tatgtggcgc ggtattatcc    240
cgtattgacg ccgggcaaga gcaactcggt cgccgcatac actattctca gaatgacttg    300
gttgagtact caccagtcac agaaaagcat cttacggatg gcatgacagt aagagaatta    360
tgcagtgctg ccataaccat gagtgataac actgcggcca acttacttct gacaacgatc    420
ggaggaccga aggagctaac cgcttttttg cacaacatgg gggatcatgt aacgcgtctt    480
gatcgttggg aaccggagct gaatgaagcc ataccaaacg acgagcgtga caccacgatg    540
cctgtagcaa tggcaacaac gttgcgcaaa ctattaactg gcgaactact tactctagct    600
tcccggcaac aattaataga ctggatggag gcggataaag ttgcaggacc acgtatacgc    660
tcggcccttc cggctggctg gtttattgct gataaatctg gagccggtga gcgtgggtct    720
cgcggtatca ttgcagcact ggggccagat ggtaagcccc ccgtatcgt agttatctac     780
acgacgggga gtcaggcaac tatggatgaa cgaaatagac agatcgctga gataggtgcc    840
tcactgatta agcattggta a                                              861

SEQ ID NO: 16              moltype = DNA   length = 375
FEATURE                    Location/Qualifiers
misc_feature               1..375
                           note = Zeocin resistance marker
source                     1..375
                           mol_type = other DNA
                           organism = synthetic construct
SEQUENCE: 16
atggccaagt tgaccagtgc cgttccggtg ctcaccgcgc gcgacgtcgc cggagcggtc     60
gagttctgga ccgaccggct cgggttctcc cggacttcg tggaggacga cttcgccggt    120
atacatcggg acgacgtgac cctgttcatc agcgcggtcc aggaccaggt ggtgccggac    180
aacaccctgg cctgggtgtg ggtgcgcggc ctggacgagc tgtacgccga gtggtcgag    240
gtcgtgtcca cgaacttccg ggacgcgtcc gggccggcca tgaccgagat cggcgagcag    300
ccgtgggggc gggagttcgc cctgcgcgac ccggccggca actgcgtgca cttcgtggcc    360
gaggagcagg actga                                                    375

SEQ ID NO: 17              moltype = DNA   length = 660
FEATURE                    Location/Qualifiers
misc_feature               1..660
                           note = Chloramphenicol resistance marker
source                     1..660
                           mol_type = other DNA
                           organism = synthetic construct
SEQUENCE: 17
atggagaaaa aaatcactgg gtataccacc gttgatatat cccaatggca tcgtaaagaa     60
catttgagg catttcagtc agttgctcaa tgtacctata accagaccgt tcagctggat    120
attacgcct ttttaaagac cgtaaagaaa aataagcaca gtttatcc ggcctttatt      180
cacattcttg cccgcctgat gaatgctcat ccggaatttc gtatggcaat gaaagacggt    240
gagctggtga tatgggatag tgttcaccct tgttataccg ttttccatga gcaaactgaa    300
acgttttcat cgctctggag tgaataccac gacgatttcc ggcagtttct acacatatat    360
tcgcaagatg tggcgtgtta cggtgaaaac ctggcctatt tccctaaagg gtttattgag    420
aatatgtttt tcgtctcagc caatccctgg gtgagtttca ccagttttga tttaaacgta    480
tacaatatgg acaacttctt cgccccccgtt ttcaccatgg gcaaatatta tacgcaaggc    540
gacaaggtgc tgatgccgct ggcgattcag ttcatcatg ccgtttgtga tggcttccat     600
gtcggcagaa tgcttaatga attacaacag tactgcgatg agtggcaggg cggggcgtaa    660

SEQ ID NO: 18              moltype = DNA   length = 351
FEATURE                    Location/Qualifiers
misc_feature               1..351
                           note = LacZ alpha marker
source                     1..351
                           mol_type = other DNA
                           organism = synthetic construct
SEQUENCE: 18
atgaccatga ttacgccaag cttgcatgcc tgcaggttta acagtcgac tctagactta     60
attaaggatc cggcgcgccc acgcgtaccg agctcgaatt cactggccgt cgttttacaa    120
cgtcgtgact gggaaaaccc tggcgttacc caacttaatc gccttgcagc acatcccct    180
ttcgccagct ggcgtaatag cgaagaggcc cgcaccgatc gcccttccca acagttgcgc    240
agcctgaatg gcgaatggcg cctgatgcgg tattttctcc ttacgcatct gtgcggtatt    300
tcacaccgca tatggtgcac tctcagtaca atctgctctg atgccgcata g             351

SEQ ID NO: 19              moltype = DNA   length = 45
FEATURE                    Location/Qualifiers
misc_feature               1..45
                           note = MCS
source                     1..45
                           mol_type = other DNA
                           organism = synthetic construct
SEQUENCE: 19
acgcgtcctg cagggcggcc gcgtcgacgc gcgcacatgt gtata                    45

SEQ ID NO: 20              moltype = DNA   length = 674
FEATURE                    Location/Qualifiers
misc_feature               1..674
                           note = Ori
source                     1..674
```

```
                    mol_type = other DNA
                    organism = synthetic construct
SEQUENCE: 20
atgtgagcaa aaggccagca aaaggccagg aaccgtaaaa aggccgcgtt gctggcgttt    60
ttccataggc tccgcccccc tgacgagcat cacaaaaatc gacgctcaag tcagaggtgg   120
cgaaacccga caggactata aagataccag gcgtttcccc ctggaagctc cctcgtgcgc   180
tctcctgttc cgaccctgcc gcttaccgga tacctgtccg cctttctccc ttcgggaagc   240
gtggcgcttt ctcatagctc acgctgtagg tatctcagtt cggtgtaggt cgttcgctcc   300
aagctgggct gtgtgcacga accccccgtt cagcccgacc gctgcgcctt atccggtaac   360
tatcgtcttg agtccaaccc ggtaagacac gacttatcgc cactggcagc agccactggt   420
aacaggatta gcagagcgag gtatgtaggc ggtgctacag agttcttgaa gtggtggcct   480
aactacggct acactagaag aacagtattt ggtatctgcg ctctgctgaa gccagttacc   540
ttcggaaaaa gagttggtag ctcttgatcc ggcaaacaaa ccaccgctgg tagcggtggt   600
ttttttgttt gcaagcagca gattacgcgc agaaaaaaag gatctcaaga agatcccttg   660
atcttttcta cggg                                                     674

SEQ ID NO: 21          moltype = DNA  length = 675
FEATURE                Location/Qualifiers
misc_feature           1..675
                       note = Ori
source                 1..675
                       mol_type = other DNA
                       organism = synthetic construct
SEQUENCE: 21
cccgtagaaa agatcaaagg atcttcttga gatcctttttt ttctgcgcgt aatctgctgc   60
ttgcaaacaa aaaaaccacc gctaccagcg gtggtttgtt tgccggatca agagctacca   120
actcttttc cgaaggtaac tggcttcagc agagcgcaga taccaaatac tgttcttcta    180
gtgtagccgt agttaggcca ccacttcaag aactctgtag caccgcctac atacctcgct   240
ctgctaatcc tgttaccagt ggctgctgcc agtggcgata gtcgtgtct taccgggttg    300
gactcaagac gatagttacc ggataaggcg cagcggtcgg gctgaacggg gggttcgtgc   360
acacagccca gcttggagcg aacgacctac accgaactga gatacctaca gcgtgagcta   420
tgagaaagcg ccacgcttcc cgaagggaga aaggcggaca ggtatccggt aagcggcagg   480
gtcggaacag gagagcgcac gagggagctt ccagggggaa acgcctggta tctttatagt   540
cctgtcgggt ttcgccacct ctgacttgag cgtcgatttt tgtgatgctc gtcaggggg    600
cggagcctat ggaaaaacgc cagcaacgcg gcctttttac ggttcctggc cttttgctgg   660
ccttttgctc acatg                                                    675

SEQ ID NO: 22          moltype = DNA  length = 675
FEATURE                Location/Qualifiers
misc_feature           1..675
                       note = Ori
source                 1..675
                       mol_type = other DNA
                       organism = synthetic construct
SEQUENCE: 22
cccgtagaaa agatcaaagg atcttcttga gatcctttttt ttctgcgcgt aatctgctgc   60
ttgcaaacaa aaaaaccacc gctaccagcg gtggtttgtt tgccggatca agagctacca   120
actcttttc cgaaggtaac tggcttcagc agagcgcaga taccaaatac tgttcttcta    180
gtgtagccgt agttaggcca ccacttcaag aactctgtag caccgcctac atacctcgct   240
ctgctaatcc tgttaccagt ggctgctgcc agtggcgata gtcgtgtct taccgggttg    300
gactcaagac gatagttacc ggataaggcg cagcggtcgg gctgaacggg gggttcgtgc   360
acacagccca gcttggagcg aacgacctac accgaactga gatacctaca gcgtgagcta   420
tgagaaagcg ccacgcttcc cgaagggaga aaggcggaca ggtatccggt aagcggcagg   480
gtcggaacag gagagcgcac gagggagctt ccagggggaa acgcctggta tctttatagt   540
cctgtcgggt ttcgccacct ctgacttgag cgtcgatttt tgtgatgctc gtcaggggg    600
cggagcctat ggaaaaacgc cagcaacgcg gcctttttac ggttcctggc cttttgctgg   660
ccttttgctc acatg                                                    675

SEQ ID NO: 23          moltype = DNA  length = 676
FEATURE                Location/Qualifiers
misc_feature           1..676
                       note = Ori
source                 1..676
                       mol_type = other DNA
                       organism = synthetic construct
SEQUENCE: 23
tcagtagaaa agattaaagg atcttcttga gatcctttttt ttctgcgcgt aatctgctgc   60
ttgcaaacaa aaaaaccacc gctaccaacg gtggtttgtt tgccggatca agagctacca   120
actcttttc cgaaggtaac tggcttcagc agagcgcaga taccaaatac tgttcttcta    180
gtgtagccgt agtcgggcca ctacttcaag aactctgtag caccgtttgt gccatcatcg   240
ctctgctaat ccggttacca gtggctgctg ccagtggcgt taaggcgtgc cttaccgggt   300
tggactcaag acgatagtta ccggataagg cgcagcggtc gggctgaacg ggggttcgt    360
gcacacagcc cagcttggag cgaacgacct acaccgaact gagataccaa cagcgtgagc   420
tatgagaaag cgccacgctt cccgaaggga gaaaggcgga caggtatccg gtaagcggca   480
gggtcggaac aggagagcgc acgagggagc ttcagggggg aaacgcctgg tagctttata   540
gtcctgtcgg gtttcgccac ctctgacttg agcgtctatt tttgtgatgc tcgtcagggg   600
gcggagcctat ggaaaaac gcctgctacg tggccttctt cctgttcctg gtcttttgct    660
cacatgttct ttccgg                                                   676
```

| SEQ ID NO: 24 | moltype = DNA  length = 282 |
|---|---|
| FEATURE | Location/Qualifiers |
| misc_feature | 1..282 |
| | note = Ori |
| source | 1..282 |
| | mol_type = other DNA |
| | organism = synthetic construct |

SEQUENCE: 24

```
aagcttttaaa agccttatat attcttttt ttcttataaa acttaaaacc ttagaggcta    60
tttaagttgc tgatttatat taatttttatt gttcaaacat gagagcttag tacgtgaaac   120
atgagagctt agtacgttag ccatgagagc ttagtacgtt agccatgagg gtttagttcg   180
ttaaacatga gagcttagta cgttaaacat gagagcttag tacgtgaaac atgagagctt   240
agtacgtact atcaacaggt tgaactgctg atcttcagat ct                      282
```

| SEQ ID NO: 25 | moltype = DNA  length = 830 |
|---|---|
| FEATURE | Location/Qualifiers |
| misc_feature | 1..830 |
| | note = Ori |
| source | 1..830 |
| | mol_type = other DNA |
| | organism = synthetic construct |

SEQUENCE: 25

```
ttaataagat gatcttcttg agatcgtttt ggtctgcgcg taatctcttg ctctgaaaac    60
gaaaaaaccg ccttgcaggg cggtttttcg aaggttctct gagctaccaa ctctttgaac   120
cgaggtaact ggcttggagg agcgcagtca ccaaaacttg tcctttcagt ttagccttaa   180
ccggcgcatg acttcaagac taactcctct aaatcaatta ccagtggctg ctgccagtgg   240
tgcttttgca tgtctttccg ggttggactc aagacgatag ttaccggata aggcgcagcg   300
gtcggactga acggggggtt cgtgcataca gtccagcttg gagcgaactg cctacccgga   360
actgagtgtc aggcgtggaa tgagacaaac gcggccataa cagcggaatg acaccggtaa   420
accgaaaggc aggaacagga gagcgcacga gggagccgcc aggggaaac gcctggtatc   480
tttatagtcc tgtcgggttt cgccaccact gatttgagcg tcagatttcg tgatgcttgt   540
caggggggcg gagcctatgg aaaaacggct ttgccgcggc cctctcactt ccctgttaag   600
tatcttcctg gcatcttcca ggaaatctcc gccccgttcg taagccattt ccgctcgccg   660
cagtcgaacg accgagcgta gcgagtcagt gagcgaggaa gcggaatata tcctgtatca   720
catattctgc tgacgcaccg gtgcagcctt ttttctcctg ccacatgaag cacttcactg   780
acacccctcat cagtgccaac atagtaagcc agtatacact ccgctagcgc               830
```

| SEQ ID NO: 26 | moltype = DNA  length = 510 |
|---|---|
| FEATURE | Location/Qualifiers |
| misc_feature | 1..510 |
| | note = Ori |
| source | 1..510 |
| | mol_type = other DNA |
| | organism = synthetic construct |

SEQUENCE: 26

```
ggcgcctgta gtgccattta cccccattca ctgccagagc cgtgagcgca gcgaactgaa    60
tgtcacgaaa aagacagcga ctcaggtgcc tgatggtcgg agacaaaagg aatattcagc   120
gatttgcccg agcttgcgag ggtgctactt aagcctttag ggttttaagg tctgtttttgt   180
agaggagcaa acagcgtttg cgacatcctt ttgtaatact gcggaactga ctaaagtagt   240
gagttataca cagggctggg atctattctt tttatctttt tttattcttt ctttattcta   300
taaattataa ccacttgaat ataaacaaaa aaaacacaca aaggtctagc ggaatttaca   360
gagggtctag cagaatttac aagttttcca gcaaaggtct agcagaattt acagataccc   420
acaactcaaa ggaaaaggac tagtaattat cattgactag cccatctcaa ttggtatagt   480
gattaaaatc acctagacca attgagatgt                                    510
```

| SEQ ID NO: 27 | moltype = DNA  length = 676 |
|---|---|
| FEATURE | Location/Qualifiers |
| misc_feature | 1..676 |
| | note = Ori |
| source | 1..676 |
| | mol_type = other DNA |
| | organism = synthetic construct |

SEQUENCE: 27

```
atgtgagcaa aaggccagca aaaggccagg aaccgtaaaa aggccgcgtt gctggcgttt    60
ttccataggc tccgcccccc tgacgacgca tcacaaaaat cgacgcgtca agtcagaggt   120
ggcgaaaccc gacaggacta taaagatacc aggcgtttcc cctggaagc tccctcgtgc   180
gctctcctgt tccgaccctg ccgcttaccg gatacctgtc cgcctttctc ccttcgggaa   240
gcgtggcgct ttctcatagc tcacgctgta ggtatctcag ttcggtgtag tcgttcgct   300
ccaagctggg ctgtgtgcac gaaccccccg ttcagcccga ccgctgcgcc ttatccggta   360
actatcgtct tgagtccaac ccggtaagac acgacttatc gccactggca gcagccactg   420
gtaacaggat tagcagagcg aggtatacag gcggtgctac agagttcttg aagtggtggc   480
ctaactacgg ctacactaga agaacagtat ttggtatctg cgctctgctg aagccagtta   540
ccttcggaaa aagagttggt agctcttgat ccggcaaaca aaccaccgct ggtagcggtg   600
gttttttgt ttgcaagcag cagattacgc gcagaaaaaa aggatctcaa gaagatcctt   660
tgatcttttc tacggg                                                   676
```

| SEQ ID NO: 28 | moltype = DNA  length = 676 |
|---|---|
| FEATURE | Location/Qualifiers |
| misc_feature | 1..676 |

```
                        note = Ori
source                  1..676
                        mol_type = other DNA
                        organism = synthetic construct
SEQUENCE: 28
atgtgagcaa aaggccagca aaaggccagg aaccgtaaaa aggccgcgtt gctggcgttt    60
ttccataggc tccgcccccc tgacgacgca tcacaaaaat cgacgcgtca agtcagaggt   120
ggcgaaaccc gacaggacta taaagatacc aggcgtttcc ccctggaagc tccctcgtgc   180
gctctcctgt tccgaccctg ccgcttaccg gatacctgtc cgcctttctc ccttcgggaa   240
gcgtggcgct ttctcatagc tcacgctgta ggtatctcag ttcggtgtag tcgttcgct    300
ccaagctggg ctgtgtatac gaaccccccg ttcagcccga ccgctgcgcc ttatccggta   360
actatcgtct tgagtccaac ccggtaagac acgacttatc gccactggca gcagccactg   420
gtaacaggat tagcagagcg aggtatgtag gcggtgctac agagttcttg aagtggtggc   480
ctaactacgg ctacactaga agaacagtat ttggtatctg cgctctgctg aagccagtta   540
ccttcggaaa aagagttggt agctcttgat ccggcaaaca aaccaccgct ggtagcggtg   600
gttttttgt ttgcaagcag cagattacgc gcagaaaaaa aggatctcaa gaagatcctt   660
tgatcttttc tacggg                                                  676

SEQ ID NO: 29           moltype = DNA   length = 676
FEATURE                 Location/Qualifiers
misc_feature            1..676
                        note = Ori
source                  1..676
                        mol_type = other DNA
                        organism = synthetic construct
SEQUENCE: 29
atgtgagcaa aaggccagca aaaggccagg aaccgtaaaa aggccgcgtt gctggcgttt    60
ttccataggc tccgcccccc tgacgacgca tcacaaaaat cgacgcgtca agtcagaggt   120
ggcgaaaccc gacaggacta taaagatacc aggcgtttcc ccctggaagc tccctcgtgc   180
gctctcctgt tccgaccctg ccgcttaccg gatacctgtc cgcctttctc ccttcgggaa   240
gcgtggcgct ttctcatagc tcacgctgta ggtataccag ttcggtgtag tcgttcgct    300
ccaagctggg ctgtgtgcac gaaccccccg ttcagcccga ccgctgcgcc ttatccggta   360
actatcgtct tgagtccaac ccggtaagac acgacttatc gccactggca gcagccactg   420
gtaacaggat tagcagagcg aggtatgtag gcggtgctac agagttcttg aagtggtggc   480
ctaactacgg ctacactaga agaacagtat ttggtatctg cgctctgctg aagccagtta   540
ccttcggaaa aagagttggt agctcttgat ccggcaaaca aaccaccgct ggtagcggtg   600
gttttttgt ttgcaagcag cagattacgc gcagaaaaaa aggatctcaa gaagatcctt   660
tgatcttttc tacggg                                                  676

SEQ ID NO: 30           moltype = DNA   length = 173
FEATURE                 Location/Qualifiers
misc_feature            1..173
                        note = TEE
source                  1..173
                        mol_type = other DNA
                        organism = synthetic construct
SEQUENCE: 30
caagctctag caggaagaag aaataagaag aagaagaaga agaagaagaa gcgtctcctc    60
ttcttcttgt gagagcaaaa aataaaactc ccaaaaaaaa gaaaatcatc aaaaaaaacaa   120
atttcaaaaa gagttttttgt gtttggggat taaagaataa aaaaaacaac gtc         173

SEQ ID NO: 31           moltype = DNA   length = 173
FEATURE                 Location/Qualifiers
misc_feature            1..173
                        note = TEE
source                  1..173
                        mol_type = other DNA
                        organism = synthetic construct
SEQUENCE: 31
caagctctag cacgtctcct cttcttcttg tgagagtaaa aaakaaaact cccaaaaaaa    60
akaaaatcat caaaaaaaca aatttcaaaa agagttttg tgtttgggga ttaaagaaka   120
aaaaaaacaa ggaagaagaa akaagaagaa gaagaagaag aagaagagc ctc           173

SEQ ID NO: 32           moltype = DNA   length = 274
FEATURE                 Location/Qualifiers
misc_feature            1..274
                        note = TEE
source                  1..274
                        mol_type = other DNA
                        organism = synthetic construct
SEQUENCE: 32
caagctctag caggaagaag aaakaagaag aagaagaaga agaagaagaa gcgtctcctc    60
ttcttcttgt gagagtaaaa aakaaaactc ccaaaaaaa kaaaatcatc aaaaaaaacaa   120
atttcaaaaa gagttttttgt gtttggggat taaagaakaa aaaaaacaac aggtagtaa   180
gcgcagttgt cgtctcttgc ggtgccgttg ctggttctca caccttttag gtctgttctc   240
gtcttccgtt ctgactctct cttttttcgtt gcag                              274

SEQ ID NO: 33           moltype = DNA   length = 277
FEATURE                 Location/Qualifiers
```

```
misc_feature           1..277
                       note = TEE
source                 1..277
                       mol_type = other DNA
                       organism = synthetic construct
SEQUENCE: 33
caagctctag caggaagaag aaakaagaag aagaagaaga agaagaagaa gcgtctcctc    60
ttcttcttgt gagagtaaaa aakaaaactc ccaaaaaaaa gaaaatcatc aaaaaaacaa   120
atttcaaaaa gagttttttgt gtttggggat taaagaagaa aaaaaacaac aggtgagtaa   180
gcgcagttgt cgtctcttgc ggtgccgttg ctggttctca caccttttag gtctgttctc   240
gtcttccgtt ctgactctct cttttttcgtt gcaggcc                           277

SEQ ID NO: 34          moltype = DNA  length = 278
FEATURE                Location/Qualifiers
misc_feature           1..278
                       note = TEE
source                 1..278
                       mol_type = other DNA
                       organism = synthetic construct
SEQUENCE: 34
caagctctag caggaagaag aaagaagaag aagaagaaga agaagaagaa gcgtctcctc    60
ttcttcttgt gagagtaaaa aagaaaactc ccaaaaaaaa gaaaatcatc aaaaaaacaa   120
atttcaaaaa gagttttttgt gtttggggat taaggtgag taagcgcagt tgtcgtctct   180
tgcggtgccg ttgctggttc tcacaccttt taggtctgtt ctcgtcttcc gttctgactc   240
tctcttttttc gttgcagaac tcctaaaaaa ccgccacc                          278

SEQ ID NO: 35          moltype = DNA  length = 266
FEATURE                Location/Qualifiers
misc_feature           1..266
                       note = TEE
source                 1..266
                       mol_type = other DNA
                       organism = synthetic construct
SEQUENCE: 35
caagctctag caggaagaag aaakaagaag aagaagaaga agaagaagaa gcgtctcctc    60
ttcttcttgt gagagtaaaa aakaaaactc ccaaaaaaaa gaaaatcatc aaaaaaacaa   120
atttcaaaaa gagtgaggta agattatcga tatttaaatt atttatttct tcttttccat   180
ttttttggct aacattttcc atggttttat gatatcatgc aggtacgttt tgtgtttggg   240
gattaaagaa taaaaaaaac aaaaca                                        266

SEQ ID NO: 36          moltype = DNA  length = 178
FEATURE                Location/Qualifiers
misc_feature           1..178
                       note = TEE
source                 1..178
                       mol_type = other DNA
                       organism = synthetic construct
SEQUENCE: 36
cgtctcctct tcttcttgtg agagtaaaaa akaaaactcc caaaaaaaag aaaatcatca    60
aaaaacaaa tttcaaaaag agttttttgtg tttggggatt aaagaakaaa aaaacaacc   120
tcgtgcgtgt tgccgattcg cgtacgaata cgccttgtgc tgacacttct gtagcacc    178

SEQ ID NO: 37          moltype = DNA  length = 86
FEATURE                Location/Qualifiers
misc_feature           1..86
                       note = TEE
source                 1..86
                       mol_type = other DNA
                       organism = synthetic construct
SEQUENCE: 37
ttcaaaaaga gttttttgtgt ttggggatta agaataaaa aaaacaagga agaagaaaka    60
agaagaagaa gaagaagaag aagaag                                         86

SEQ ID NO: 38          moltype = DNA  length = 277
FEATURE                Location/Qualifiers
misc_feature           1..277
                       note = TEE
source                 1..277
                       mol_type = other DNA
                       organism = synthetic construct
SEQUENCE: 38
caagctctag cacgtctcct cttcttcttg tgagagtaaa aaakaaaact cccaaaaaaa    60
agaaaatcat caaaaaaaca aatttcaaaa agagttttttg tgtttgggga ttaaagaaga   120
aaaaaacaa ggaagaagaa akaagaagaa gaagaagaag aagaagaagaa aggtgagtaa   180
gcgcagttgt cgtctcttgc ggtgccgttg ctggttctca caccttttag gtctgttctc   240
gtcttccgtt ctgactctct cttttttcgtt gcaggcc                           277

SEQ ID NO: 39          moltype = DNA  length = 265
FEATURE                Location/Qualifiers
```

```
misc_feature            1..265
                        note = TEE
source                  1..265
                        mol_type = other DNA
                        organism = synthetic construct
SEQUENCE: 39
caagctctag cacgtctcct cttcttcttg tgagagtaaa aaakaaaact cccaaaaaaa    60
agaaaatcat caaaaaaaca aatttcaaaa agagtgaggt aagattatcg atatttaaat   120
tatttatttc ttcttttcca ttttttttggc taacattttc ctaggtttta ttatatctag   180
caggtacgtt ttgtgtttgg ggattaaaga agaaaaaaaa caaggaagaa gaaakaagaa   240
gaagaagaag aagaagaaga aaaca                                          265

SEQ ID NO: 40           moltype = DNA   length = 188
FEATURE                 Location/Qualifiers
misc_feature            1..188
                        note = TEE
source                  1..188
                        mol_type = other DNA
                        organism = synthetic construct
SEQUENCE: 40
caasctctac caccaasaac aaacaacaac aacatataya aaacaacaac maccatctcc    60
tcttcttctt gtcaastmma aaaycaaact cccaaaaaaa agmaaatcat caaaammaca   120
aatttcaaam aacaacawya aacaacaaam aamattaaca tcatatcaag gcggccgccc   180
ccttcacc                                                             188

SEQ ID NO: 41           moltype = DNA   length = 173
FEATURE                 Location/Qualifiers
misc_feature            1..173
                        note = TEE
source                  1..173
                        mol_type = other DNA
                        organism = synthetic construct
SEQUENCE: 41
caagctctag caggaagaag aaataagaag aagaagaaga agaagaagaa gcgtctcctc    60
ttcttcttgt gagagtaaaa aataaaactc ccaaaaaaaa gaaaatcatc aaaaaaacaa   120
atttcaaaaa gagttttttgt gtttggggat taaagaataa aaaaaacaac gtc          173

SEQ ID NO: 42           moltype = DNA   length = 175
FEATURE                 Location/Qualifiers
misc_feature            1..175
                        note = TEE
source                  1..175
                        mol_type = other DNA
                        organism = synthetic construct
SEQUENCE: 42
caagctctag caggaagaag aaataagaag aagaagaaga agaagaagaa gcgtctcctc    60
ttcttcttgt gagagtaaaa aataaaactc ccaaaaaaaa gaaaatcatc aaaaaaacaa   120
atttcaaaaa gagttttttgt gtttggggat taaagaataa aaaaaacaac gtccc        175

SEQ ID NO: 43           moltype = DNA   length = 189
FEATURE                 Location/Qualifiers
misc_feature            1..189
                        note = TEE
source                  1..189
                        mol_type = other DNA
                        organism = synthetic construct
SEQUENCE: 43
agatcactag aagcttcaag ctctagcagg aagaagaaat aagaagaaga agaagaagaa    60
gaagaagcgt ctcctcttct tcttgtgaga gtaaaaaata aaactcccaa aaaaagaaa   120
atcatcaaaa aaacaaattt caaaagagt ttttgtgttt ggggattaaa gaataaaaaa    180
aacaacgcc                                                            189

SEQ ID NO: 44           moltype = DNA   length = 189
FEATURE                 Location/Qualifiers
misc_feature            1..189
                        note = TEE
source                  1..189
                        mol_type = other DNA
                        organism = synthetic construct
SEQUENCE: 44
agatcactag aagcttcaag ctctagcagg aagaagaaag aagaagaaga agaagaagaa    60
gaagaagcgt ctcctcttct tcttgtgaga gtaaaaaaga aaactcccaa aaaaagaaa   120
atcatcaaaa aaacaaattt caaaagagt ttttgtgttt ggggattaaa gaagaaaaaa    180
aacaacgcc                                                            189

SEQ ID NO: 45           moltype = DNA   length = 191
FEATURE                 Location/Qualifiers
misc_feature            1..191
                        note = TEE
```

```
                    source          1..191
                                    mol_type = other DNA
                                    organism = synthetic construct
SEQUENCE: 45
agatcactag aagcttcaag ctctagcagg aagaagaaat aagaagaaga agaagaagaa    60
gaagaagcgt ctcctcttct tcttgtgaga gtaaaaaata aaactcccaa aaaaagaaa    120
atcatcaaaa aaacaaattt caaaagagt ttttgtgttt ggggattaaa gaataaaaaa    180
aacaacaggc c                                                        191

SEQ ID NO: 46       moltype = DNA   length = 284
FEATURE             Location/Qualifiers
misc_feature        1..284
                    note = TEE
source              1..284
                    mol_type = other DNA
                    organism = synthetic construct
SEQUENCE: 46
cttttttcgca acgggtttgc cgccagaaca caggtgtcgt gaggaattag cttggtacta    60
atacgactca ctatagggag acccaagctg gctaggtaag cttggtaccc aagtctctagc   120
aggaagaaga aataaggaaga agaagaagaa gaagaagaag cgtctcctct tcttcttgtg   180
agagtaaaaa ataaaactcc caaaaaaaag aaaatcatca aaaaaacaaa tttcaaaaag    240
agttttgtgt ttgggatt aaagaataaa aaaaacaacg tccc                      284

SEQ ID NO: 47       moltype = DNA   length = 230
FEATURE             Location/Qualifiers
misc_feature        1..230
                    note = TEE
source              1..230
                    mol_type = other DNA
                    organism = synthetic construct
SEQUENCE: 47
aacccactgc ttactggctt atcgaaatta atacgactca ctatagggag acccaagctc    60
tagcaggaag aagaaataag aagaagaaga agaagaagaa gaagcgtctc ctcttcttct   120
tgtgagagta aaaaataaaa ctcccaaaaa aagaaaatc atcaaaaaaa caaatttcaa    180
aaagagtttt tgtgtttggg gattaaagaa taaaaaaaac aacctccacc               230

SEQ ID NO: 48       moltype = DNA   length = 177
FEATURE             Location/Qualifiers
misc_feature        1..177
                    note = TEE
source              1..177
                    mol_type = other DNA
                    organism = synthetic construct
SEQUENCE: 48
caagctctag cagcaacaac aaataacaac aacaacaaca caacaacaa gcgtctcctc     60
ttcttcttgt gagagtaaaa aataaaactc ccaaaaaaaa gaaaatcatc aaaaaaacaa   120
atttcaaaaa gagtttttgt gtttggggat taaagaataa aaaaaacaac ctccacc      177

SEQ ID NO: 49       moltype = DNA   length = 191
FEATURE             Location/Qualifiers
misc_feature        1..191
                    note = TEE
source              1..191
                    mol_type = other DNA
                    organism = synthetic construct
SEQUENCE: 49
agatcactag aagcttcaag ctctagcagg aagaagaaat aagaagaaga agaagaataa    60
gaagaagcgt ctcgtcttct tcttgtgaga gtaaaaaata aaactcccaa aaaaataaa    120
atcatcaaaa aaagaaattt caaaagagt ttttgtgttt ggggattaaa gaataaaaaa    180
aacaacaggc c                                                        191

SEQ ID NO: 50       moltype = DNA   length = 189
FEATURE             Location/Qualifiers
misc_feature        1..189
                    note = TEE
source              1..189
                    mol_type = other DNA
                    organism = synthetic construct
SEQUENCE: 50
agatcactag aagcttcaag ctctagcagg aagaagaaat aataagaaga agaagaataa    60
gaagaagcgt ctcctcttct tcttgtgaga gtaaaaaata aaactcccaa aaaaataaa    120
atcatcaaaa aaataaattt caaaagagt ttttgtgttt ggggattaaa gaataaaaaa    180
aacaacgcc                                                           189

SEQ ID NO: 51       moltype = DNA   length = 173
FEATURE             Location/Qualifiers
misc_feature        1..173
                    note = TEE
source              1..173
```

```
                        mol_type = other DNA
                        organism = synthetic construct
SEQUENCE: 51
caagctctag caggaagaag aaakaagaag aagaagaaga agaagaagaa gcgtctcctc    60
ttcttcttgt gagagtaaaa aakaaaactc ccaaaaaaaa kaaatcatc  aaaaaaacaa   120
atttcaaaaa gagttttttgt gtttggggat taaagaakaa aaaaaacaac gtc          173

SEQ ID NO: 52           moltype = DNA   length = 274
FEATURE                 Location/Qualifiers
misc_feature            1..274
                        note = TEE
source                  1..274
                        mol_type = other DNA
                        organism = synthetic construct
SEQUENCE: 52
caagctctag caggaagaag aaakaagaag aagaagaaga agaagaagaa gcgtctcctc    60
ttcttcttgt gagagtaaaa aakaaaactc ccaaaaaaaa kaaatcatc  aaaaaaacaa   120
atttcaaaaa gagttttttgt gtttggggat taaagaakaa aaaaaacaac aggtgagtaa   180
gcgcagttgt cgtctcttgc ggtgccgttg ctggttctca cacctttttag gtctgttctc   240
gtcttccgtt ctgactctct cttttttcgtt gcag                               274

SEQ ID NO: 53           moltype = DNA   length = 123
FEATURE                 Location/Qualifiers
misc_feature            1..123
                        note = TEE
source                  1..123
                        mol_type = other DNA
                        organism = synthetic construct
SEQUENCE: 53
ggcgtctcct cttcttcttg tgagagtaaa aaataaaact cccaaaaaaa akaaaatcat    60
caaaaaaaca aatttcaaaa agagttttttg tgtttgggga ttaaagaaka aaaaaacaac   120
gtc                                                                  123

SEQ ID NO: 54           moltype = DNA   length = 384
FEATURE                 Location/Qualifiers
misc_feature            1..384
                        note = TEE
source                  1..384
                        mol_type = other DNA
                        organism = synthetic construct
SEQUENCE: 54
caagctctag caggaagaag aaataagaag aagaagaaga agaagaagaa gcgtctcctc    60
ttcttcttgt gagagtaaaa aataaaactc ccaaaaaaaa gaaaatcatc aaaaaaacaa   120
atttcaaaaa gagttttttgt gtttggggat taaagaataa aaaaacaac gtctggacaa   180
accacaacta gaatgcagtg aaaaaaaatgc tttatttgtg aaatttgtga tgctattgct   240
ttatttgtaa ccattataag ctgcaataaa caagttaaca acaacaattg cattcatttt   300
atgtttcagg ttcaggggga ggtgtgggag gttttttaaa gcaagtaaaa cctctacaaa   360
tgtggtaaaa tcgataagga tccg                                          384

SEQ ID NO: 55           moltype = DNA   length = 2522
FEATURE                 Location/Qualifiers
misc_feature            1..2522
                        note = EEE1+CMV+TEE
source                  1..2522
                        mol_type = other DNA
                        organism = synthetic construct
SEQUENCE: 55
tttcaggcaa ccagagctac atagtgagat cctgtctcaa caaaaataaa ataatctaag    60
gcttcaaagg gttcaatctc ttaggtagct aaatatgaac aaaatttggg aaatgtgacc   120
ttttccttag tgacagtcag atagaacctt ctcgagtgca aggacaccaa gtgcaaacag   180
gctcaagaac agcctggaaa ggtctagtgc tatgggcctt caggtcgaat gccaactgtt   240
ttcaagaact gtgtggattt ttctgcctgt aacgaattca gattcatttt tcaaaactcg   300
gggagagttt tccccctttta taattttttt tttaaattta ttaaactttg tttcgttccc   360
cttgttttga gaattgcaga gtcatccacc ctgtcacagt gccagggaga tcagggatgg   420
gcccaggggc ctggcggggc tgaagggggc ggggaagcga ggctccaaa gggacccag     480
tgtggcagga gccaaagccc taggtcccta gaacgcagag gccaccggga cccccagac   540
ggggtaagcg ggtgggtgtc tggggcgcga agccgcactg cgcatgcgcc gaggtccgct   600
ccggccgcgc tgatccaagc cgggttctcg cgccgacctg gtcgtgattg acaagtcaca   660
cacgctgatc cctccgcggg gccgcacagg gtcacgcgtt tccccctccc cacaaagtcc   720
cctactctct gggcaccaca cacgaacatt ccttgagcgt gaccttgttg gctcctagtca  780
ggcgcctccg gtgcagagac tggaacggct tgggaagta gtccctaacc gcatttccgc   840
ggaggggatcg tcgggagggc gtggcttctg aggattatat aaggcgactc cgggcgggtc   900
ttagctagtt ccgtcggaga cccgagttca gtcgccgctt ctctgtgagg actgctgccg    960
ccgccgctgc tgaggagaag cgcagcgct tggcgtagcc ggaggacggg aggggggcgc   1020
ggacacgagg ggcagcccgc ggcctggacg ttctgttttcc gtggcccgcg aggaaggcga  1080
ctgtcctgag gcgaggacc cagcggcaag atgcggccca agtggaagcc tgagggggata   1140
ggcgagcggc cctgaggcgc tcgacggggt tgggggggaa gcaggccgcg gaggcagctg   1200
cagccggaa cgtgcggcca accccttatt ttttttgacg ggttgcgggc gtaggtgcc    1260
tccgaagtga gagccgtggg cgtttgactg tcgggagagg tcggtcggat tttcatccgt  1320
```

```
tgctaaagac ggaagtgcga ctgagacggg aaggggggg  agtcggttgg tggcggttga 1380
acctggacta aggcgcacat gacgtcgcgg tttctatggg ctcataatgg gtggtgagga 1440
catttccctg tttaaactta aacaagtttg tacaaaaaag caggctagat cttcaatatt 1500
ggccattagc catattattc attggttata tagcataaat caatattggc tattggccat 1560
tgcatacgtt gtatctatat cataaatatgt acatttatat tggctcatgt ccaatatgac 1620
cgccatgttg gcattgatta ttgactagtt attaatagta atcaattacg ggtcattag  1680
ttcatagccc atatatggag ttccgcgtta cataacttac ggtaaatggc ccgcctggct 1740
gaccgcccaa cgaccccgc  ccattgacgt caataatgac gtatgttccc atagtaacgc 1800
caatagggac tttccattga cgtcaatggg tggagtattt acggtaaact gcccacttgg 1860
cagtacatca agtgtatcat atgccaagtc cgccccctat tgacgtcaat gacggtaaat 1920
ggcccgcctg gcattatgcc cagtacatga ccttacggga ctttcctact ggcagtaca  1980
tctacgtatt agtcatcgct attaccatag tgatgcggtt ttggcagtac accaatgggc 2040
gtggatagcg gtttgactca cggggatttc caagtctcca ccccattgac gtcaatggga 2100
gtttgttttg gcaccaaaat caacgggact tccaaaatgt cgtaataac  cccgcccgt  2160
tgacgcaaat gggcggtagg cgtgtacggt gggaggtcta tataagcaga gctcgtttag 2220
tgaaccgtca gatcactaga agcttcaagc tctagcagga agaagaaaga agaagaagaa 2280
gaagaagaag aagaagcgtc tcctcttctt cttgtgagag taaaaaagaa aactcccaaa 2340
aaaaagaaaa tcatcaaaaa aacaaatttc aaaaagagtt tttgtgtttg gggattaaag 2400
aagaaaaaaa acaacaggtg agtaagcgca gttgtcgtct cttgcggtgc cgttgctggt 2460
tctcacacct tttaggtctg ttctcgtctt ccgttctgac tctctctttt tcgttgcagg 2520
cc                                                                2522

SEQ ID NO: 56          moltype = DNA    length = 3321
FEATURE                Location/Qualifiers
misc_feature           1..3321
                       note = EEE1-Xt+CMV+TEE
source                 1..3321
                       mol_type = other DNA
                       organism = synthetic construct
SEQUENCE: 56
tggtgaccct gtctcaaaaa accctcaaaa agtgttggga ttagtggcat gcaccaccat 60
tcccaccaaa ggtttatttt taataatatg tgtgtgagtg tgtatcacta tgagtatatg 120
tcaatatgtg tcaatgtccc cagggacatt taaagagccc ctgaagctgg agtcataggc 180
cattatgaac tgcctgacat ggctaatggg aattgaactg agattttctg gaagttatac 240
ctgctcttac tgctgagcca tgtctctgaa gaccccaggg attttttttt tttttttgaga 300
caggtatttt ctgtatagcc ctggctgtcc tgaaagcact ctctatatgt agaccaggct 360
tgcctggagc ttggatatgc acctgcttct gcctcaggaa tggtgggatt gaaggtgtgc 420
accaccacat ccgctaacat gcacaattct taatgggttt atatcttatt taatgaatga 480
aaggttttggg ggatggatgt agcttaatgg aaaatgactg aagatttcaa ttaaaaatct 540
ggggcttagc tgcgcggtgg gtggtgcctg cctttagtcc cagtactggg gaggcagagg 600
aaggaggatc tctgtgagtt cgaggccagc tggtctataa cgtgagttcc aggacagcca 660
gagatacaca gacaaaccct gtctcaccaa acaaaacaa  caacaacaac aacaaatctg 720
ggacgtaggc ttggtgtggt ggcacacatt ttgattccag cacttgaag  gaagaggcct 780
gcatggtcta catagcttgt ttcaggcaac cagagctaca tagtgagatc ctgtctcaac 840
aaaaaataaa taatctaagg cttcaaaggg ttcaatctct taggtagcta aatatgaaca 900
aaatttggga aatgtgacct ttttccttagt gacagtcaga tagaaccttc tcgagtgcaa 960
ggacaccaag tgcaaacagg ctcaagaaca gcctggaaag gtctagtgct atgggggcttc 1020
aggtcgaatg ccaactgttt tcaagaactg tgtggatttt tctgcctgta acgaattcag 1080
attcattttt caaaactcgg ggagagtttt ccccctttat aatttttttt ttaaatttat 1140
taaactttgt ttcgttcccc ttgttttgag aattgcagag tcatccaccc tgtcacagtg 1200
ccagggagct cagggatggg cccaggggcc tggcggggct gaagggggctg gggaagcgga 1260
ggctccaaag ggaccccagt gtggcaggag ccaaagccct aggtcccctag aacgcagagg 1320
ccaccgggac cccccagacg gggtaagcgg gtgggtgtct ggggcgcgaa gccgcactgc 1380
gcatgcgccg aggtccgctc cggccgcgct gatccaagcc gggttctcgc gccgacctgg 1440
tcgtgattga caagtcacac acgctgatcc ctccgcgggg ccgcacaggg tcacagccctt 1500
tcccctcccc acaaagcccc ctactctctg ggcaccacac acgaacattc cttgagcgtg 1560
accttgttgg ctctagtcag gcgcctccgg tgcagagact ggaacggcct tgggaagtag 1620
tccctaaccg catttccgcg gagggatcgt cgggagggcg tggcttctga ggattatata 1680
aggcgactcc gggcgggtct tagctagttc cgtcggaagc ccgagttcag tcgccgcttc 1740
tctgtgagga ctgctgccgc cgccgctggt gaggagaagc cgcgcgctt  ggcgtagctg 1800
agagacgggg aggggcgcg  gacacgaggg gcagcccgcg gcctggacgt tctgtttccg 1860
tggcccgcga ggaaggcgac tgtcctgagg cggaggaccc agcggcaaga tggcggccaa 1920
gtggaagcct gaggggatag gcgagcggcc ctgaggcgct cgacggggtt ggggggggaag 1980
caggccggga aggcagctgc agccgggaac gtgcggccaa cccttatttt ttttaggggg 2040
gttgcgggcc gtaggtgcct ccgaagtgag agccgtgggc gtttgactgt cgggagaggt 2100
cggtcggatt tcatccgtt  gctaaagacg gaagtgcgac tgagacggga aggggggga  2160
gtcggttggt ggcggttgaa cctggactaa ggcgcacatg acgtcgcggt ttctatggc  2220
tcataatggg tggtgaggac attcccctgt ttaaacttaa acaagtttgt acaaaaaagc 2280
aggctagatc ttcaatattg gccattagcc catattattc attggttata tagcataaat 2340
aatattggct attggccatt gcatacgttg tatctatatc ataatatgta catttatatt 2400
ggctcatgtc caatatgacc gccatgttgg cattgattat tgactagtta ttaatagtaa 2460
tcaattacgg gtcattagtt catagcccat atatggagtt ccgcgttaca taacttacgg 2520
taaatggccc gcctggctga ccgcccaac  gaccccgcc  cattgacgtc aataatgacg 2580
tatgttccca tagtaacgcc aatagggact ttccattgac gtcaatgggt ggagtattta 2640
cggtaaactg cccacttggc agtacatcaa gtgtatcata tgccaagtcc gccccctatt 2700
gacgtcaatg acggtaaatg gcccgcctgg cattatgccc agtacatgac cttacgggac 2760
tttcctactt ggcagtacat ctacgtatta gtcatcgcta ttaccatagt gatgcggttt 2820
tggcagtaca ccaatgggcg tggatagcgg tttgactcac ggggatttcc aagtctccac 2880
cccattgacg tcaatgggag tttgttttgg caccaaaatc aacgggactt ccaaaatgt  2940
```

```
cgtaataacc cgccccgtt gacgcaaatg ggcggtaggc gtgtacggtg ggaggtctat  3000
ataagcagag ctcgtttagt gaaccgtcag atcactagaa gcttcaagct ctagcaggaa  3060
gaagaaagaa gaagaagaag aagaagaaga agaagcgtct cctcttcttc ttgtgagagt  3120
aaaaagaaa actcccaaaa aaagaaaat catcaaaaaa acaaatttca aaagagttt  3180
ttgtgtttgg ggattaaaga agaaaaaaaa caacaggtga gtaagcgcag ttgtcgtctc  3240
ttgcggtgcc gttgctggtt ctcacacctt ttaggtctgt tctcgtcttc cgttctgact  3300
ctctcttttt cgttgcaggc c                                              3321

SEQ ID NO: 57           moltype = DNA  length = 2232
FEATURE                 Location/Qualifiers
misc_feature            1..2232
                        note = EEE1-80+CMV+TEE
source                  1..2232
                        mol_type = other DNA
                        organism = synthetic construct
SEQUENCE: 57
tcaaaactcg gggagagttt tccccctta taatttttt tttaaattta ttaaactttg    60
tttcgttccc cttgttttga gaattgcaga gtcatccacc ctgtcacagt gccagggagc   120
tcagggatgg gcccaggggc ctggcggggc tgaaggggct ggggaagcga gggctccaaa   180
gggaccccag tgtggcagga gccaaagccc taggtcccta gaacgcagag gccaccggga   240
cccccagac ggggtaagcg ggtgggtgtc tgggcgcga agccgcactg cgcatgcgcc    300
gaggtccgct ccggccgcgc tgatccaagc cgggttctcg cgccgacctg gtcgtgattg   360
acaagtcaca cacgctgatc cctccgcggg gccgcacagg gtcacagcct ttcccctccc   420
cacaaagccc cctactctct gggcaccaca cacgaacatt ccttgagcgt gaccttgttg   480
gctctagtca ggcgcctccg gtgcagagac tggaacggcc ttgggaagta gtccctaacc   540
gcatttccgc ggagggatcg tcgggagggc gtggcttctg aggattatat aaggcgactc   600
cgggcgggtc ttagctagtt ccgtcggaga cccgagttca gtcgccgctt ctctgtgagg   660
actgctgccg ccgccgctgg tgaggagaag ccgccgcgct tggcgtagct gagagacggg   720
gaggggggcgc ggacacgagg ggcagcccgc ggcctggacg ttctgtttcc gtggcccgcg   780
aggaaggcga ctgtcctgag gcggaggacc cagcggcaag atggcggcca agtggaagcc   840
tgagggggata ggcgagcggc cctgaggcgc tcgacggggt tgggggggaa gcaggcccgc   900
gaggcagctg cagccgggaa cgtgcggcca accccttatt tttttgacg ggttgcgggc    960
cgtaggtgcc tccgaagtga gagccgtggg cgtttgactg tcgggagagg tcggtcggat  1020
tttcatccgt tgctaaagac ggaagtgcga ctgagacggg aagggggggg agtcggttgg  1080
tggcggttga acctggacta aggcgcacat gacgtcgcgg tttctatggg ctcataatgg  1140
gtggtgagga catttccctg tttaaactta aacaagtttg tacaaaaaag caggctagat  1200
cttcaatatt ggccattagc catattattc attggttata tagcataaat caatattggc  1260
tattggccat tgcatacgtt gtatctatat cataatatgt acatttatat tggctcatgt  1320
ccaatatgac cgccatgttg gcattgatta ttgactaagtt attaatagta atcaattacg  1380
gggtcattag ttcatagccc atatatggag ttccgcgtta cataacttac ggtaaatggc  1440
ccgcctggct gaccgcccaa cgacccccgc ccattgacgt caataatgac gtatgttccc  1500
atagtaacgc caatagggac tttccattga cgtcaatggg tggagtattt acggtaaact  1560
gcccacttgg cagtacatca agtgtatcat atgccaagtc cgccccctat tgacgtcaat  1620
gacggtaaat ggcccgcctg gcattatgcc cagtacatga ccttacggga ctttcctact  1680
tggcagtaca tctacgtatt agtcatcgct attaccatag tgatgcggtt ttggcagtac  1740
accaatgggc gtggatagcg gtttgactca cggggatttc caagtctcca ccccattgac  1800
gtcaatggga gtttgttttg gcaccaaaat caacgggact ttccaaaatg tcgtaataac  1860
cccgccccgt tgacgcaaat ggcggtaggc gtgtacggtg ggaggtcta tataagcaga  1920
gctcgtttag tgaaccgtca gatcactaga gcttcaagc tctagcagga agaagaaaga  1980
agaagaagaa gaagaagaag aagaagcgtc tcctcttctt cttgtgagag taaaaagaa  2040
aactcccaaa aaaagaaaaa tcatcaaaaa aacaaatttc aaaagagtt tttgtgtttgg 2100
gggattaaag aagaaaaaaa acaacaggtg agtaagcgca gttgtcgtct cttgcggtgc  2160
cgttgctggt ctcacacct tttaggtctg ttctcgtctt ccgttctgac tctctctttt  2220
tcgttgcagg cc                                                      2232

SEQ ID NO: 58           moltype = DNA  length = 1942
FEATURE                 Location/Qualifiers
misc_feature            1..1942
                        note = EEE1-60+CMV+TEE
source                  1..1942
                        mol_type = other DNA
                        organism = synthetic construct
SEQUENCE: 58
cgcatgcgcc gaggtccgct ccggccgcgc tgatccaagc cgggttctcg cgccgacctg    60
gtcgtgattg acaagtcaca cacgctgatc cctccgcggg gccgcacagg gtcacagcct   120
ttcccctccc cacaaagccc cctactctct gggcaccaca cacgaacatt ccttgagcgt   180
gaccttgttg gctctagtca ggcgcctccg gtgcagagac tggaacggcc ttgggaagta   240
gtccctaacc gcatttccgc ggagggatcg tcgggagggc gtggcttctg aggattatat   300
aaggcgactc cgggcgggtc ttagctagtt ccgtcggaga cccgagttca gtcgccgctt   360
ctctgtgagg actgctgccg ccgccgctgg tgaggagaag ccgccgcgct tggcgtagct   420
gagagacggg gaggggggcgc ggacacgagg ggcagcccgc ggcctggacg ttctgtttcc   480
gtggcccgcg aggaaggcga ctgtcctgag gcggaggacc cagcggcaag atggcggcca   540
agtggaagcc tgagggggata ggcgagcggc cctgaggcgc tcgacggggt tgggggggaa   600
gcaggcccgc gaggcagctg cagccgggaa cgtgcggcca accccttatt tttttgacg    660
ggttgcgggc cgtaggtgcc tccgaagtga gagccgtggg cgtttgactg tcgggagagg   720
tcggtcggat tttcatccgt tgctaaagac ggaagtgcga ctgagacggg aagggggggg   780
agtcggttgg tggcggttga acctggacta aggcgcacat gacgtcgcgg tttctatggg   840
ctcataatgg gtggtgagga catttccctg tttaaactta aacaagtttg tacaaaaaag   900
caggctagat cttcaatatt ggccattagc catattattc attggttata tagcataaat   960
```

```
caatattggc tattggccat tgcatacgtt gtatctatat cataatatgt acatttatat   1020
tggctcatgt ccaatatgac cgccatgttg gcattgatta ttgactagtt attaatagta   1080
atcaattacg gggtcattag ttcatagccc atatatggag ttccgcgtta cataacttac   1140
ggtaaatggc ccgcctggct gaccgcccaa cgacccccgc ccattgacgt caataatgac   1200
gtatgttccc atagtaacgc caatagggac ttttccattg acgtcaatgg gtggagtattt   1260
acggtaaact gcccacttgg cagtacatca agtgtatcat atgccaagtc cgccccctat   1320
tgacgtcaat gacggtaaat ggcccgcctg gcattatgcc cagtacatga ccttacggga   1380
ctttcctact tggcagtaca tctacgtatt agtcatcgct attaccatag tgatgcggtt   1440
ttggcagtac accaatgggc gtggatagcg gtttgactca cggggatttc caagtctcca   1500
ccccattgac gtcaatggga gtttgttttg gcaccaaaat caacgggact ttccaaaatg   1560
tcgtaataac cccgccccgt tgacgcaaat gggcggtagg cgtgtacggt gggaggtcta   1620
tataagcaga gctcgtttag tgaaccgtca gatcactaga agcttcaagc tctagcagga   1680
agaagaaaga agaagaagaa gaagaagaag aagaagcgtc tcctcttctt cttgtgagag   1740
taaaaaagaa aactcccaaa aaaaagaaaa tcatcaaaaa aacaaatttc aaaaagagtt   1800
tttgtgtttg gggattaaag aagaaaaaaa acaacaggtg agtaagcgca gttgtcgtct   1860
cttgcggtgc cgttgctggt tctcacacct tttaggtctg ttctcgtctt ccgttctgac   1920
tctctctttt tcgttgcagg cc                                            1942

SEQ ID NO: 59          moltype = DNA   length = 1449
FEATURE                Location/Qualifiers
misc_feature           1..1449
                       note = EEE1
source                 1..1449
                       mol_type = other DNA
                       organism = synthetic construct
SEQUENCE: 59
tttcaggcaa ccagagctac atagtgagat cctgtctcaa caaaaataaa ataatctaag     60
gcttcaaagg gttcaatctc ttaggtagct aaatatgaac aaaatttggg aaatgtgacc    120
ttttccttag tgacagtcag atagaacctt ctcgagtgca aggacaccaa gtgcaaacag    180
gctcaagaac agcctggaaa ggtctagtgc tatgggggct caggtcgaat gccaactgtt    240
ttcaagaact gtgtggattt ttctgcctgt aacgaattca gattcatttt tcaaaactgt    300
gggagagttt tccccttta taatttttttt tttaaattta ttaaactttg tttcgttccc    360
cttgttttga gaattgcaga gtcatccacc ctgtcacagt gccagggagc tcagggatgg    420
gcccaggggc ctggcgggc tgaaggggct ggggaagcga gggccaccgga gggaccccag    480
tgtggcagga gccaaagccc taggtcccta gaacgcagag gccaccggga cccccccagac   540
ggggtaagcg ggtgggtgtc tggggcgcga agccgcactg cgcatgcgcc gaggtccgct    600
ccggccgcgc tgatccaagc cgggttctcg cgccgacctg gtcgtgattg acaagtcaca    660
cacgctgatc cctccgcggg gccgcacagg gtcacagcct ttcccctccc cacaaagccc    720
cctactctct gggcaccaca cacgaacatt ccttgagcgt gaccttgttg gctctagtca    780
ggcgcctccg gtgcagagac tggaacggcc ttgggaagta gtccctaacc gcatttccgc    840
ggagggatcg tcgggagggc gtggcttctg aggattatat aaggcgactc cgggcgggtc    900
ttagctagtt ccgtcggaga cccgagttca gtcgccgctt ctctgtgagg actgctgccg    960
ccgccgctgg tgaggagaag ccgccgcgct tggcgtagct gagagacggg gaggggcgc   1020
ggacacgagg ggcagcccgc ggcctggacg ttctgttttcc gtggcccgcg aggaaggcga  1080
ctgtcctgag gcgaggacc cagcggcaag atggcggcca agtggaagcc tgagggggata  1140
ggcgagcggc cctgaggcgc tcgacggggt tgggggggaa gcaggcccgc gaggcagctg  1200
cagccgggaa cgtgcggcca accccttatt tttttgggtt gtgcggcc cgtaggtgcc    1260
tccgaagtga gagccgtggg cgtttgactg tcgggagagg tcggtcggat tttcatccgt  1320
tgctaaagac ggaagtgcga ctgagacggg aaggggggg agtcggttgg tggcggttga   1380
acctggacta aggcgcacat gacgtcgcgg tttctatggg ctcataatgg gtggtgagga  1440
catttccct                                                           1449

SEQ ID NO: 60          moltype = DNA   length = 1228
FEATURE                Location/Qualifiers
misc_feature           1..1228
                       note = EEE2
source                 1..1228
                       mol_type = other DNA
                       organism = synthetic construct
SEQUENCE: 60
gtaaagcaga tcacacagaa tatggcacac ttgagcactt gatgtgtact acattactct     60
tagtgacgac tttaattatc gtcgcattc ccagcgcttc ctatggtgcc caacacagag    120
cggacgccta gagacaattt tggggatgg ggcagatgct ctgcctcggg aaaaaaaaag   180
cacacctgcc ctgacgttgg tggctgggtc tggaagatac attggaaatta agctagagat    240
gtgtggcttc cagatcaaaa accgcaaaaa tctaacgccg tgactactga ctacggtcag    300
agagcacaga ctggagcaac ctctacggg ctgggctgtc tgcgcgtgcg tgagccagaa    360
accccgagggg ctccctgggc ccgccctatc gatcgacccg atcggggatc gtcagcttgg  420
ttctggccac agaggttgct cttctcgcga tgcttcagac ctggcggcag ggaaagggtg   480
ggctaattgg agagccagga agagcgtgag gcggccccac tgctgttttcc cagaaggctg  540
tgcgtgctcc tcgcttcctc cgcggtcttc cgagccggtcg cgtgaactgc ttccagcagg  600
ctggccatgg cgcttcacgt tcccaaggct ccgggctttg cccagatgct caaggaggga   660
gcgaaagtaa gggctgaagg aaaggaatga ggtgggagcg tcagcatagg gctgcggcgg   720
cggcggcgaa gtaggagggc ctactaacgg gctgagcgtg ctgccctggc tcagcggccg   780
aagagaagat tccaga aagggaggtg attttgaggg agtaggggca gaggagctag tactgctgag 840
cgggcacttc tcttcttccg cgaccggag aaggccgagg gatcggcggc acgatcgaca    900
ttgtacacct tgaaggtgga cggatgtgaa gccgcgcgtg cgttttgcct ccatccgtaa    960
atgggggctaa ggcccgtcac ccttaaagga ggttgtgagg gtgaaattga ataacgtaga  1020
tgaaattgtc ttgagaactg cgacgtcgat tatcacatag ctcgcgagtt gtaggatggg   1080
gaagaacgag aactagccga tccagagaag agagtgggaa aagggccggg tcttggttg    1140
```

```
cttgcttccc agtgagaaac atacggcttt cagcttagtt gacagaagcc atgcgttgta    1200
gccaaatgag ttccggtccc aacttatg                                       1228

SEQ ID NO: 61           moltype = DNA   length = 753
FEATURE                 Location/Qualifiers
misc_feature            1..753
                        note = CMV promoter
source                  1..753
                        mol_type = other DNA
                        organism = synthetic construct
SEQUENCE: 61
tcaatattgg ccattagcca tattattcat tggttatata gcataaatca atattggcta     60
ttggccattg catacgttgt atctatatca taatatgtac atttatattg gctcatgtcc    120
aatatgaccg ccatgttggc attgattatt gactagttat taatagtaat caattacggg    180
gtcattagtt catagcccat atatggagtt ccgcgttaca taacttacgg taaatggccc    240
gcctggctga ccgcccaacg accccgccc attgacgtca ataatgacgt atgttcccat     300
agtaacgcca atagggactt tccattgacg tcaatgggtg gagtatttac ggtaaactgc    360
ccacttggca gtacatcaag tgtatcatat gccaagtccg cccctattg acgtcaatga     420
cggtaaatgg cccgcctggc attatgccca gtacatgacc ttacgggact ttcctacttg    480
gcagtacatc tacgtattag tcatcgctat taccatagtg atgcggtttt ggcagtacac    540
caatgggcgt ggatagcggt ttgactcacg ggatttccaa gtctccacc ccattgacgt     600
caatgggagt ttgttttggc accaaaatca acgggacttt ccaaaatgtc gtaataaccc    660
cgccccgttg acgcaaatgg gcggtaggcg tgtacggtgg gaggtctata taagcagagc    720
tcgtttagtg aaccgtcaga tcactagaag ctt                                 753

SEQ ID NO: 62           moltype = DNA   length = 69
FEATURE                 Location/Qualifiers
misc_feature            1..69
                        note = minimal CMV promoter
source                  1..69
                        mol_type = other DNA
                        organism = synthetic construct
SEQUENCE: 62
taggcgtgta cggtgggagg tctatataag cagagctcgt ttagtgaacc gtcagatcac     60
tagaagctt                                                             69

SEQ ID NO: 63           moltype = DNA   length = 2248
FEATURE                 Location/Qualifiers
misc_feature            1..2248
                        note = EEE1-XT
source                  1..2248
                        mol_type = other DNA
                        organism = synthetic construct
SEQUENCE: 63
tggtgaccct gtctcaaaaa accctcaaaa agtgttggga ttagtggcat gcaccaccat     60
tcccaccaaa ggtttatttt taataatatg tgtgtgagtg tgtatcacta tgagtatatg    120
tcaatatgtg tcaatgtccc cagggacatt taaagagccc ctgaagctgg agtcatggc     180
cattatgaac tgcctgacat ggctaatggg aattgaactc agattttctg gaagttatac    240
ctgctcttac tgctgagcca tgtctctgaa gaccccaggg attttttttt ttttttgaga    300
caggtatttt ctgtatagcc ctggctgtcc tgaaagcact ctctatatgt agaccaggct    360
tgcctggagc ttggatatgc acctgcttct gcctcaggaa tggtgggatt gaaggtgtgc    420
accaccacat ccgctaacat gcacaattcc taatggtttt atatcttatt taatgaatga    480
aaggtttggg ggatggatgt agcttaatgg aaaatgactg aagatttcaa ttaaaaatct    540
ggggcttagc tgcgcggtgg gtggtgcctg ccttagtcc cagtactggg gaggcagagg    600
aaggagatc tctgtgagtt cgaggccagc tggtctataa cgtgagttcc aggacagcca    660
gagatacaca gacaaaccct gtctcaccaa aacaaaacaa caacaacaac aacaaatctg    720
ggacgtaggc ttggtgtggt ggcacacatt ttgattccag cacttggaag gaagaggcct   780
gcatggtcta catagcttgt ttcaggcaac cagagctaca tagtgagatc ctgtctcaac    840
aaaaataaaa taatctaagg cttcaaaggg ttcaatctct taggtagcta aatatgaaca    900
aaatttggga aatgtgacct tttccttagt gacagtcaga tagaaccttc tcgagtgcaa    960
ggacaccaag tgcaaacagg ctcaagaaca gcctggaaag gtcagtgct atggggcttc    1020
aggtcgaatg ccaactgttt tcaagaactg tgtggatttt tctgcctgta acgaattcag   1080
attcattttt caaaactcgg ggagagtttt cccccttat aatttttttt ttaaatttat    1140
taaactttgt ttcgttcccc ttgtttggag aattgcaagt tcatccaccc tgtcacagtg   1200
ccagggagct cagggatggg cccagggggc tggcggggct gaaggggctg ggaagcgag    1260
ggctccaaag ggaccccagt gtggcaggag ccaaagcccc aggtccctag aacgcagagg    1320
ccaccggggac cccccagacg gggtaagcgg gtgggtgtct ggggcgcgaa gccgcactgc   1380
gcatgcgccg aggtccgctc cggccgcgct gatccaagcc gggttctcgc gccgacctgg    1440
tcgtgattga caagtcacac acgctgatcc ctccgcgggg cgcacaggg tcacagcctt     1500
tcccctcccc acaaagcccc ctactctctg ggcaccacac acgaacattc cttgagcgtg    1560
accttgttgg ctctagtcag gcgcctccgg tgcagagact ggaacggcct tgggaagtag    1620
tccctaaccg catttcgcg gagggatcgt cggggagggc tggcttctga ggattatata    1680
aggcgactcc gggcgggtct tagctagttc cgtcggagac ccgagttcag tcgccgcttc    1740
tctgtgagga ctgctgcgc cgccgctggt gaggagaagc gccgcgcgct ggcgtagctg    1800
agagacgggg aggggcgcg gacacgagg gcagccgcg gcctgacgt tctgtttccg       1860
tggcccgcga ggaaggcgac tgtcctgagg cggaggaccc agcggcaaga tggcggccaa   1920
gtggaagcct gaggggatag gcgagcggcc ctgaggcgct cgacggggtt gggggggaag    1980
caggcccgcg aggcagctgc agccgggaac gtgcggccaa ccccttattt ttttttgacgg   2040
gttgcgggcc gtaggtgcct ccgaagtgag agccgtgggc gttgactgt cgggagaggt     2100
```

```
cggtcggatt ttcatccgtt gctaaagacg aagtgcgac tgagacggga agggggggga 2160
gtcggttggt ggcggttgaa cctggactaa ggcgcacatg acgtcgcggt ttctatgggc 2220
tcataatggg tggtgaggac atttccct                                    2248

SEQ ID NO: 64           moltype = DNA   length = 724
FEATURE                 Location/Qualifiers
misc_feature            1..724
                        note = EEE1-50
source                  1..724
                        mol_type = other DNA
                        organism = synthetic construct
SEQUENCE: 64
tctctgggca ccacacacga acattccttg agcgtgacct tgttggctct agtcaggcgc  60
ctccggtgca gagactggaa cggcctgggg aagtagtccc taaccgcatt tccgcggagg 120
gatcgtcggg agggcgtggc ttctgaggat tatataaggc gactccgggc gggtcttagc 180
tagttccgtc ggagacccga gttcagtcgc cgcttctctg tgaggactgc tgccgccgcc 240
gctggtgagg agaagccgcc gcgcttggcg tagctgagag acggggaggg ggcgcggaca 300
cgaggggcag cccgcggcct ggacgttctg tttccgtggc ccgcgaggaa ggcgactgtc 360
ctgaggcgga ggacccagcg gcaagatggc ggccaagtgg aagcctgagg ggataggcga 420
gcggccctga ggcgctcgac ggggttgggg gggaagcagg cccgcgaggc agctgcagcc 480
gggaacgtgg ggccaacccc ttatttttt tgacgggttg cgggccgtag gtgcctccga 540
agtgagagcc gtgggcgttt gactgtcggg agaggtcggc cggattttca tccgttgcta 600
aagacggaag tgcgactgag acgggaaggg gggggagtcg gttggtggcg gttgaacctg 660
gactaaggcg cacatgacgt cgcggtttct atgggctcat aatgggtggt gaggacattt 720
ccct                                                              724

SEQ ID NO: 65           moltype = DNA   length = 1449
FEATURE                 Location/Qualifiers
misc_feature            1..1449
                        note = EEE1-SL
source                  1..1449
                        mol_type = other DNA
                        organism = synthetic construct
SEQUENCE: 65
tttcaggcaa ccagagctac atagtgagat cctgtctcaa caaaaataaa ataatctaag  60
gcttcaaagg gttcaatctc ttaggtagct aaatatgaac aaaatttggg aaatgtgacc 120
ttttccttag tgacagtcag atagaacctt ctcgagtgca aggacaccaa gtgcaaacag 180
gctcaagaac agcctggaaa ggtctagtgc tatgggcctt caggtcgaat gccaactgtt 240
ttcaagaact gtgtggattt ttctgcctgt aacgaattca gattcatttt tcaaaactcg 300
gggagagttt tcccccttta taattttttt tttaaattta ttaaactttg tttcgttccc 360
cttgttttga gaattgcaga gtcatccacc ctgtcacagt gccagggagc tcagggatgg 420
gcccaggggc ctggcgggc tgaaggggct ggggaagcga gggctccaaa gggacccccag 480
tgtggcagga gccaaagccc taggtccta gaacgcaggg gccaccggga cccccagac 540
ggggaaagcg gttgggtgtc tggggcgcga agccgcactg cgcatgcgcc gaggtccgct 600
ccggccgcgc tgatccaagc cgggttctcg cgccgacctg tcgtgattg acaagtcaca 660
cacgctgatc cctccgcggg gccgcacagg gtcacagcct ttcccctccc cacaaagccc 720
cctactctct gggcaccaca cacgaacatt ccttgagcct gaccttgttg gctctagtca 780
ggcgcctccg gtgcagagac tggaacggcc ttgggaagta gtccctaacc gcatttccgc 840
ggagggatcg tcgggagggc gtggcttctg aggattatat aaggcgactc cgggcgggtc 900
ttagctagtt ccgtcggaga cccgagttca gtcgccgctt ctctgtgagg actgctgccg 960
ccgccgctgc tgaggagaag ccgccgcgct tggcgtagct gagagacggg gagggggcgc 1020
ggacacgagg ggcagcccgc ggcctggacg ttctgtttcc gtggcccgcg aggaaggcga 1080
ctgtcctgag gcggaggacc cagcggcaag atggcggcca agtggaagcc tgaggggata 1140
ggcgagcggc cctgaggcgc tcgacggggt tgggggggaa gcaggcccgc gaggcagctg 1200
cagccgggaa cgtggggcca acccccttatt tttttgacgg gttgcgggcc gtaggtgcc 1260
tccgaattga gagccgtggg cgtttgactg tcgggagagg tcggtcggat tttcatccgt 1320
tgctaaagac ggaagtgcga ctgagacggg aaggggggga gtcggttgg tggcggttga 1380
acctggacta aggcgcacat gacgtcgcgg tttctatggg ctcataatgg gtggtgagga 1440
catttccct                                                         1449

SEQ ID NO: 66           moltype = DNA   length = 455
FEATURE                 Location/Qualifiers
misc_feature            1..455
                        note = EF1a promoter
source                  1..455
                        mol_type = other DNA
                        organism = synthetic construct
SEQUENCE: 66
ggatccttgg agctaagcca gcaatggtag agggaagatt ctgcacgtcc cttccaggcg  60
gcctccccgt caccacccc cccaacccgc cccgaccgga gctgagagta attcatacaa 120
aaggactcgc cctgccttg ggaatccca gggaccgtcg ttaaactccc actaacgtag 180
aacccagaga tcgctgcgtt cccgccccct cacccgcccg ctctcgtcat cactgaggtg 240
gagaagagca tgcgtgaggc tccggtgccc gtcagtgggc agagcgcaca tcgcccacag 300
tccccgagaa gttggggga ggggtcggca attgaaccgg tgcctagaa aggtggcgcg 360
gggtaaactg ggaaagtgat gtcgtgtact ggctccgcct ttttcccgag ggtggggggag 420
aaccgtatat aagtgcagta gtcgccgtga acgtt                             455

SEQ ID NO: 67           moltype = DNA   length = 2617
FEATURE                 Location/Qualifiers
```

```
misc_feature            1..2617
                        note = Transcription regulating sequence
source                  1..2617
                        mol_type = other DNA
                        organism = synthetic construct
SEQUENCE: 67
tttcaggcaa ccagagctac atagtgagat cctgtctcaa caaaaataaa ataatctaag    60
gcttcaaagg gttcaatctc ttaggtagct aaatatgaac aaaatttggg aaatgtgacc   120
ttttccttag tgacagtcag atagaacctt ctcgagtgca aggacaccaa gtgcaaacag   180
gctcaagaac agcctggaaa ggtctagtgc tatggggctt caggtcgaat gccaactgtt   240
ttcaagaact gtgtggattt ttctgcctgt aacgaattca gattcatttt tcaaaactcg   300
gggagagttt tccccctta taatttttt tttaaattta ttaaactttg tttcgttccc    360
cttgttttga gaattgcaga gtcatccacc ctgtcacagt gccagggagc tcagggatgg   420
gcccagggc ctggcgggc tgaaggggct ggggaagcga gggctccaaa ggacccccag    480
tgtggcagga gccaaagccc taggtcccta gaacgcagag gccaccggga cccccagac   540
ggggtaagcg ggtgggtgtc tggggcgcga agccgcactg cgcatgcgcc gaggtccgct   600
ccggccgcgc tgatccaagc cgggttctcg cgccgacctg tcgtgattg acaagtcaca    660
cacgctgatc cctccgcggg gccgcacagg gtcacagcct ttccccctccc cacaaagccc   720
cctactctct gggcaccaca cacgaacatt ccttgagcgt gaccttgttg gctctagtca   780
ggcgcctccg gtgcagagac tggaacggcc ttgggaagta gtccctaacc gcatttccgc   840
ggagggatcg tcgggagggc gtggcttctg aggattatat aaggcgactc cgggcgggtc   900
ttagctagtt ccgtcggaga cccgagttca gtcgccgctc ctctgtgagg actgctgccg   960
ccgccgctgg tgaggagaag ccgccgcgct tggcgtagct gagagacggg gaggggcgc   1020
ggacacgagg ggcagcccgc ggcctggacg ttctgtttcc gtggcccgcg aggaaggcga  1080
ctgtcctgag gcggaggacc cagcggcaag atggcggcca gtggaagcc tgaggggata   1140
ggcgaggcgc cctgaggcgc tcgacggggt tgggggggaga gcaggcccgc gaggcagctg  1200
cagccgggaa cgtgcggcca accccttatt tttttttgacg ggttgcgggc cgtaggtgcc  1260
tccgaagtga gagccgtggg cgtttgactg tcgggagagg tcgtcggat tttcatccgt   1320
tgctaaagac ggaagtgcga ctgagacggg aagggggggg agtcggttgg tggcggttga   1380
acctggacta aggcgcacat gacgtcgcgg tttctatggg ctcataatgg gtggtgagga   1440
catttccctg actatagctt tccctcagtt gtaggacagg gtttgggcct cggcctcggg   1500
ttaggctctc cagagtgggc aggaaccgga aatccagagg ggggaaaagt gagcctaaat   1560
tgagttttgt ttcttgtcct atatggttta gagagagact cgctgcaaaa ccgtggctgg   1620
cctgaactc tagaccagaa ccctggcctt tgccgcccca catgattaga ttcaaggcct   1680
gtgccaccag cccaggcttt attattatgg tctgggattt ctgcgatttc atccctggtg   1740
ttttgggatg atgacttgtg ggtcttccct cctcccccctt actgtttctg tccatgcgt   1800
gtgttctaac ccaagtttgt tcttttgggg gggtgggagg gttgcgataa aatgggatct   1860
atctctgccc tcccaacttg agatctgcct gtcagaagtc tcagtgctga gaataaaggt   1920
gtgcattggc tcagacctcg atttttttttt ttttattat tttgtaggaa gtctgtagtc   1980
cttacttgat acataagacc agacaggatc tgatttcctg cctatgaatg gtagatcctc   2040
tcagtgactg cagtgtgaat ggggaccacg cttttctcca aactatgcag atagccatga   2100
aagccatgaa atgactttca gccactggta ctgcaatatc cactcaccat ttattatatg   2160
gaccaggttc accatgccta ggtggctttg cttttgaagt acggtttctc tgtgtagcct   2220
tggttatgtt ttttttgtttg ttttttttaat tattttttggt ttttcgagac agggtttctc  2280
tgtgtagctt tggagcctat cctggcactt gctccggaga ccaggctggc tccaactca   2340
gatctgcctg cctctgcctc ccgactgctg ggattaaagt aaagccattc tgcaaccctg   2400
aataccactc aataggtttc ttatttgaaa tgtggttta tgattttttat ttctggattt   2460
agaaaagaaa tcttcagaca gaagtcttca gacagaaact agctgtagtt tggctgtgtg   2520
aactaaattg gcatccatttt cacagcaatc caactgttag taccatacca cgaatatttg   2580
tcattcctga cctgtttttt gtttgtgtgt gtgacag                            2617

SEQ ID NO: 68          moltype = DNA   length = 1886
FEATURE                Location/Qualifiers
misc_feature           1..1886
                       note = Backbone vector
source                 1..1886
                       mol_type = other DNA
                       organism = synthetic construct
SEQUENCE: 68
cacgcgtctt aagaccatgt gagcaaaagg ccagcaaaag gccaggaacc gtaaaaaggc    60
cgcgttgctg gcgttttttcc ataggctccg ccccctgac gacgcatcac aaaaatcgac   120
gcgtcaagtc agaggtggcg aaacccgaca ggactataaa gataccaggc gtttccccct   180
ggaagctccc tcgtgcgctc tcctgttccg accctgccgc ttaccggata cctgtccgcc   240
tttctccctt cgggaagcgt ggcgctttct catagctcac gctgtaggta tctcagttcg   300
gtgtaggtcg ttcgctccaa gctgggctgt gtgcacgaac cccccgttca gcccgaccgc   360
tgcgccttat ccggtaacta tcgtcttgag tccaacccgg taagacacga cttatcgcca   420
ctggcagcag ccactggtaa caggattagc agagcgaggt atacaggcgg tgctacagag   480
ttcttgaagt ggtggcctaa ctacggctac actagaagaa cagtatttgg tatctgcgct   540
ctgctgaagc cagttacctt cggaaaaaga gttggtagct cttgatccgg caaacaaacc   600
accgctggta gcggtggttt ttttgtttgc aagcagcaga ttacgcgcag aaaaaaagga   660
tctcaagaag atcctttgat cttttctacg ggtctgacgc gtcagtgga acgaaaactc   720
acgttaaggg attttggtca tgagattatc aaaaaggatc ttcacctaga tccttttaaa   780
ttaaaaatga agttttaaat caatctaaag tatatatgag taaacttggt ctgacagtta   840
gaaaaactca tcgagcatca aatgaaactg caatttattc atatcaggat tatcaatacc   900
atatttttga aaaagccgtt tctgtaatga aggagaaaac tcaccgaggc agttccatag   960
gatggcaaga tcctggtatc ggtctgcgat tccgacgcgt ccaacatcaa tacaacctat  1020
taatttcccc tcgtcaaaaa taaggttatc aagtgagaaa tcaccatgag tgacgactga  1080
atccggtgag aatggcaaaa gtttatgcat ttctttccag acttgttcaa caggccagcc  1140
attacgctcg tcatcaaaat cactcgcatc aaccaaaccg ttattcattc gtgattgcgc  1200
```

```
ctgagcgaga cgaaatacgc gatcgctgtt aaaaggacaa ttacaaacag gaatcgaatg  1260
caaccggcgc aggaacactg ccagcgcatc aacaatattt tcacctgaat caggatattc  1320
ttctaatacc tggaatgctg ttttcccagg atcgcagtg gtgagtaacc acgcgtcatc   1380
aggagtacgg ataaaatgct tgatggtcgg aagaggcata aattccgtca gccagtttag  1440
tctgaccatc tcatctgtaa catcattggc aacgctacct ttgccatgtt tcagaaacaa  1500
ctctggcgca tcgggcttcc catacaatgc atagattgtc gcacctgatt gcccgacatt  1560
atcgcgagcc catttatacc catataaatc agcatccatg ttggaattta atccgcggct  1620
agagcaagac gtttcacgcg tttgaatatg gctcatactc ttccttttc aatattattg   1680
aagcatttat cagggttatt gtctcatgag cggatacata tttgaatgta tttagaaaaa  1740
taaacaaata ggggttccgc gcacatttcc ccgaaaagtg ccacctgacg tctaagaaac  1800
cattattatc atgacattaa cctataaaaa taggcgtatc aacgcgtcct gcagggcggc  1860
cgcgtcgacg cgcgcacatg tgtata                                       1886

SEQ ID NO: 69          moltype = AA   length = 272
FEATURE                Location/Qualifiers
REGION                 1..272
                       note = Kanamycin resistance marker
source                 1..272
                       mol_type = protein
                       organism = synthetic construct
SEQUENCE: 69
MSHIQTRETS CSRPRLNSNM DADLYGYKWA RDNVGQSGAT IYRLYGKPDA PELFLKHGKG   60
SVANDVTDEM VRLNWLTEFM PLPTIKHFIR TPDDAWLLTT AIPGKTAFQV LEEYPDSGEN  120
IVDALAVFLR RLHSIPVCNC PFNSDRVFRL AQAQSRMNNG LVDASDFDDE RNGWPVEQVW  180
KEMHKLLPFS PDSVVTHGDF SLDNLIFDEG KLIGCIDVGR VGIADRYQDL AILWNCLGEF  240
SPSLQKRLFQ KYGIDNPDMN KLQFHLMLDE FF                                272

SEQ ID NO: 70          moltype = AA   length = 272
FEATURE                Location/Qualifiers
REGION                 1..272
                       note = Kanamycin resistance marker
source                 1..272
                       mol_type = protein
                       organism = synthetic construct
SEQUENCE: 70
MSHIQRETRS CSRPRLNSNM DADLYGYKWA RDNVGQSGAT IYRLYGKPDA PELFLKHGKG   60
SVANDVTDEM VRLNWLTEFM PLPTIKHFIR TPDDAWLLTT AIPGKTAFQV LEEYPDSGEN  120
IVDALAVFLR RLHSIPVCNC PFNSDRVFRL AQAQSRMNNG LVDASDFDDE RNGWPVEQVW  180
KEMHKLLPFS PDSVVTHGDF SLDNLIFDEG KLIGCIDVGR VGIADRYQDL AILWNCLGEF  240
SPSLQKRLFQ KYGIDNPDMN KLQFHLMLDE FF                                272

SEQ ID NO: 71          moltype = DNA  length = 441
FEATURE                Location/Qualifiers
misc_feature           1..441
                       note = Gene block 1a
source                 1..441
                       mol_type = other DNA
                       organism = synthetic construct
SEQUENCE: 71
gcgttgctgg cgttttttcca taggctccgc cccctgacg agcatcacaa aaatcgacgc    60
tcaagtcaga ggtggcgaaa cccgacagga ctataaagat accaggcgtt tccccctgga  120
agctccctcg tgcgctctcc tgttccgacc ctgccgctta ccggatacct gtccgccttt  180
ctcccttcgg gaagcgtggc gctttctcat agctcacgct gtaggtatct cagttcggtg  240
taggtcgttc gctccaagct gggctgtgtg cacgaacccc ccgttcagcc cgaccgctgc  300
gccttatccg gtaactatcg tcttgagtcc aacccggtaa gacacgactt atcgccactg  360
gcagcagcca ctggtaacag gattagcaga gcgaggtatg taggcggtgc tacagagttc  420
ttgaagtggt ggcctaacta c                                            441

SEQ ID NO: 72          moltype = DNA  length = 466
FEATURE                Location/Qualifiers
misc_feature           1..466
                       note = Gene block 2a
source                 1..466
                       mol_type = other DNA
                       organism = synthetic construct
SEQUENCE: 72
agttcttgaa gtggtggcct aactacggct acactagaag aacagtattt ggtatctgcg   60
ctctgctgaa gccagttacc ttcggaaaaa gagttggtag ctcttgatcc ggcaaacaaa  120
ccaccgctgg tagcggtggt ttttttgttt gcaagcagca gattacgcgc agaaaaaaag  180
gatctcaaga agatcctttg atcttttcta cggggtctga cgctcagtgg aacgaaaact  240
cacgttaagg gattttggtc atgagattat caaaaaggat cttcacctag atccttttaa  300
attaaaaatg aagttttaaa tcaatctaaa gtatatatga gtaaacttgg tctgacagtt  360
agaaaaactc atcgagcatc aaatgaaact gcaatttatt catatcagga ttatcaatac  420
catatttttg aaaaagccgt ttctgtaatg aaggagaaaa ctcacc                 466

SEQ ID NO: 73          moltype = DNA  length = 488
FEATURE                Location/Qualifiers
misc_feature           1..488
                       note = Gene block 3a
```

```
source                          1..488
                                mol_type = other DNA
                                organism = synthetic construct
SEQUENCE: 73
ttctgtaatg aaggagaaaa ctcaccgagg cagttccata ggatggcaag atcctggtat    60
cggtctgcga ttccgactcg tccaacatca atacaaccta ttaatttccc ctcgtcaaaa   120
ataaggttat caagtgagaa atcaccatga gtgacgactg aatccggtga gaatggcaaa   180
agtttatgca tttctttcca gacttgttca acaggccagc cattacgctc gtcatcaaaa   240
tcactcgcat caaccaaacc gttattcatt cgtgattgcg cctgagcgag acgaaatacg   300
cgatcgctgt taaaaggaca attacaaaca ggaatcgaat gcaaccggcg caggaacact   360
gccagcgcat caacaatatt ttccctgaa tcaggatatt cttctaatac ctggaatgct   420
gttttcccag ggatcgcagt ggtgagtaac catgcatcat caggagtacg gataaaatgc   480
ttgatggt                                                            488

SEQ ID NO: 74                   moltype = DNA   length = 451
FEATURE                         Location/Qualifiers
misc_feature                    1..451
                                note = Gene block 4a
source                          1..451
                                mol_type = other DNA
                                organism = synthetic construct
SEQUENCE: 74
ggagtacgga taaaatgctt gatggtcgga agaggcataa attccgtcag ccagtttagt    60
ctgaccatct catctgtaac atcattggca acgctacctt tgccatgttt cagaaacaac   120
tctggcgcat cgggcttccc atacaatcga tagattgtcg cacctgattg cccgacatta   180
tcgcgagccc atttataccc atataaatca gcatccatgt tggaatttaa tcgcggccta   240
gagcaagacg tttcccgttg aatatggctc atactcttcc ttttcaata ttattgaagc   300
atttatcagg gttattgtct catgagcgga tacatatttg aatgtattta gaaaaataaa   360
caaatagggg ttccgcgcac atttccccga aaagtgccac ctgacgtcta agaaaccatt   420
attatcatga cattaaccta taaaaatagg c                                  451

SEQ ID NO: 75                   moltype = DNA   length = 164
FEATURE                         Location/Qualifiers
misc_feature                    1..164
                                note = Gene block 5a
source                          1..164
                                mol_type = other DNA
                                organism = synthetic construct
SEQUENCE: 75
catgacatta acctataaaa ataggcgtat caacgcgtcc tgcagggcgg ccgcgtcgac    60
gcgcgcacat gtgtatacac gcgtcttaag accatgtgag caaaaggcca gcaaaaggcc   120
aggaaccgta aaaaggccgc gttgctggcg ttttttccata ggct                   164

SEQ ID NO: 76                   moltype = DNA   length = 488
FEATURE                         Location/Qualifiers
misc_feature                    1..488
                                note = Gene block 3b
source                          1..488
                                mol_type = other DNA
                                organism = synthetic construct
SEQUENCE: 76
ttctgtaatg aaggagaaaa ctcaccgagg cagttccata ggatggcaag atcctggtat    60
cggtctgcga ttccgacgcg tccaacatca atacaaccta ttaatttccc ctcgtcaaaa   120
ataaggttat caagtgagaa atcaccatga gtgacgactg aatccggtga gaatggcaaa   180
agtttatgca tttctttcca gacttgttca acaggccagc cattacgctc gtcatcaaaa   240
tctgacgcgt caaccaaacc gttattcatt cgtgattgcg cctgagcgag acgaaatacg   300
cgatcgctgt taaaaggaca attacaaaca ggaatcgaat gcaaccggcg caggaacact   360
gccagcgcat caacaatatt ttccctgaa tcaggatatt cttctaatac ctggaatgct   420
gttttcccag ggatcgcagt ggtgagtaac cacgcgtcat caggagtacg gataaaatgc   480
ttgatggt                                                            488

SEQ ID NO: 77                   moltype = DNA   length = 454
FEATURE                         Location/Qualifiers
misc_feature                    1..454
                                note = Gene block 4b
source                          1..454
                                mol_type = other DNA
                                organism = synthetic construct
SEQUENCE: 77
ggagtacgga taaaatgctt gatggtcgga agaggcataa attccgtcag ccagtttagt    60
ctgaccatct catctgtaac atcattggca acgctacctt tgccatgttt cagaaacaac   120
tctggcgcat cgggcttccc atacaatcga tagattgtcg cacctgattg cccgacatta   180
tcgcgagccc atttataccc atataaatca gcatccatgt tggaatttaa tcgcggccta   240
gagcaagacg tttcacgcgt tgaatatgg ctcatactctc tccttttca atattattga   300
agcatttatc agggttattg tctcatgagc ggatacatat ttgaatgtat ttagaaaaat   360
aaacaaatag gggttccgcg cacatttccc cgaaaagtgc cacctgacgt ctaagaaacc   420
attattatca tgacattaac ctataaaaat aggc                               454

SEQ ID NO: 78                   moltype = DNA   length = 454
```

```
FEATURE                 Location/Qualifiers
misc_feature            1..454
                        note = Gene block 4c
source                  1..454
                        mol_type = other DNA
                        organism = synthetic construct
SEQUENCE: 78
ggagtacgga taaaatgctt gatggtcgga agaggcataa attccgtcag ccagtttagt  60
ctgaccatct catctgtaac atcattggca acgctacctt tgccatgttt cagaaacaac 120
tctggcgcat cgggcttccc atacaatcga tagattgtcg cacctgattg cccgacatta 180
tcgcgagccc atttataccc atataaatca gcatccatgt tggaatttaa tcgcggccta 240
gagcaagaac gcgtttcccg ttgaaatatgg ctcatactct tccttttca atattattga 300
agcatttatc agggttattg tctcatgagc ggatacatat ttgaatgtat ttagaaaaat 360
aaacaaatag gggttccgcg cacatttccc cgaaaagtgc cacctgacgt ctaagaaacc 420
attattatca tgacattaac ctataaaaat aggc                             454

SEQ ID NO: 79           moltype = DNA  length = 861
FEATURE                 Location/Qualifiers
misc_feature            1..861
                        note = Ampicillin resistance marker
source                  1..861
                        mol_type = other DNA
                        organism = synthetic construct
SEQUENCE: 79
atgagcatcc agcatttccg tgtcgccctt attcccttt ttgcggcatt ttgccttcct   60
gtttttgctc acccagaaac gctggtgaaa gtaaaagatg ctgaagatca gttgggagca 120
cgcgtgggtt acatcgaact ggatctcaac agcggtaaga tccttgagag ttttcgcccc 180
gaagaacgtt ttccaatgat gagcactttt aaagttctgc tatgtggcgc ggtattatcc 240
cgtattgacg ccgggcaaga gcaactcggt cgccgcatac actattctca gaatgacttg 300
gttgagtact caccagtcac agaaaagcat cttacggatg gcatgacagt aagagaatta 360
tgcagtgctg ccataaccat gagtgataac actgcggcca acttacttct gacaacgatc 420
ggaggaccga aggagctaac cgcttttttg cacaacatgg gggatcatgt aacgcgtctt 480
gatcgttggg aaccggagct gaatgaagcc ataccaaacg acgagcgtga ccacacgatg 540
cctgtagcaa tggcaacaac gttgcgcaaa ctattaactg gcgaactact tactctagct 600
tcccggcaac aattaataga ctggatggag gcggataaag ttgcaggacc acttctgcgc 660
tcggcccttc cggctggctg gtttattgct gataaatctg gagccggtga gcgtgggtct 720
cgcggtatca ttgcagcact ggggccagat ggtaagccct cccgtatcgt agttatctac 780
acgacgggga gtcaggcaac tatggatgaa cgaaatagac agatcgctga gataggtgcc 840
tcactgatta agcattggta a                                           861

SEQ ID NO: 80           moltype = DNA  length = 1895
FEATURE                 Location/Qualifiers
misc_feature            1..1895
                        note = Backbone vector
source                  1..1895
                        mol_type = other DNA
                        organism = synthetic construct
SEQUENCE: 80
gacgcgtctt aagaccatgt gagcaaaagg ccagcaaaag gccaggaacc gtaaaaaggc   60
cgcgttgctg gcgtttttcc ataggctccg ccccctgac gacgcatcac aaaaatcgac  120
gcgtcaagtc agaggtggcg aaacccgaca ggactataaa gataccaggc gtttccccct 180
ggaagctccc tcgtgcgctc tcctgttccg accctgccgc ttaccggata cctgtccgcc 240
tttctccctt cgggaagcgt ggcgctttct catagctcac gctgtaggta tctcagttcg 300
gtgtaggtc ttcgctccaa gctgggctgt gtgcacgaac ccccgttca gcccgaccgc 360
tgcgccttat ccggtaacta tcgtcttgag tccaacccgg taagacacga cttatcgcca 420
ctggcagcag ccactggtaa caggattagc agagcgaggt ataggcgg tgctacagag 480
ttcttgaagt ggtggcctaa ctacggctac actagaagaa cagtatttgg tatctgcgct 540
ctgctgaagc cagttacctt cggaaaaaga gttggtagct cttgatccgg caaacaaacc 600
accgctggta gcggtggttt ttttgtttgc aagcagcaga ttacgcgcag aaaaaaagga 660
tctcaagaag atcctttgat cttttctacg gggtctgacg ctcagtgga acgaaaactc 720
acgttaaggg attttggtca tgagattatc aaaaaggatc ttcacctaga tccttttaaa 780
ttaaaaatga agttttaaat caatctaaag tatatatgag taaacttggt ctgacagtta 840
ccaatgctta atcagtgagg cacctatctc agcgatctgt ctatttcgtt catccatagt 900
tgcctgactc cccgtcgtgt agataactac gatacgggag ggcttaccat ctggccccag 960
tgctgcaatg ataccgcgag acccacgctc accggctcca gatttatcag caataaacca 1020
gccagccgga agggccgagc gtatacgtgg tcctgcaact ttatccgcct ccatccagtc 1080
tattaattgt tgccgggaag ctagagtaag tagttcgcca gttaatagtt tgcgcaacgt 1140
tgttgccatt gctacaggca tcgtggtgtc acgctcgttt ggtatgg cttcattcag 1200
ctccggttcc caacgatcaa gacgcgttac atgatccccc atgttgtgca aaaaagcggt 1260
tagctccttc ggtcctccga tcgttgtcag aagtaagttg gccgcagtgt tatcactcat 1320
ggttatggca gcactgcata attctcttac tgtcatgcca tccgtaagat gcttttctgt 1380
gactggtgag tactcaacca agtcattctg agaatagtgt atgcggcgac cgagttgctc 1440
ttgcccggcg tcaatacggg ataataccgc gccacatagc agaactttaa aagtgctcat 1500
cattggaaaa cgttcttcgg ggcgaaaact ctcaaggatc ttaccgctgt tgagatccag 1560
ttcgatgtaa cccacgcgtg ctcccaactg atcttcagca tcttttactt tcaccagcgt 1620
ttctgggtga gcaaaaacag gaaggcaaaa tgccgcaaaa aagggaataa gggcgacacg 1680
gaaatgctgg atgctcatac tcttccttt tcaatattat tgaagcattt atcagggtta 1740
ttgtctcatg agcggataca tatttgaatg tatttagaaa aataaacaaa taggggttcc 1800
gcgcacattt ccccgaaaag tgccacctga cgtctaagaa accattatta tcatgacatt 1860
```

```
aacctataaa aataggcgta tcaacgcgtc ctgca                              1895

SEQ ID NO: 81          moltype = AA   length = 286
FEATURE                Location/Qualifiers
REGION                 1..286
                       note = Ampicillin resistance marker
source                 1..286
                       mol_type = protein
                       organism = synthetic construct
SEQUENCE: 81
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGTRGS   240
RGIIAALGPD GKPSRIVVIY TTGSQATMDE RNRQIAEIGA SLIKHW                  286

SEQ ID NO: 82          moltype = AA   length = 286
FEATURE                Location/Qualifiers
REGION                 1..286
                       note = Ampicillin resistance marker
source                 1..286
                       mol_type = protein
                       organism = synthetic construct
SEQUENCE: 82
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGT   240
RGIIAALGPD GKPSRIVVIY TTGSQATMDE RNRQIAEIGA SLIKHW                  286

SEQ ID NO: 83          moltype = AA   length = 286
FEATURE                Location/Qualifiers
REGION                 1..286
                       note = Ampicillin resistance marker
source                 1..286
                       mol_type = protein
                       organism = synthetic construct
SEQUENCE: 83
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGS   240
RGIIAALGPD GKPTRIVVIY TTGSQATMDE RNRQIAEIGA SLIKHW                  286

SEQ ID NO: 84          moltype = AA   length = 286
FEATURE                Location/Qualifiers
REGION                 1..286
                       note = Ampicillin resistance marker
source                 1..286
                       mol_type = protein
                       organism = synthetic construct
SEQUENCE: 84
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGS   240
RGIIAALGPD GKPSRIVVIY TTRSQATMDE RNRQIAEIGA SLIKHW                  286

SEQ ID NO: 85          moltype = AA   length = 286
FEATURE                Location/Qualifiers
REGION                 1..286
                       note = Ampicillin resistance marker
source                 1..286
                       mol_type = protein
                       organism = synthetic construct
SEQUENCE: 85
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGS   240
RGIIAALGPD GKPSRIVVIY TTGSQATMDT RNRQIAEIGA SLIKHW                  286

SEQ ID NO: 86          moltype = AA   length = 286
FEATURE                Location/Qualifiers
REGION                 1..286
                       note = Ampicillin resistance marker
source                 1..286
                       mol_type = protein
                       organism = synthetic construct
```

```
SEQUENCE: 86
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGS   240
RGIIAALGPD GKPSRIVVIY TTGSQATMDE RTRQIAEIGA SLIKHW                 286

SEQ ID NO: 87           moltype = AA  length = 286
FEATURE                 Location/Qualifiers
REGION                  1..286
                        note = Ampicillin resistance marker
source                  1..286
                        mol_type = protein
                        organism = synthetic construct
SEQUENCE: 87
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPRIR SALPAGWFIA DKSGAGERGS   240
RGIIAALGPD GKPSRIVVIY TTGSQATMDE RNRQIAEIGA SLIKHW                 286

SEQ ID NO: 88           moltype = AA  length = 286
FEATURE                 Location/Qualifiers
REGION                  1..286
                        note = Ampicillin resistance marker
source                  1..286
                        mol_type = protein
                        organism = synthetic construct
SEQUENCE: 88
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGS   240
RGIIAALGPD GKPSRIVVIY TTGSQATMDE RERVIAEIGA SLIKHW                 286

SEQ ID NO: 89           moltype = AA  length = 286
FEATURE                 Location/Qualifiers
REGION                  1..286
                        note = Ampicillin resistance marker
source                  1..286
                        mol_type = protein
                        organism = synthetic construct
SEQUENCE: 89
MSIQHFRVAL IPFFAAFCLP VFAHPETLVK VKDAEDQLGA RVGYIELDLN SGKILESFRP    60
EERFPMMSTF KVLLCGAVLS RIDAGQEQLG RRIHYSQNDL VEYSPVTEKH LTDGMTVREL   120
CSAAITMSDN TAANLLLTTI GGPKELTAFL HNMGDHVTRL DRWEPELNEA IPNDERDTTM   180
PVAMATTLRK LLTGELLTLA SRQQLIDWME ADKVAGPLLR SALPAGWFIA DKSGAGERGS   240
RGIIAALGPD GKPSRIVVIY TTGSDASMDE RNRQIAEIGA SLIKHW                 286

SEQ ID NO: 90           moltype = DNA  length = 441
FEATURE                 Location/Qualifiers
misc_feature            1..441
                        note = Gene block 1d
source                  1..441
                        mol_type = other DNA
                        organism = synthetic construct
SEQUENCE: 90
gcgttgctgg cgttttttcca taggcttcgc gcccctgacg agcatcacaa aaatcgacgc    60
tcaagtcaga ggacgcgtaa cccgacagga ctataaagat accaggcgtt tccccctgga   120
agctccctcg tgcgctctcc tgttccgacc ctgccgctta ccggatacct gtccgccttt   180
ctcccttcgg gaagcgtggc gctttctcat agctcacgct gtaggtatct cagttcggtg   240
taggtcgttc gctccaagct gggctgtgtg cacgaacccc cgttcagccc gaccgctgc    300
gccttatccg gtaactatcg tcttgagtcc aacccggtaa gacacgactt atcgccactg   360
gcagcagcca ctggtaacag gattagcaga gcgaggtatg taggcggtgc tacagagttc   420
ttgaagtggt ggcctaacta c                                            441

SEQ ID NO: 91           moltype = DNA  length = 443
FEATURE                 Location/Qualifiers
misc_feature            1..443
                        note = Gene block 1e
source                  1..443
                        mol_type = other DNA
                        organism = synthetic construct
SEQUENCE: 91
gcgttgctgg cgttttttcca taggctccgc cccctgacg acgcatcaca aaaatcgacg    60
cgtcaagtca gaggtggcga acccgacaga gactataaag ataccaggcg tttccccctg   120
gaagctccct cgtgcgctct cctgttccga ccctgccgct taccggatac ctgtccgcct   180
ttctcccttc gggaagcgtg gcgctttctc atagctcacg ctgtaggtat ctcagttcgg   240
tgtaggtcgt tcgctccaag ctgggctgtg tgcacgaacc cccgttcagc ccgaccgct   300
```

```
gcgccttatc cggtaactat cgtcttgagt ccaacccggt aagacacgac ttatcgccac    360
tggcagcagc cactggtaac aggattagca gagcgaggta tgtaggcggt gctacagagt    420
tcttgaagtg gtggcctaac tac                                             443

SEQ ID NO: 92           moltype = DNA   length = 443
FEATURE                 Location/Qualifiers
misc_feature            1..443
                        note = Gene block 1b
source                  1..443
                        mol_type = other DNA
                        organism = synthetic construct
SEQUENCE: 92
gcgttgctgg cgttttttcca taggctccgc cccctgacg agcatcacaa aaatcgacgc     60
tcaagtcaga ggtggcgaaa cccgacagga ctataaagat accaggcgtt tcccctgga    120
agctccctcg tgcgctctcc tgttccgacc ctgccgctta ccggatacct gtccgccttt   180
ctcccttcgg gaagcgtggc gctttctcat agctcacgct gtaggtatct cagttcggtg   240
taggtcgttc gctccaagct acgcgtgtgt gcacgaaccc cccgttcacg cgtgaccgct   300
gcgccttatc cggtaactat cgtcttgagt ccaacccggt aagacacgac ttatcgccac   360
tggcagcagc cactggtaac aggattagca gagcgaggta tgtaggcggt gctacagagt   420
tcttgaagtg gtggcctaac tac                                             443

SEQ ID NO: 93           moltype = DNA   length = 441
FEATURE                 Location/Qualifiers
misc_feature            1..441
                        note = Gene block 1c
source                  1..441
                        mol_type = other DNA
                        organism = synthetic construct
SEQUENCE: 93
gcgttgctgg cgttttttcca taggctccgc cccctgacg agcatcacaa aaatcgacgc     60
tcaagtcaga ggtggcgaaa cccgacagga ctataaagat accaggcgtt tcccctgga    120
agctccctcg tgcgctctcc tgttccgacc cgacgcgtta ccggatacct gtccgccttt   180
ctcccttcgg gaagcgtggc gctttctcat agctcacgct gtaggtatct cagttgcgag   240
taggtcgttc gctccaagct gggctgtgtg cacgaacccc ccgttcagcc cgaccgctgc   300
gccttatccg gtaactatcg tcttgagtcc aacccggtaa gacacgactt atcgccactg   360
gcagcagcca ctggtaacag gattagcaga gcgaggtatg taggcggtgc tacagagttc   420
ttgaagtggt ggcctaacta c                                               441

SEQ ID NO: 94           moltype = DNA   length = 444
FEATURE                 Location/Qualifiers
misc_feature            1..444
                        note = Gene block 1f
source                  1..444
                        mol_type = other DNA
                        organism = synthetic construct
SEQUENCE: 94
gcgttgctgg cgttttttcca taggctccgc cccctgacg agcatcacaa aaatcgacgc     60
gtcaagtcag aggtggcgaa acccgacagg actataaaga taccaggcgt ttccccctgg   120
aagctccctc gtgcgctctc ctgttccgac cctgccgctt accggatacc tgtccgcctt   180
tctcccttcg ggaagcgtgg cgcttttctca gctcacgc tgtaggtatc tcagttcggt   240
gtaggtcgtt cgctccaagc tacgcgtgtg tgcacgaacc ccccgttcac gcgtgaccgc   300
tgcgccttat ccggtaacta tcgtcttgag tccaacccgg taagacacga cttatcgcca   360
ctggcagcag ccactggtaa caggattagc agagcgaggt atgtaggcgg tgctacagag   420
ttcttgaagt ggtggcctaa ctac                                            444

SEQ ID NO: 95           moltype = DNA   length = 442
FEATURE                 Location/Qualifiers
misc_feature            1..442
                        note = Gene block 1g
source                  1..442
                        mol_type = other DNA
                        organism = synthetic construct
SEQUENCE: 95
gcgttgctgg cgttttttcca taggctccgc cccctgacg agcatcacaa aaatcgacgc     60
gtcaagtcag aggtggcgaa acccgacagg actataaaga taccaggcgt ttccccctgg   120
aagctccctc gtgcgctctc ctgttccgac ccgacgcgtt accggatacc tgtccgcctt   180
tctcccttcg ggaagcgtgg cgcttttctca gctcacgc tgtaggtatc tcagttcgga   240
gtaggtcgtt cgctccaagc tgggctgtgt gcacgaaccc cccgttcagc cgaccgctg    300
cgccttatcc ggtaactatc gtcttgagtc aacccggta agacacgact tatcgccact   360
ggcagcagcc actggtaaca ggattagcag agcgaggtat gtaggcggtg ctacagagtt   420
cttgaagtgg tggcctaact ac                                              442

SEQ ID NO: 96           moltype = DNA   length = 467
FEATURE                 Location/Qualifiers
misc_feature            1..467
                        note = Gene block 2b
source                  1..467
                        mol_type = other DNA
                        organism = synthetic construct
```

```
SEQUENCE: 96
agttcttgaa gtggtggcct aactacggct acactagaag aacagtattt ggtatctgcg   60
ctctgctgaa gccagttacc ttcggaaaaa gagttggtag ctcttgatcc ggcaaacaaa  120
ccaccgctgg tagcggtggt ttttttgttt gcaagcagca gattacgcgc agaaaaaaag  180
gatctcaaga agatcctttg atcttttcta cggggtctga cgcgtcagtg gaacgaaaac  240
tcacgttaag ggattttggt catgagatta tcaaaaagga tcttcaccta gatcctttta  300
aattaaaaat gaagttttaa atcaatctaa agtatatatg agtaaacttg gtctgacagt  360
tagaaaaact catcgagcat caaatgaaac tgcaatttat tcatatcagg attatcaata  420
ccatatttt  gaaaaagccg tttctgtaat gaaggagaaa actcacc              467

SEQ ID NO: 97           moltype = DNA   length = 443
FEATURE                 Location/Qualifiers
misc_feature            1..443
                        note = Gene block 1n
source                  1..443
                        mol_type = other DNA
                        organism = synthetic construct
SEQUENCE: 97
gcgttgctgg cgttttttcca taggctccgc ccccctgacg acgcatcaca aaaatcgacg   60
cgtcaagtca gaggtggcga acccgacag gactataaag ataccaggcg tttcccctg   120
gaagctcct  cgtgcgctct cctgttccga ccctgccgct taccggatac ctgtccgcct  180
ttctcccttc gggaagcgtg gcgctttctc atagctcacg ctgtaggtat ccagttcgg   240
tgtaggtcgt tcgctccaag ctgggctgtg tgcacgaacc cccgttcag cccgaccgct   300
gcgccttatc cggtaactat cgtcttgagt ccaacccggt aagacacgac ttatcgccac  360
tggcagcagc cactggtaac aggattagca gagcgaggta tgtaggcggt gctacagagt  420
tcttgaagtg gtggcctaac tac                                         443

SEQ ID NO: 98           moltype = DNA   length = 443
FEATURE                 Location/Qualifiers
misc_feature            1..443
                        note = Gene block 1o
source                  1..443
                        mol_type = other DNA
                        organism = synthetic construct
SEQUENCE: 98
gcgttgctgg cgttttttcca taggctccgc ccccctgacg acgcatcaca aaaatcgacg   60
cgtcaagtca gaggtggcga acccgacag gactataaag ataccaggcg tttcccctg   120
gaagctcct  cgtgcgctct cctgttccga ccctgccgct taccggatac ctgtccgcct  180
ttctcccttc gggaagcgtg gcgctttctc atagctcacg ctgtaggtat ctcagttcgg  240
tgtaggtcgt tcgctccaag ctgggctgtg tatacgaacc cccgttcag cccgaccgct   300
gcgccttatc cggtaactat cgtcttgagt ccaacccggt aagacacgac ttatcgccac  360
tggcagcagc cactggtaac aggattagca gagcgaggta tgtaggcggt gctacagagt  420
tcttgaagtg gtggcctaac tac                                         443

SEQ ID NO: 99           moltype = DNA   length = 443
FEATURE                 Location/Qualifiers
misc_feature            1..443
                        note = Gene block 1p
source                  1..443
                        mol_type = other DNA
                        organism = synthetic construct
SEQUENCE: 99
gcgttgctgg cgttttttcca taggctccgc ccccctgacg acgcatcaca aaaatcgacg   60
cgtcaagtca gaggtggcga acccgacag gactataaag ataccaggcg tttcccctg   120
gaagctcct  cgtgcgctct cctgttccga ccctgccgct taccggatac ctgtccgcct  180
ttctcccttc gggaagcgtg gcgctttctc atagctcacg ctgtaggtat ctcagttcgg  240
tgtaggtcgt tcgctccaag ctgggctgtg tgcacgaacc cccgttcag cccgaccgct   300
gcgccttatc cggtaactat cgtcttgagt ccaacccggt aagacacgac ttatcgccac  360
tggcagcagc cactggtaac aggattagca gagcgaggta tacaggcggt gctacagagt  420
tcttgaagtg gtggcctaac tac                                         443

SEQ ID NO: 100          moltype = DNA   length = 1557
FEATURE                 Location/Qualifiers
misc_feature            1..1557
                        note = seAP coding sequence
source                  1..1557
                        mol_type = other DNA
                        organism = synthetic construct
SEQUENCE: 100
atgttgctgc tcctgcttct tcttgggctt aggcttcaac ttagtcttgg gataattccg   60
gttgaagaag agaaccctga ttttttggaat agagaggccg ccgaagcctt gggtgccgct  120
aagaagctga aacctgcaca aactgctgcg aaaaacctta tcatcttcct tggtgatgga  180
atgggagtgt ctacagtgac cgctgcgcgc atcctcaagg acagaagaa ggacaaattg  240
gggccagaa tccccctggc aatgacaga tttcttatg tggccctgag caagacttac   300
aatgtcgaca agcacgtccc cgattcaggg gctacagcta cagcatatct gtgcggtgta  360
aagggcaatt tccagaccat cggcctcagc gccgctgcaa gattcaatca atgcaacacc  420
actcgaggga acgaagtgat ctcagtgatg aacagagcca aaaaggccgg aaagtctgtt  480
ggtgtcgtga cgactacccg cgtgcagcat gctagcctg ctggtacata cgctcataca  540
gtcaaccgga actggtacag cgacgccgac gttcccgcgt cagcacgcca agagggttgc  600
```

```
caggatattg caactcaact tatcagcaac atggatattg atgtgatttt gggaggagga    660
cgcaagtata tgtttaggat gggcacccca gatccagaat atccagacga ttactcacaa    720
gggggcactc ggctggacgg caagaacctg gttcaggaat ggcttgccaa acgacaggga    780
gcgaggtatg tctggaatag gactgagctt atgcaagcat ccctcgaccc ctccgtaacc    840
catctgattg gactctttga gcctggggat atgaagtagt aaattcaccg cgactccaca    900
ttggacccat cactgatgga gatgacagag gccgcacttc gcctcctgtc acggaaccct    960
cgaggcttct ttctgttcgt tgaaggaggg aggatagacc acggacacca cgaaagtagg   1020
gcctatagag cactcacgga aaccattatg ttcgacgacg ctatcgaaag ggctggtcag   1080
cttacctctg aggaggacac cctctccctg gtgacagccg accattccca cgtgttcagc   1140
ttcggcggct acccacttag ggggtcctct attttttggac tggcgccagg caaagcccgg   1200
gataggaagg cttacaccgt gttgctctac gggaacggtc ccggctacgt cctgaaggac   1260
ggtgcgaggc ccgacgtcac agagagcgag tctggaagcc ctgagtatag caacaatca    1320
gcagtacccc tcgacgagga gactcacgca ggcgaggatg tcgctgtgtt cgccagaggg   1380
ccacaggccc acctggtcca cggagtgcaa gagcaaactt tcatcgctca cgtcatggca   1440
ttcgccgctt gccttgagcc ctacacggca tgtgacctgg cccctccggc agggacaact   1500
gacgctgctc acccaggtta cagtcgcgtg ggcgctgctg gcaggttcga gcagacc      1557

SEQ ID NO: 101          moltype = DNA  length = 1968
FEATURE                 Location/Qualifiers
misc_feature            1..1968
                        note = GS selection marker
source                  1..1968
                        mol_type = other DNA
                        organism = synthetic construct
SEQUENCE: 101
ctgtggaatg tgtgtcagtt agggtgtgga aagtccccag gctccccagc aggcagaagt     60
atgcaaagca tgcatctcaa ttagtcagca accaggtgtg gaaagtcccc aggctcccca    120
gcaggcagaa gtatgcaaag catgcatctc aattagtcag caaccatagt cccgccccta    180
actccgccca tcccgcccct aactccgccc agttccgccc attctccgcc ccatggctga    240
ctaatttttt ttatttatgc agaggccgag gccgcctctg cctctgagct attccagaag    300
tagtgaggag gcttttttgg aggcctaggc ttttgcaaaa agctcccggg agcttgtata    360
tccattttcg gatctgatca gcacgtgttg acaattaatc atcggcatag tatatcggca    420
tagtataata cgacaaggtg aggcaacagg tgagtaagcg cagttgtcgt ctcttgcggt    480
gccgttgctg gttctcacac cttttaggtc tgttctcgtc ttccgttctg actctctctt    540
tttcgttgca ggccatggcc acctcagcaa gttcccactt gaacaaaaac atcaagcaaa    600
tgtacttgtg cctgccccag ggtgagaaag tccaagccat gtatatcggg ttgatggta    660
ctggagaagg actgcgctgc aaaacccgca ccctggactg tgagcccaag tgtgtagaag    720
agttacctga gtggaatttt gatggctcta gtaccttca gtctgagggc tccaacagtg    780
atatgtatct cagccctgtt gccatgtttc gggaccctt ccgcagagat cccaacaagc    840
tggtgttctg tgaagttttc aagtacaacc ggaagcctgc agagaccaat ttaaggcact    900
cgtgtaaacg gataatggac atggtgagca accagcaccc ctggttgga atggaacagg    960
agtacactct gatgggaaca gatgggcacc ttttggttg gccttccaat ggctttcctg   1020
ggccccaagg tccgtattac tgtggtgtgg gcgcagacaa agcctatggc agggatatcg   1080
tggaggctca ctaccgcgcc tgcttgtatg ctggggtcaa gattacagga acaaatgcag   1140
aggtcatgcc tgcccagtgg gagttccaaa taggaccctg tgaaggaatc cgcatggag   1200
atcatctctg ggtggcccgt tcatcttgc atcgagtatg tgaagacttt ggggtaatag   1260
caacctttga ccccaagccc attcctggga actggaatgg tgcaggctgc cataccaact   1320
ttagcaccaa ggccatgcgg gaggagaatg gtctgaagca catcgaggag gccatcgaga   1380
aactaagcaa gcggcaccgg taccacattc gagcctacga tcccaagggg ggcctggaca   1440
atgcccgtcg tctgactggg ttccacgaaa cgtccaacat caacgacttt tctgctggtg   1500
tcgccaatcg cagtgccagc atccgcattc cccggactgt cggccaggag aagaaaggtt   1560
actttgaaga ccgccgcccc tctgccaatt gtgaccccct tgcagtgaca gaagccatcg   1620
tccgcacatg ccttctcaat gagactggcg acgagccctt ccaatacaaa aactaagcta   1680
agcacttcgt ggccgaggag caggactgac acgtgctacg agatttcgat tccaccgccg   1740
ccttctatga aaggttgggc ttcggaatcg ttttccggga cgccggctgg atgatcctc   1800
agcgcgggga tctcatgctg gagttcttcg cccaccccaa cttgtttatt gcagcttata   1860
atggttacaa ataaagcaat agcatcacaa atttcacaaa taaagcattt ttttcactgc   1920
attctagttg tggtttgtcc aaactcatca atgtatctta tcatgtct                1968

SEQ ID NO: 102          moltype = AA  length = 10
FEATURE                 Location/Qualifiers
REGION                  1..10
                        note = N-terminal amino acids kanamycin resistance marker
source                  1..10
                        mol_type = protein
                        organism = synthetic construct
SEQUENCE: 102
MSHIQRETSC                                                            10

SEQ ID NO: 103          moltype = AA  length = 11
FEATURE                 Location/Qualifiers
REGION                  1..11
                        note = N-terminal amino acidskanamycin resistance marker
                         variant
source                  1..11
                        mol_type = protein
                        organism = synthetic construct
SEQUENCE: 103
MSHIQTRETS C                                                          11
```

```
SEQ ID NO: 104          moltype = AA   length = 11
FEATURE                 Location/Qualifiers
REGION                  1..11
                        note = N-terminal amino acidskanamycin resistance marker
                         variant
source                  1..11
                        mol_type = protein
                        organism = synthetic construct
SEQUENCE: 104
MSHIQRETRS C                                                                11

SEQ ID NO: 105          moltype = DNA   length = 816
FEATURE                 Location/Qualifiers
misc_feature            1..816
                        note = Kanamycin resistance marker wt CDS
source                  1..816
                        mol_type = other DNA
                        organism = synthetic construct
SEQUENCE: 105
atgagccata ttcaacggga aacgtcttgc tctaggccgc gattaaattc caacatggat    60
gctgatttat atgggtataa atgggctcgc gataatgtcg gcaatcaggt gcgacaatc   120
tatcgattgt atgggaagcc cgatgcgcca gagttgtttc tgaaacatgg caaaggtagc   180
gttgccaatg atgttacaga tgagatggtc agactaaaact ggctgacgga atttatgcct   240
cttccgacca tcaagcattt tatccgtact cctgatgatg catggttact caccactgcg   300
atccctggga aaacagcatt ccaggtatta gaagaatatc ctgattcagg tgaaaatatt   360
gttgatgcgc tggcagtgtt cctgcgccgg ttgcattcga ttcctgtttg taattgtcct   420
tttaacagcg atcgcgtatt tcgtctcgct caggcgcaat cacgaatgaa taacggtttg   480
gttgatgcga gtgattttga tgacgagcgt aatggctggc ctgttgaaca agtctggaaa   540
gaaatgcata acttttgcc attctcaccg gattcagtcg tcactcatgg tgatttctca   600
cttgataacc ttattttttga cgaggggaaa ttaataggtt gtattgatgt tggacgagtc   660
ggaatcgcag accgatacca ggatcttgcc atcctatgga actgcctcgg tgagttttct   720
ccttcattac agaaacggct ttttcaaaaa tatggtattg ataatcctga tatgaataaa   780
ttgcagtttc atttgatgct cgatgagttt ttctaa                             816

SEQ ID NO: 106          moltype = DNA   length = 858
FEATURE                 Location/Qualifiers
misc_feature            1..858
                        note = Ampicillin resistance marker wt CDS
source                  1..858
                        mol_type = other DNA
                        organism = synthetic construct
SEQUENCE: 106
atgagtattc aacatttccg tgtcgccctt attcccttt ttgcggcatt ttgccttcct    60
gttttgctc acccagaaac gctggtgaaa gtaaaagatg ctgaagatca gttgggagca   120
cgagtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg gcatgacagt aagagaatta   360
tgcagtgctg ccataaccat gagtgataac actgcggcca acttacttct gacaacgatc   420
ggaggaccga aggagctaac cgcttttttg cacaacatgg ggatcatgt aactcgcct   480
gatcgttggg aaccggagct gaatgaagcc ataccaaacg acgagcgtga ccacacgatg   540
cctgtagcaa tggcaacaac gttgcgcaaa ctattaactg gcgaactact tactctagct   600
tcccggcaac aattaataga ctggatggag gcggataaag ttgcaggacc acttctgcgc   660
tcggcccttc cggctggctg gtttattgct gataaatctg gagccggtga gcgtgggtct   720
cgcggtatca ttgcagcact ggggccagat ggtaagccct cccgtatcgt agttatctac   780
acgacgggga gtcaggcaac tatggatgaa cgaaatagac agatcgctga gataggtgcc   840
tcactgatta agcattgg                                                 858

SEQ ID NO: 107          moltype = DNA   length = 375
FEATURE                 Location/Qualifiers
misc_feature            1..375
                        note = Zeocin resistance marker wt CDS
source                  1..375
                        mol_type = other DNA
                        organism = synthetic construct
SEQUENCE: 107
atggccaagt tgaccagtgc cgttccggtg ctcaccgcgc gcgacgtcgc cggagcggtc    60
gagttctgga ccgaccggct cgggttctcc cgggacttcg tggaggacga cttcgccggt   120
gtggtccggg acgacgtgac cctgttcatc agcgcggtcc aggaccaggt ggtgccggac   180
aacacccctgg cctgggtgtg ggtgcgcggc ctggacgagc tgtacgccga gtggtcgag   240
gtcgtgtcca cgaacttccg ggacgcctcc gggccggcca tgaccgagat cggcgagcag   300
ccgtggggg gggagttcgc cctgcgcgac ccggccggca actgcgtgca cttcgtgcc   360
gaggagcagg actga                                                    375

SEQ ID NO: 108          moltype = DNA   length = 660
FEATURE                 Location/Qualifiers
misc_feature            1..660
                        note = Chloramphenicol resistance marker wt CDS
```

```
source                      1..660
                            mol_type = other DNA
                            organism = synthetic construct
SEQUENCE: 108
atggagaaaa aaatcactgg atataccacc gttgatatat cccaatggca tcgtaaagaa    60
cattttgagg catttcagtc agttgctcaa tgtacctata accagaccgt tcagctggat   120
attacggcct ttttaaagac cgtaaagaaa aataagcaca agttttatcc ggcctttatt   180
cacattcttg cccgcctgat gaatgctcat ccggaatttc gtatggcaat gaaagacggt   240
gagctggtga tatgggatag tgttcaccct tgttacaccg ttttccatga gcaaactgaa   300
acgttttcat cgctctggag tgaataccac gacgatttcc ggcagtttct acacatatat   360
tcgcaagatg tggcgtgtta cggtgaaaac ctggcctatt tccctaaagg gtttattgag   420
aatatgtttt tcgtctcagc caatccctgg gtgagtttca ccagttttga tttaaacgtg   480
gccaatatgg acaacttctt cgcccccgtt ttcaccatgg gcaaatatta tacgcaaggc   540
gacaaggtgc tgatgccgct ggcgattcag gttcatcatg ccgtttgtga tggcttccat   600
gtcggcagaa tgcttaatga attacaacag tactgcgatg agtggcaggg cggggcgtaa   660

SEQ ID NO: 109              moltype = DNA  length = 351
FEATURE                     Location/Qualifiers
misc_feature                1..351
                            note = LacZalpha marker
source                      1..351
                            mol_type = other DNA
                            organism = synthetic construct
SEQUENCE: 109
atgaccatga ttacgccaag cttgcatgcc tgcaggttta acagtcgac tctagactta    60
attaaggatc cggcgcgccc ccgggtaccg agctcgaatt cactggccgt cgttttacaa   120
cgtcgtgact gggaaaaccc tggcgttacc caacttaatc gccttgcagc acatccccct   180
ttcgccagct ggcgtaatag cgaagaggcc cgcaccgatc gcccttccca cagttgcgc   240
agcctgaatg gcgaatggcg cctgatgcgg tattttctcc ttacgcatct gtgcggtatt   300
tcacaccgca tatggtgcac tctcagtaca atctgctctg atgccgcata g            351

SEQ ID NO: 110              moltype = DNA  length = 861
FEATURE                     Location/Qualifiers
misc_feature                1..861
                            note = Ampicillin resistance marker
source                      1..861
                            mol_type = other DNA
                            organism = synthetic construct
SEQUENCE: 110
atgagcatcc agcatttccg tgtcgccctt attccctttt ttgcggcatt ttgccttcct    60
gttttttgctc acccagaaac gctggtgaaa gtaaaagatg ctgaagatca gttgggagca   120
cgcgtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg gcatgacagt aagagaatta   360
tgcagtgctg ccataaccat gagtgataac actgcggcca acttacttct gacaacgatc   420
ggaggaccga aggagctaac cgcttttttg cacaacatgg ggatcatgt aacgcgtctt    480
gatcgttggg aaccggagct gaatgaagcc ataccaaacg acgagcgtga ccacacgatg   540
cctgtagcaa tggcaacaac gttgcgcaaa ctattaactg gcgaactact tactctagct   600
tcccggcaac aattaataga ctggatggag gcggataaag ttgcaggacc acttctgcgc   660
tcggcccttc cggctggctg gtttattgct gataaatctg gagccggtga gcgtgggacg   720
cgcggtatca ttgcagcact ggggccagat ggtaagccct cccgtatcgt agttatctac   780
acgacgggga gtcaggcaac tatgatgaa cgaaatagac agatcgctga gataggtgcc   840
tcactgatta agcattggta a                                              861

SEQ ID NO: 111              moltype = DNA  length = 861
FEATURE                     Location/Qualifiers
misc_feature                1..861
                            note = Ampicillin resistance marker
source                      1..861
                            mol_type = other DNA
                            organism = synthetic construct
SEQUENCE: 111
atgagcatcc agcatttccg tgtcgccctt attccctttt ttgcggcatt ttgccttcct    60
gttttttgctc acccagaaac gctggtgaaa gtaaaagatg ctgaagatca gttgggagca   120
cgcgtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg gcatgacagt aagagaatta   360
tgcagtgctg ccataaccat gagtgataac actgcggcca acttacttct gacaacgatc   420
ggaggaccga aggagctaac cgcttttttg cacaacatgg ggatcatgt aacgcgtctt    480
gatcgttggg aaccggagct gaatgaagcc ataccaaacg acgagcgtga ccacacgatg   540
cctgtagcaa tggcaacaac gttgcgcaaa ctattaactg gcgaactact tactctagct   600
tcccggcaac aattaataga ctggatggag gcggataaag ttgcaggacc acttctgcgc   660
tcggcccttc cggctggctg gtttattgct gataaatctg gagccggtga gcgtgggacg   720
cgcggtatca ttgcagcact ggggccagat ggtaagccct cccgtatcgt agttatctac   780
acgacgggga gtcaggcaac tatgatgaa cgaaatagac agatcgctga gataggtgcc   840
tcactgatta agcattggta a                                              861
```

SEQ ID NO: 112          moltype = DNA   length = 861
FEATURE                 Location/Qualifiers
misc_feature            1..861
                        note = Ampicillin resistance marker
source                  1..861
                        mol_type = other DNA
                        organism = synthetic construct
SEQUENCE: 112
atgagcatcc agcatttccg tgtcgccctt attcccttttt ttgcggcatt ttgccttcct    60
gttttttgctc acccagaaac gctggtgaaa gtaaaagatg ctgaagatca gttgggagca   120
cgcgtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg gcatgacagt aagagaatta   360
tgcagtgctg ccataaccat gagtgataac actgcggcca acttacttct gacaacgatc   420
ggaggaccga aggagctaac cgcttttttg cacaacatgg gggatcatgt aacgcgtctt   480
gatcgttggg aaccggagct gaatgaagcc ataccaaacg acgagcgtga caccacgatg   540
cctgtagcaa tggcaacaac gttgcgcaaa ctattaactg gcgaactact tactctagct   600
tcccggcaac aattaataga ctggatgag gcggataaag ttgcaggacc acttctgcgc   660
tcggcccttc cggctggctg gtttattgct gataaatctg gagccggtga gcgtgggtct   720
cgcggtatca ttgcagcact ggggccagat ggtaagccca cgcgtatcgt agttatctac   780
acgacgggga gtcaggcaac tatggatgaa cgaaatagac agatcgctga gataggtgcc   840
tcactgatta agcattggta a                                             861

SEQ ID NO: 113          moltype = DNA   length = 861
FEATURE                 Location/Qualifiers
misc_feature            1..861
                        note = Ampicillin resistance marker
source                  1..861
                        mol_type = other DNA
                        organism = synthetic construct
SEQUENCE: 113
atgagcatcc agcatttccg tgtcgccctt attcccttttt ttgcggcatt ttgccttcct    60
gttttttgctc acccagaaac gctggtgaaa gtaaaagatg ctgaagatca gttgggagca   120
cgcgtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg gcatgacagt aagagaatta   360
tgcagtgctg ccataaccat gagtgataac actgcggcca acttacttct gacaacgatc   420
ggaggaccga aggagctaac cgcttttttg cacaacatgg gggatcatgt aacgcgtctt   480
gatcgttggg aaccggagct gaatgaagcc ataccaaacg acgagcgtga caccacgatg   540
cctgtagcaa tggcaacaac gttgcgcaaa ctattaactg gcgaactact tactctagct   600
tcccggcaac aattaataga ctggatgag gcggataaag ttgcaggacc acttctgcgc   660
tcggcccttc cggctggctg gtttattgct gataaatctg gagccggtga gcgtgggtct   720
cgcggtatca ttgcagcact ggggccagat ggtaagccct cccgtatcgt agttatctac   780
acgacgcgta gtcaggcaac tatggatgaa cgaaatagac agatcgctga gataggtgcc   840
tcactgatta agcattggta a                                             861

SEQ ID NO: 114          moltype = DNA   length = 861
FEATURE                 Location/Qualifiers
misc_feature            1..861
                        note = Ampicillin resistance marker
source                  1..861
                        mol_type = other DNA
                        organism = synthetic construct
SEQUENCE: 114
atgagcatcc agcatttccg tgtcgccctt attcccttttt ttgcggcatt ttgccttcct    60
gttttttgctc acccagaaac gctggtgaaa gtaaaagatg ctgaagatca gttgggagca   120
cgcgtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg gcatgacagt aagagaatta   360
tgcagtgctg ccataaccat gagtgataac actgcggcca acttacttct gacaacgatc   420
ggaggaccga aggagctaac cgcttttttg cacaacatgg gggatcatgt aacgcgtctt   480
gatcgttggg aaccggagct gaatgaagcc ataccaaacg acgagcgtga caccacgatg   540
cctgtagcaa tggcaacaac gttgcgcaaa ctattaactg gcgaactact tactctagct   600
tcccggcaac aattaataga ctggatgag gcggataaag ttgcaggacc acttctgcgc   660
tcggcccttc cggctggctg gtttattgct gataaatctg gagccggtga gcgtgggtct   720
cgcggtatca ttgcagcact ggggccagat ggtaagccct cccgtatcgt agttatctac   780
acgacgggga gtcaggcaac tatggatacg cgtaatagac agatcgctga gataggtgcc   840
tcactgatta agcattggta a                                             861

SEQ ID NO: 115          moltype = DNA   length = 861
FEATURE                 Location/Qualifiers
misc_feature            1..861
                        note = Ampicillin resistance marker
source                  1..861
                        mol_type = other DNA
                        organism = synthetic construct

```
SEQUENCE: 115
atgagcatcc agcatttccg tgtcgccctt attccctttt ttgcggcatt ttgccttcct    60
gttttttgctc acccagaaac gctggtgaaa gtaaaagatg ctgaagatca gttgggagca   120
cgcgtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg catgacagt aagagaatta    360
tgcagtgctg ccataaccat gagtgataac actgcggcca acttacttct gacaacgatc   420
ggaggaccga aggagctaac cgcttttttg cacaacatgg gggatcatgt aacgcgtctt   480
gatcgttggg aaccggagct gaatgaagcc ataccaaacg acgagcgtga caccacgatg   540
cctgtagcaa tggcaacaac gttgcgcaaa ctattaactg gcgaactact tactctagct   600
tcccggcaac aattaataga ctggatggag gcggataaag ttgcaggacc acttctgcgc   660
tcggcccttc cggctggctg gtttattgct gataaatctg gagccggtga gcgtgggtct   720
cgcggtatca ttgcagcact ggggccagat ggtaagccct cccgtatcgt agttatctac   780
acgacgggga gtcaggcaac tatggatgaa cgaacgcgtc agatcgctga gataggtgcc   840
tcactgatta agcattggta a                                             861

SEQ ID NO: 116            moltype = DNA  length = 861
FEATURE                   Location/Qualifiers
misc_feature              1..861
                          note = Ampicillin resistance marker
source                    1..861
                          mol_type = other DNA
                          organism = synthetic construct
SEQUENCE: 116
atgagcatcc agcatttccg tgtcgccctt attccctttt ttgcggcatt ttgccttcct    60
gttttttgctc acccagaaac gctggtgaaa gtaaaagatg ctgaagatca gttgggagca   120
cgcgtgggtt acatcgaact ggatctcaac agcggtaaga tccttgagag ttttcgcccc   180
gaagaacgtt ttccaatgat gagcactttt aaagttctgc tatgtggcgc ggtattatcc   240
cgtattgacg ccgggcaaga gcaactcggt cgccgcatac actattctca gaatgacttg   300
gttgagtact caccagtcac agaaaagcat cttacggatg gcatgacagt aagagaatta   360
tgcagtgctg ccataaccat gagtgataac actgcggcca acttacttct gacaacgatc   420
ggaggaccga aggagctaac cgcttttttg cacaacatgg gggatcatgt aacgcgtctt   480
gatcgttggg aaccggagct gaatgaagcc ataccaaacg acgagcgtga caccacgatg   540
cctgtagcaa tggcaacaac gttgcgcaaa ctattaactg gcgaactact tactctagct   600
tcccggcaac aattaataga ctggatggag gcggataaag ttgcaggacc acttctgcgc   660
tcggcccttc cggctggctg gtttattgct gataaatctg gagccggtga gcgtgggtct   720
cgcggtatca ttgcagcact ggggccagat ggtaagccct cccgtatcgt agttatctac   780
acgacgggga gtcaggcaac tatggatgaa cgagaacgcg tgatcgctga gataggtgcc   840
tcactgatta agcattggta a                                             861

SEQ ID NO: 117            moltype = DNA  length = 443
FEATURE                   Location/Qualifiers
misc_feature              1..443
                          note = Gene block 1i
source                    1..443
                          mol_type = other DNA
                          organism = synthetic construct
SEQUENCE: 117
gcgttgctgg cgttttcca taggctccgc cccctgacg acgcatcaca aaaatcgacg      60
cgtcaagtca gaggtggcga aacccgacag gactataaag ataccaggcg tttccccctg   120
gaagctccct cgtgcgctct cctgttccga ccctgccgct taccggatac ctgtccgcct   180
ttctcccttc gggaagcgtg gcgctttctc atagctcacg ctgtaggtat ctcagttcgg   240
tgtaggtcgt tcgctccaag ctgggctgtg tgcacgaacc ccccgttcag cccgaccgct   300
gcgccttatc cggtaactat cgtcttgagt ccaacccgt aagacacgac ttatcgcgac    360
tggcagcagc cacgcgtaac aggattagca gagcgaggta tgtaggcggt gctacagagt   420
tcttgaagtg gtggcctaac tac                                           443

SEQ ID NO: 118            moltype = DNA  length = 444
FEATURE                   Location/Qualifiers
misc_feature              1..444
                          note = Gene block 1l
source                    1..444
                          mol_type = other DNA
                          organism = synthetic construct
SEQUENCE: 118
gcgttgctgg cgttttcca taggctccgc cccctgacg acgcatcaca aaaatcgacg      60
cgtcaagtca gaggtggcga aacccgacag gactataaag ataccaggcg tttccccctg   120
gaagctccct cgtgcgctct cctgttccga ccctgccgct taccggatac ctgtccgcct   180
ttctcccttc gggaagcgtg gcgctttctc atagctcacg ctgtaggtat ctcagttcgg   240
tgtaggtcgt tcgctccaag ctgggctgtg tgcacgaacc ccccgttcag cccgaccgct   300
gcgccttatc cggtaactat cgtcttgagt ccaacacgcg taagacacga cttatcgcca   360
ctggcagcag ccactggtaa caggattagc agagcgaggt atgtaggcgg tgctacagag   420
ttcttgaagt ggtggcctaa ctac                                          444
```